(12) United States Patent
Oshima et al.

(10) Patent No.: US 10,336,240 B2
(45) Date of Patent: Jul. 2, 2019

(54) HEADLIGHT UNIT AND HEADLIGHT

(71) Applicant: MITSUBISHI ELECTRIC CORPORATION, Tokyo (JP)

(72) Inventors: Ritsuya Oshima, Tokyo (JP);
Masahige Suwa, Tokyo (JP);
Muneharu Kuwata, Tokyo (JP);
Kuniko Kojima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 779 days.

(21) Appl. No.: 14/900,912

(22) PCT Filed: Jul. 8, 2014

(86) PCT No.: PCT/JP2014/003610
§ 371 (c)(1),
(2) Date: Dec. 22, 2015

(87) PCT Pub. No.: WO2015/004905
PCT Pub. Date: Jan. 15, 2015

(65) Prior Publication Data
US 2016/0137122 A1 May 19, 2016

(30) Foreign Application Priority Data

Jul. 10, 2013 (JP) ................................. 2013-144663

(51) Int. Cl.
*B60Q 1/068* (2006.01)
*B60Q 1/076* (2006.01)
(Continued)

(52) U.S. Cl.
CPC ........... *B60Q 1/0683* (2013.01); *B60Q 1/076* (2013.01); *F21S 41/143* (2018.01); *F21S 41/24* (2018.01);
(Continued)

(58) Field of Classification Search
CPC ........ F21S 41/143; F21S 41/24; F21S 41/255; F21S 41/295; F21S 41/635; B60Q 1/0683; B60Q 1/076; B60Q 2200/36
See application file for complete search history.

(56) References Cited

U.S. PATENT DOCUMENTS 5,068,768 A * 11/1991 Kobayashi .............. F21S 41/28
362/539
5,584,568 A * 12/1996 Corbasson .............. F21V 14/06
359/794
(Continued)

FOREIGN PATENT DOCUMENTS

DE 10325330 A1 12/2004
DE 102010054922 A1 6/2012
(Continued)

*Primary Examiner* — Peggy A Neils
(74) *Attorney, Agent, or Firm* — Birch, Stewart, Kolasch & Birch, LLP

(57) ABSTRACT

A headlight unit includes: a light source that emits a light beam for irradiating a forward area in a traveling direction; a light guide portion that receives the light beam and forms planar light having a divergence angle; a projection lens portion that projects the planar light forward; and a drive unit that changes a position of the projection lens portion. The drive unit is disposed in a region overlapping with the projection lens portion, as optically viewed from an optical axis direction of the light guide portion or the projection lens portion.

20 Claims, 31 Drawing Sheets

(51) Int. Cl.
*F21S 41/24* (2018.01)
*F21S 41/29* (2018.01)
*F21S 41/63* (2018.01)
*F21S 45/47* (2018.01)
*F21S 45/48* (2018.01)
*F21S 41/143* (2018.01)
*F21S 41/255* (2018.01)

(52) U.S. Cl.
CPC ............ *F21S 41/255* (2018.01); *F21S 41/29* (2018.01); *F21S 41/295* (2018.01); *F21S 41/635* (2018.01); *F21S 45/48* (2018.01); *B60Q 2200/36* (2013.01); *F21S 45/47* (2018.01)

(56) References Cited

U.S. PATENT DOCUMENTS

| | | | |
|---|---|---|---|
| 7,618,174 B2 * | 11/2009 | Yasuda | B60Q 1/076 362/545 |
| 7,658,522 B2 | 2/2010 | Kuwahara et al. | |
| 8,939,619 B2 * | 1/2015 | Shibata | B60Q 1/076 362/460 |
| 9,481,291 B2 * | 11/2016 | Shibata | B60Q 1/0683 |
| 9,611,997 B2 * | 4/2017 | Bauer | B60Q 1/085 |
| 2004/0246739 A1 | 12/2004 | Gebauer | |
| 2007/0183032 A1 | 8/2007 | Michimori et al. | |
| 2010/0165649 A1 | 7/2010 | Sun et al. | |
| 2012/0201039 A1 | 8/2012 | Shibata et al. | |
| 2012/0257400 A1 | 10/2012 | Shibata | |

FOREIGN PATENT DOCUMENTS

| | | |
|---|---|---|
| EP | 1234716 A2 | 8/2002 |
| EP | 2484555 A1 | 8/2012 |
| JP | 6-17005 U | 3/1994 |
| JP | 8-138410 A | 5/1996 |
| JP | 2000-3605 A | 1/2000 |
| JP | 2007-241239 A | 9/2007 |
| JP | 2008-94196 A | 4/2008 |
| JP | 2010-157501 A | 7/2010 |
| JP | 2012-17016 A | 1/2012 |
| JP | 2012-164429 A | 8/2012 |
| JP | 2012-221634 A | 11/2012 |
| JP | 2012-221760 A | 11/2012 |
| WO | WO 2014/174843 A1 | 10/2014 |

\* cited by examiner

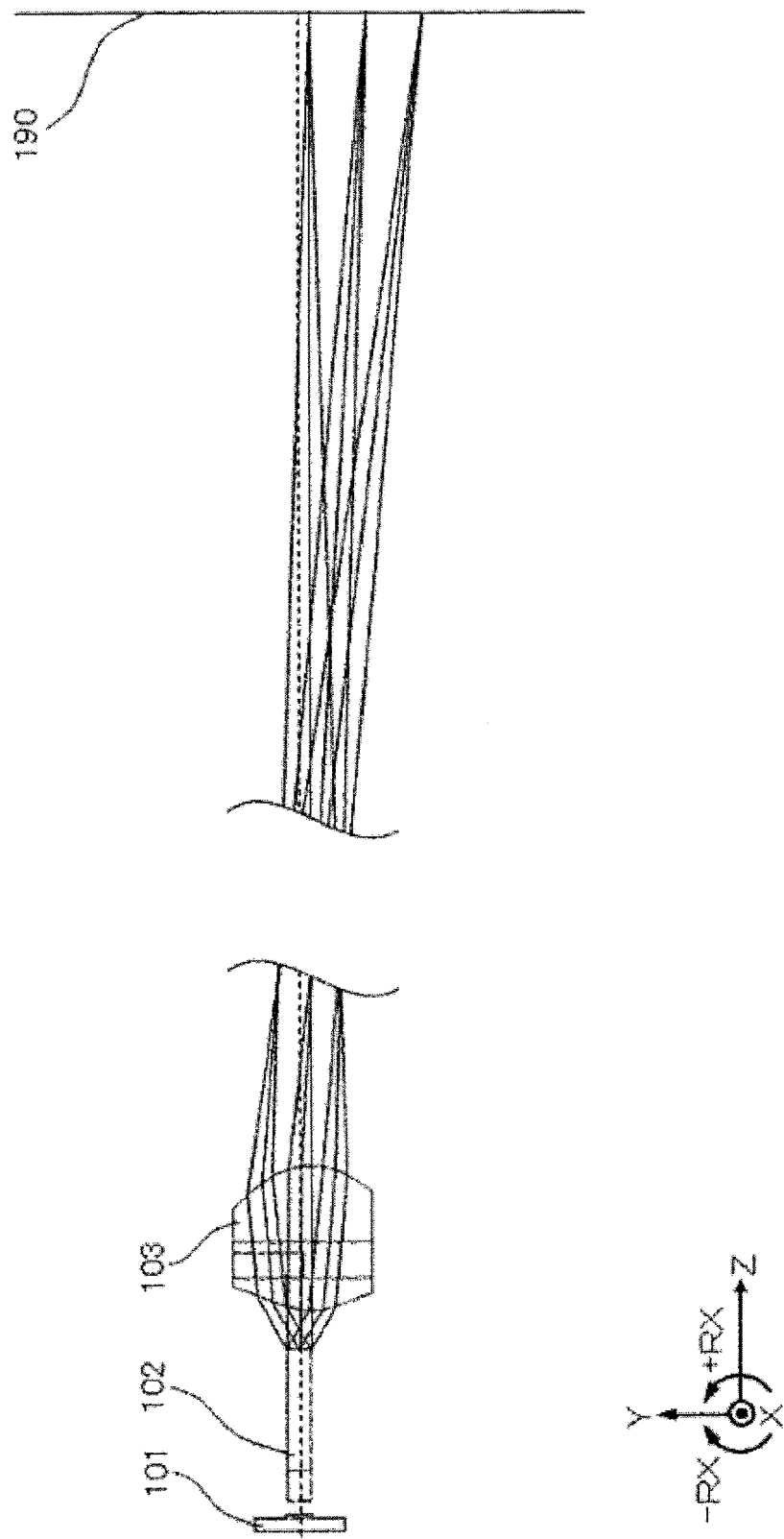

FIG. 9
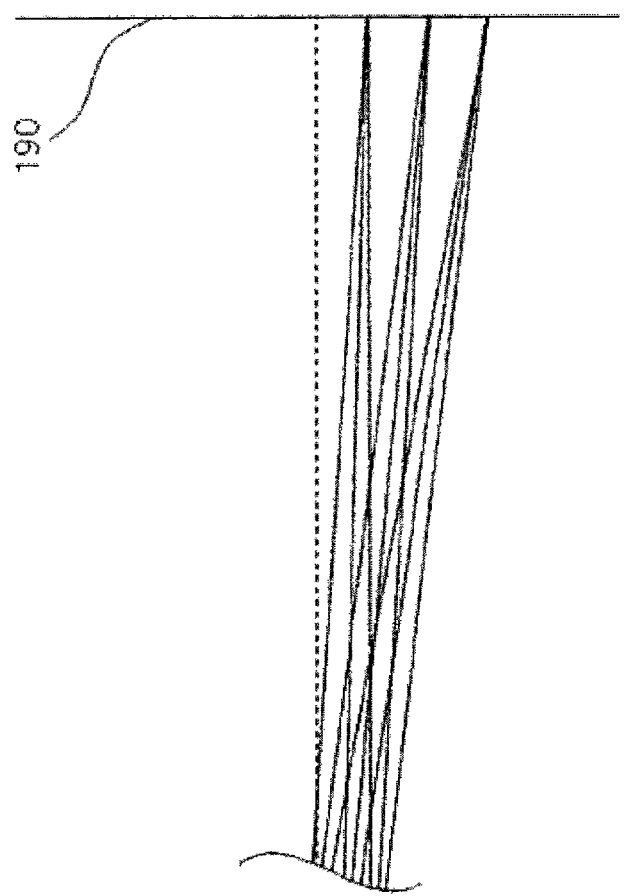
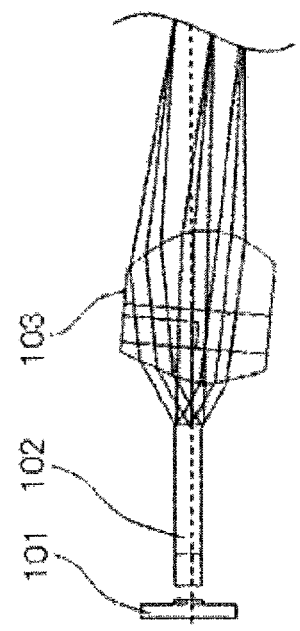
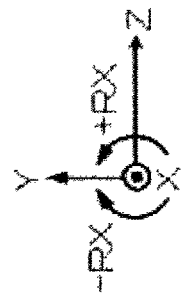

FIG. 27
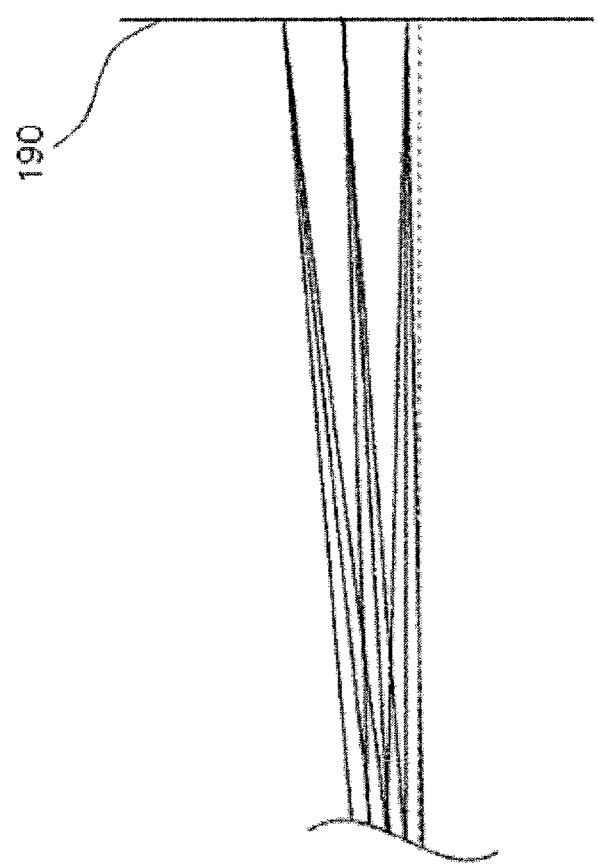
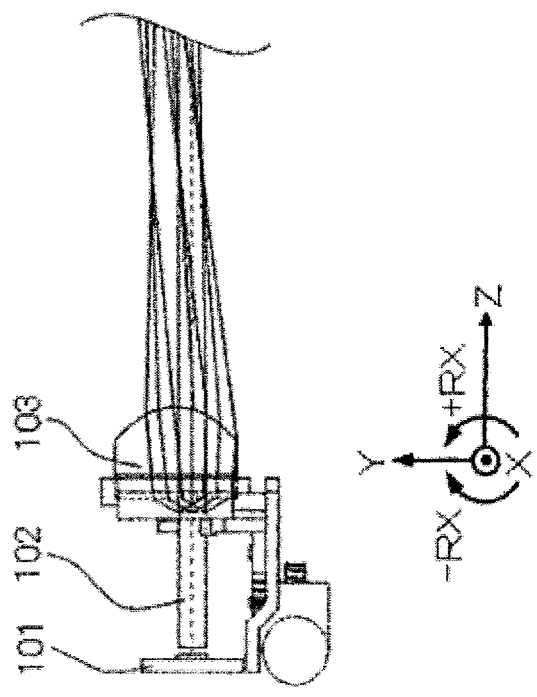

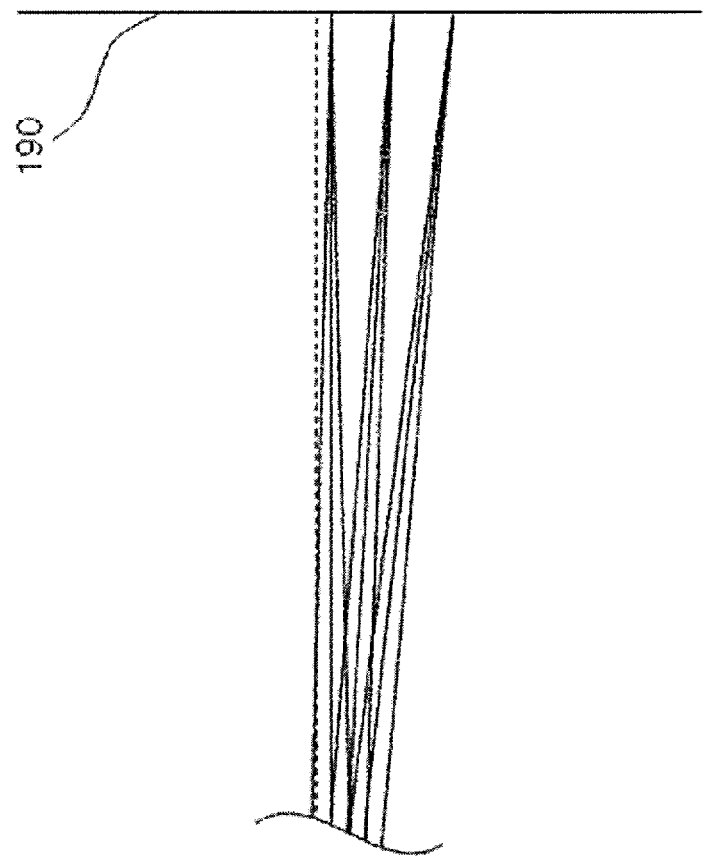
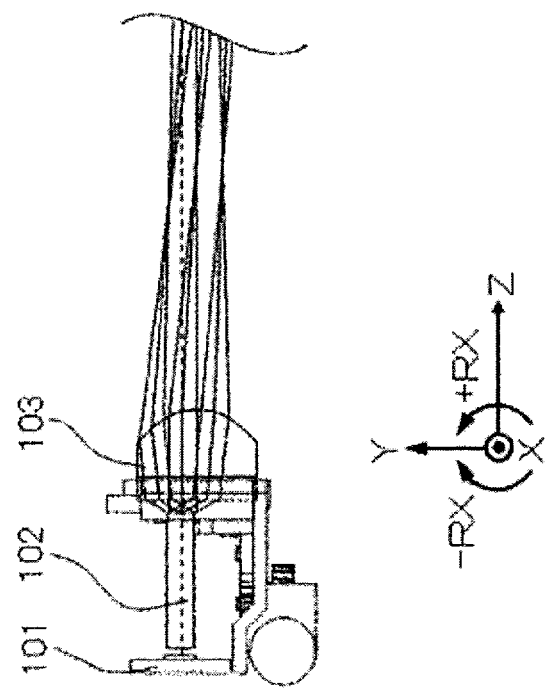
FIG. 28

HEADLIGHT UNIT AND HEADLIGHT

TECHNICAL FIELD

The present invention relates to a headlight unit that adjusts an optical axis of a headlight.

BACKGROUND ART

When a person sits on a rear seat of a vehicle, the vehicle body tilts backward. Also, when a load or the like is loaded on the rear seat, a rear trunk, or the like, the vehicle body tilts backward. When the vehicle is accelerated, the vehicle body tilts backward; when it is decelerated, the vehicle body tilts forward. Here, "tilts" refers to tilting due to rotation of the vehicle body about an axis of a wheel of the vehicle.

When the vehicle body tilts forward or backward in this way, a light distribution of a headlight changes in an up-down direction. Here, "up" refers to a direction toward the sky, and "down" refers to a direction toward the ground. Thus, "up-down direction" refers to a direction perpendicular to the ground. "Light distribution" refers to a spatial distribution of light emitted from a light source. Here, it refers to an area onto which the headlight projects light and the intensity of the light. "Headlight" refers to an illuminating device that is mounted on a transportation machine or the like and used to improve visibility for an operator. It is also referred to as a headlamp or headlight.

The change of the light distribution of the headlight in the up-down direction prevents the vehicle from providing an optimum light distribution, resulting in a problem of reduction in visibility for the driver. It also causes a problem of dazzling an oncoming vehicle. "Dazzling" refers to confusing a person's vision. Here, it indicates that light from the headlight enters the eyes of the driver of the oncoming vehicle and interferes with driving.

As a countermeasure against this, Patent Reference 1 discloses a vehicle lamp in which the direction of a beam projected by a lamp unit is changed. The lamp unit is supported in a suspending state on a bracket. The bracket is supported on a lamp body to be movable vertically and horizontally. The lamp unit includes a reflector, a discharge lamp, a projection lens, and a shade. A rotating force is transmitted from an output shaft to the lamp unit, so that the direction of a beam projected by the lamp unit is changed.

PRIOR ART REFERENCES

Patent References

Patent Reference 1: Japanese Patent Application Publication No. 2008-94196 (paragraphs 0025, 0035, and 0052 and FIG. 1)

SUMMARY OF THE INVENTION

Problems to be Solved by the Invention

However, the vehicle lamp of Patent Reference 1 changes the direction of the projected beam by moving the lamp unit including the reflector, discharge lamp, projection lens, and shade. Thus, a member moved to change the direction of the projected beam is large, and an actuator, a drive mechanism, or the like is large.

Means for Solving the Problems

A headlight unit according to the present invention includes a light source that emits a light beam for irradiating a forward area in a traveling direction; a light guide member that receives the light beam and emits planar light having a divergence angle; a projection lens that receives the planar light and projects the planar light forward; and a drive unit that changes a positional relationship between the light guide member and the projection lens, wherein the drive unit is disposed in a region overlapping with the projection lens in a direction perpendicular to an optical axis of the light guide member from the light guide member, as optically viewed from an optical axis direction of the projection lens.

Effect of the Invention

It is possible to downsize a headlight unit capable of changing a projection direction of projection light.

BRIEF DESCRIPTION OF THE DRAWINGS

FIG. 7 is a diagram illustrating light ray trajectories when a vehicle body according to the first embodiment is not tilted forward or backward.

FIG. 9 is a diagram illustrating light ray trajectories when the vehicle body according to the first embodiment is tilted backward.

FIG. 27 is a diagram illustrating light ray trajectories when the vehicle body according to the third embodiment is tilted forward.

FIG. 28 is a diagram illustrating light ray trajectories when the vehicle body according to the third embodiment is tilted backward.

MODES FOR CARRYING OUT THE INVENTION

First Embodiment

In each of the following embodiments, to facilitate explanation, XYZ-orthogonal coordinate axes are shown in drawings. In the following description, it will be assumed that a forward direction of a headlight unit 100 is the +Z axis direction and a backward direction is the −Z axis direction. It will be assumed that, as viewed in the forward direction, a rightward direction is the +X axis direction and a leftward direction is the −X axis direction. It will be assumed that an upward direction (direction toward the sky) of the headlight unit 100 is the +Y axis direction and a downward direction (direction toward the ground) of the headlight unit 100 is the −Y axis direction. It will be assumed that, when the headlight unit 100 is viewed from the backward direction (−Z axis direction), a clockwise direction about the Z axis is the +RZ direction and a counterclockwise direction about the Z axis is the −RZ direction. It will also be assumed that, when the headlight unit 100 is viewed from the left (−X axis direction), a clockwise direction about the X axis is the +RX direction and a counterclockwise direction about the X axis is the −RX direction.

Figure 1:
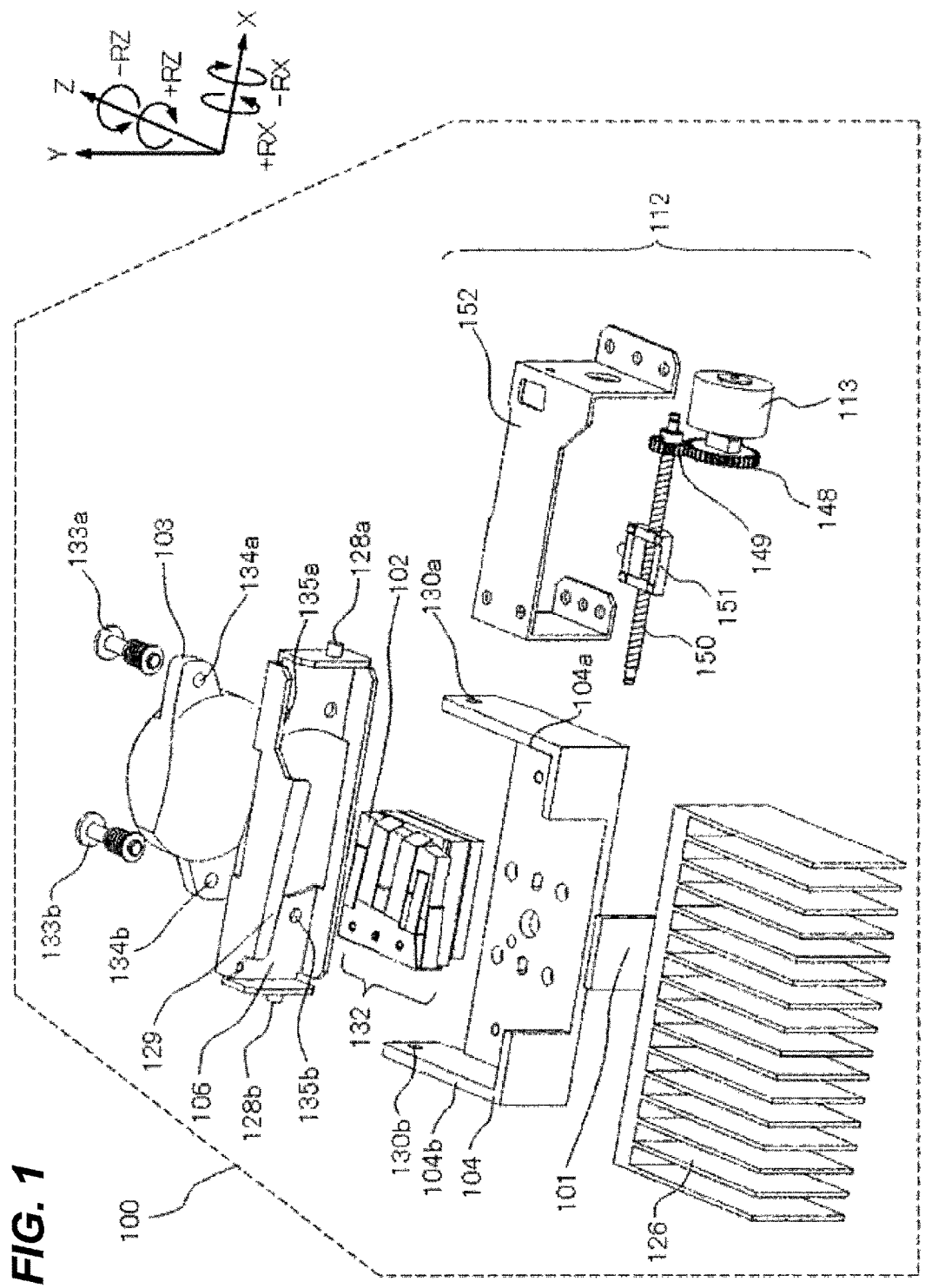
FIG. 1 is an exploded back perspective view of a headlight unit 100 according to a first embodiment.
Figure 2:
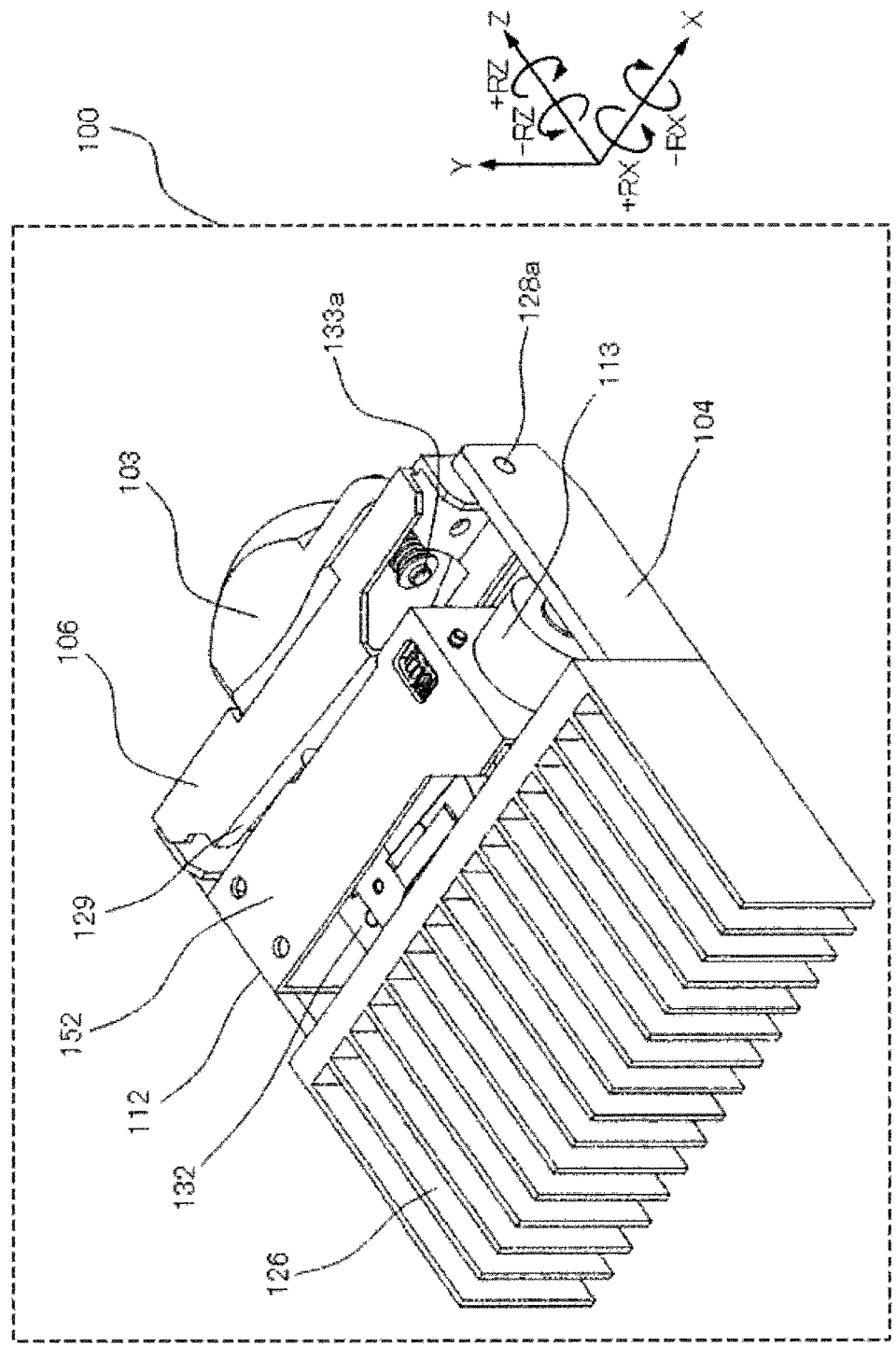
FIG. 2 is a back perspective view of the headlight unit 100 according to the first embodiment in an assembled state.
Figure 3:
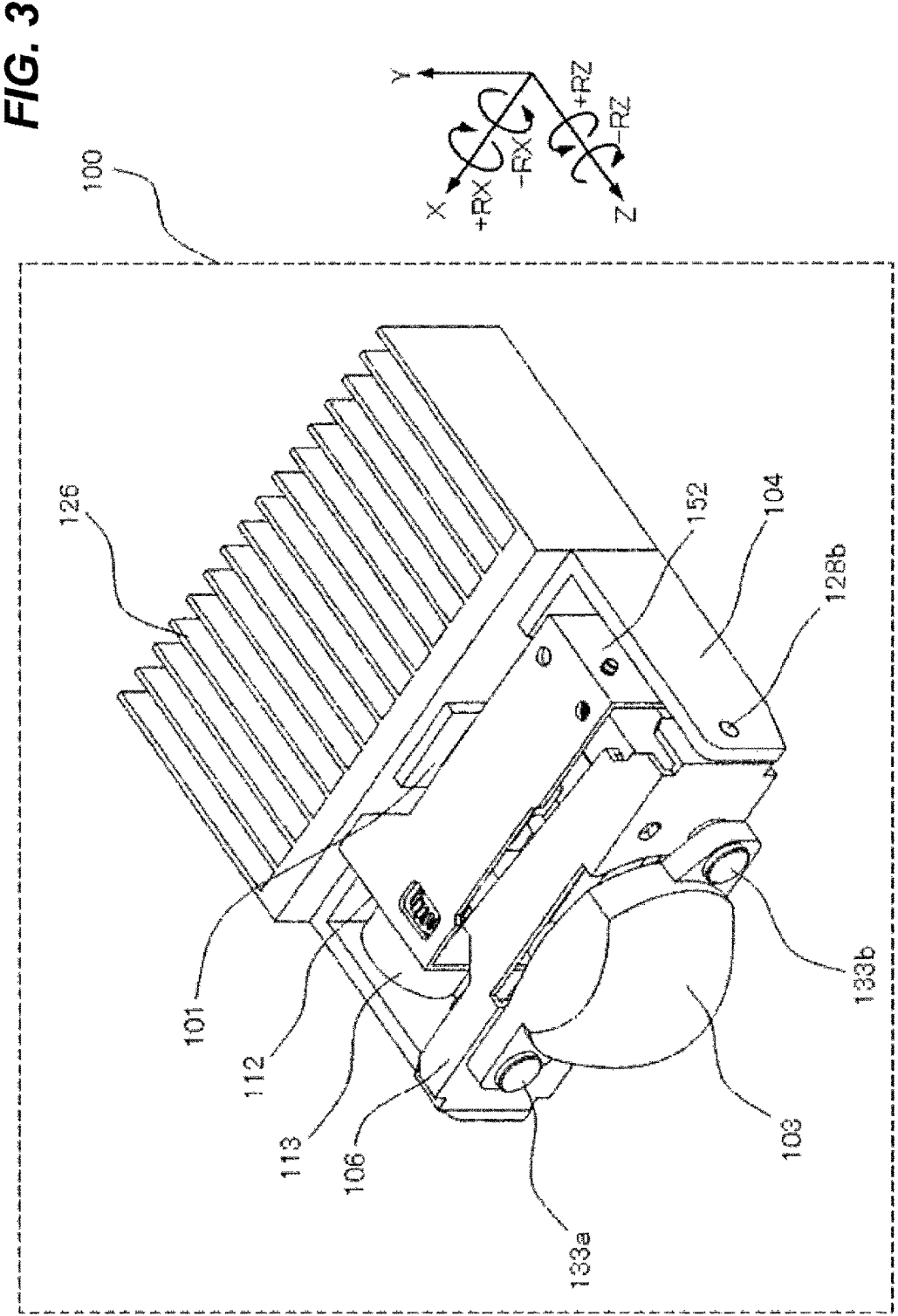
FIG. 3 is a front perspective view of the headlight unit 100 according to the first embodiment in the assembled state.

FIG. 1 is an exploded back perspective view of the headlight unit 100 according to a first embodiment. FIG. 2 is a back perspective view of the headlight unit 100 in an assembled state. FIG. 3 is a front perspective view of the headlight unit 100 in the assembled state.

The headlight unit 100 includes a light source 101, a light guide member 102, a projection lens 103, a drive unit 112. The headlight unit 100 may also include a lens holder 106 and a base portion 104. The light guide member 102 is held by a light guide unit 132.

<Light Source 101>

The light source 101 is, for example, a light emitting diode (LED), a xenon lamp, a halogen lamp, or the like. An electroluminescence element, a semiconductor laser, or the like may be used as the light source 101. The following description will be made assuming that the light source 101 is an LED. The light source 101 is mounted with a heat dissipation unit 126 for releasing heat generated from the light source 101 to the outside. The light source 101 is fixed directly to the base portion 104, or is fixed to the base portion 104 via the heat dissipation unit 126.

Figure 4:
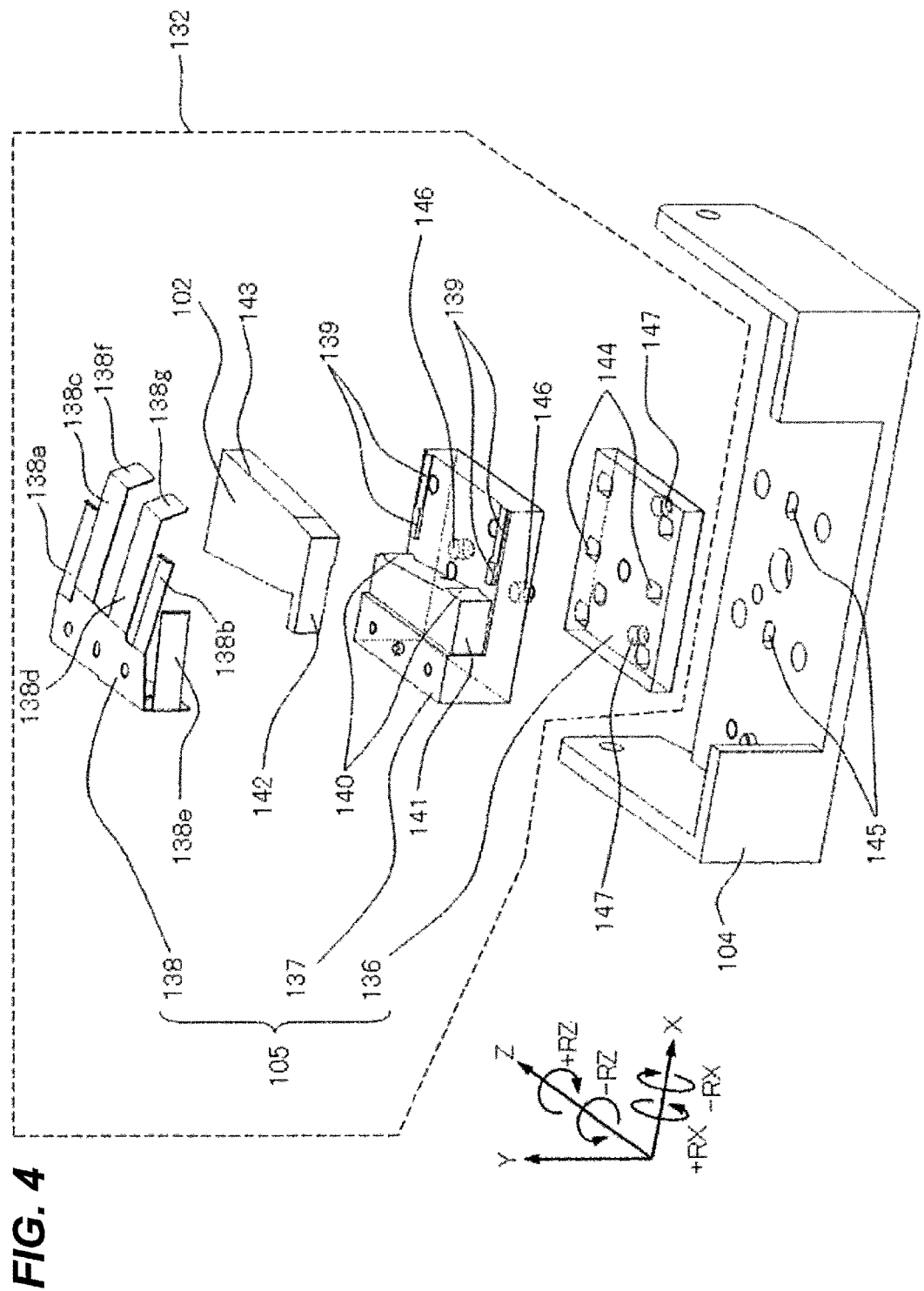
FIG. 4 is an exploded perspective view of a light guide unit 132 according to the first embodiment.

FIG. 4 is an exploded perspective view of the light guide unit 132. The light guide unit 132 includes the light guide member 102 and a light guide member holder 105. The light guide member holder 105 includes an adjustment base 136, a light guide member base 137, and a plate spring 138. The light guide member 102 is disposed on a surface on the +Y axis direction side of the light guide member base 137. The light guide member 102 is pressed by the plate spring 138 from the +Y axis direction in the −Y axis direction, −X axis direction, and +Z axis direction to be held on the light guide member base 137. The plate spring 138 is fixed to the light guide member base 137.

<Light Guide Member 102>

The light guide member 102 is, for example, a light guide, a light pipe, or the like. "Light guide" refers to an optical element that efficiently guides light entering through one side to the other side by using internal reflection in a transparent member of acrylic resin or the like. "Light pipe" refers to an optical element that guides light entering through one side to the other side by multiple reflections of the light by an inner surface of a hollow member.

In FIG. 4, the light guide member 102 used in a headlight 10 has a plate-like shape. For example, a predetermined light distribution pattern for an automobile low beam has a horizontally long shape narrow in the up-down direction. A light emitting surface of the light guide member 102 and a position (irradiated surface 190) onto which light is projected are at optically conjugate positions. Thus, the light distribution pattern on the irradiated surface 190 is the same as the light distribution pattern on the light emitting surface of the light guide member 102. The "light distribution pattern on the light emitting surface of the light guide member 102" has the same shape as the light emitting surface of the light guide member 102. "Optically conjugate" refers to a relation in which light emitted from one point is imaged at another point. To form a horizontally long light distribution pattern, the light emitting surface of the light guide member 102 needs to have a horizontally long shape. Thus, in FIG. 4, the light guide member 102 has a plate-like shape. Since the light emitting surface has a horizontally long shape, the light guide member 102 has at least a plate-like portion. Since the light guide member 102 has a plate-like shape, the light guide unit 132 also has a plate-like shape. The light guide unit 132 may also have a plate-like portion.

Since most of the light guide member 102 is an optical surface, it is desired to be held with as small a contact surface as possible. Thus, the light guide member base 137 has two types of abutting portions for positioning the light guide member 102. "Abutting" refers to touching. The two abutting portions each have a projecting surface with a semicylindrical shape. "Semicylindrical shape" refers to a shape obtained by cutting a cylinder with a plane parallel to an axis of the cylinder. A part at a generating line of the semicylindrical shape is an abutting part. The light guide member 102 makes contact with the abutting part along the generating line on a side surface of the cylinder. "Generating line" refers to a longitudinal part on the side surface of the cylinder. The cylinder is made by causing a line segment perpendicular to the base to go around the base along the circumference of the base. This line segment is the generating line.

One of the abutting portions is an upper surface arc-shaped portion 139. The upper surface arc-shaped portion 139 is formed on a surface of the light guide member base 137 parallel to a Z-X plane. The upper surface arc-shaped portion 139 projects in the +Y axis direction. An axis of the upper surface arc-shaped portion 139 is parallel to the X axis. The upper surface arc-shaped portion 139 is formed at an end portion on the +Z axis direction side and an end portion on the −Z axis direction side of the surface of the light guide member base 137 parallel to the Z-X plane. A surface on the −Y axis direction side of the light guide member 102 abuts the upper surface arc-shaped portions 139.

The other one of the abutting portions is a side surface arc-shaped portion 140. The side surface arc-shaped portion 140 is formed on a surface of the light guide member base 137 parallel to a Y-Z plane. The side surface arc-shaped portion 140 projects in the +X axis direction. An axis of the side surface arc-shaped portion 140 is parallel to the Y axis. The side surface arc-shaped portion 140 is formed at an end portion on the +Z axis direction side and an end portion on the −Z axis direction side of the surface of the light guide member base 137 parallel to the Y-Z plane. A surface on the −X axis direction side of the light guide member 102 abuts the side surface arc-shaped portions 140. The upper surface arc-shaped portions 139 are disposed on the +X axis direction side of the side surface arc-shaped portions 140.

Thus, the bottom surface (surface on the −Y axis side) of the light guide member 102 makes line contact with the upper surface arc-shaped portions 139 at two positions. The left surface (surface on the −X side) of the light guide member 102 makes line contact with the side surface arc-shaped portions 140 at two positions.

On the other hand, the light guide member 102 has a flange 142. The flange 142 is a rectangular parallelepiped portion projecting in the −X axis direction from an end portion on the −Z axis direction side of the light guide member 102. In FIG. 4, a surface on the −Z axis side of the flange 142 and a light incident surface of the light guide member 102 are on the same plane. The light guide member 102 is disposed so that a surface on the +Z axis side of the flange 142 is in contact with an abutting surface 141 of the light guide member base 137. The abutting surface 141 is a surface formed on the light guide member base 137. The abutting surface 141 is a surface parallel to an X-Y plane. As described above, one of the side surface arc-shaped portions 140 is formed at the end portion on the −Z axis direction side of the light guide member base 137. On the −Z axis side of this side surface arc-shaped portion 140, the abutting surface 141 is formed. The abutting surface 141 is formed on the −X axis side of the side surface arc-shaped portions 140.

<Plate Spring 138>

The plate spring 138 has spring portions 138a, 138b, 138c, 138d, and 138e. The spring portions 138a and 138b are plate springs that are long in the X axis direction and formed by surfaces parallel to a Z-X plane. The spring portions 138a and 138b are cantilever-shaped springs having a fixed part on the −X axis side and a free end on the +X axis side. Thus, the spring portions 138a and 138b are cantilever-shaped springs extending in the X axis direction. However, the surfaces parallel to the Z-X plane of the spring portions 138a and 138b may be previously bent in the −Y axis direction to generate spring force. Tip portions of the spring portions 138a and 138b are bent in the +Y axis direction. Thus, the tip portions on the +X axis side of the spring portions 138a and 138b are bent toward the +Y axis side. The bent portions make line contact with an upper surface (+Y axis surface) of the light guide member 102. The light guide member 102 is sandwiched between the spring portions 138a and 138b and the upper surface arc-shaped portions 139, and thereby held so as not to move in the Y axis direction relative to the light guide member base 137. The spring portions 138a and 138b press the light guide member 102 against the upper surface arc-shaped portions 139 of the light guide member base 137 from the +Y axis direction.

The spring portions 138c and 138d are plate springs that are long in the X axis direction and formed by surfaces parallel to a Z-X plane. The spring portions 138c and 138d are cantilever-shaped springs having a fixed part on the −X axis side and a free end on the +X axis side. Thus, the spring portions 138c and 138d are cantilever-shaped springs extending in the X axis direction. However, the surfaces parallel to the Z-X plane of the spring portions 138c and 138d may be previously bent in the −Y axis direction to generate spring force. Tip portions of the spring portions 138c and 138d are bent in the −Y axis direction. The spring portions 138c and 138d are plate springs that are long in a direction perpendicular to a ridge line 143 of the light guide member 102 and formed by the surfaces parallel to the Z-X plane.

Bent portions 138f and 138g are formed at the tip portions on the +X axis side of the spring portions 138c and 138d. The bent portions 138f and 138g are portions bent toward the −Y axis side. The bending amounts of the bent portions 138f and 138g relative to a Z-X plane are less than 90 degrees. Surfaces of the bent portions 138f and 138g make line contact with the ridge line 143 on the light guide member 102. "Ridge line" refers to a boundary between one surface and another surface. The ridge line is not limited to a straight line and may be a curved line. The ridge line 143 is a ridge line on the +Y axis side of a surface facing a Y-Z plane on the +X axis side of the light guide member 102. Thus, the ridge line 143 is a boundary between the surface facing the Y-Z plane on the +X axis side of the light guide member 102 and a surface facing a Z-X plane on the +Y axis side of the light guide member 102. The light guide member 102 is sandwiched between the bent portions 138f and 138g and the side surface arc-shaped portions 140, and thereby held so as not to move in the X axis direction relative to the light guide member base 137. The bent portions 138f and 138g press the light guide member 102 against the side surface arc-shaped portions 140 of the light guide member base 137 from the +X axis direction.

The spring portion 138e is a plate spring that is long in the X axis direction and formed by a surface parallel to an X-Y plane. The spring portion 138e is a cantilever-shaped spring having a fixed part on the −X axis side and a free end on the +X axis side. Thus, the spring portion 138e is a cantilever-shaped spring extending in the X axis direction. However, the surface parallel to the X-Y plane of the spring portion 138e may be previously bent in the +Z axis direction to generate spring force. A tip portion of the spring portion 138e is bent in the −Z axis direction. Thus, the tip portion on the +X axis side of the spring portion 138e is bent in the −Z direction. The bent portion makes line contact with a side surface (surface on the −Z axis side) of the flange 142 of the light guide member 102. The flange 142 is sandwiched between the spring portion 138e and the abutting surface 141, and thereby the light guide member 102 is held so as not to move in the Z axis direction relative to the light guide member base 137. The spring portion 138e presses the flange 142 against the abutting surface 141 of the light guide member base 137 from the −Z axis direction.

The light guide member 102 is held on the light guide member base 137 as described above, which allows the light guide member 102 to be held on the light guide member base 137 with as small a contact area as possible.

<Adjustment Base 136>

The adjustment base 136 is a part capable of adjusting the mounting position of the light guide member 102 to the base portion 104 in an X-Z plane. The light guide member base 137 is mounted via the adjustment base 136 to the base portion 104 so that it can translate on an X-Z plane. The light guide member base 137 has, on its surface on the −Y axis side, Z axis adjustment pins 146. The Z axis adjustment pins 146 are pins extending in the −Y axis direction. The number of the Z axis adjustment pins 146 is two; one of them is located on the −Z axis side of the light guide member base 137 and the other is located on the +Z axis side of the light guide member base 137. In FIG. 4, the two Z axis adjustment pins 146 are arranged at a certain interval in parallel with the Z axis. In FIG. 4, one of the Z axis adjustment pins 146 is located at an end portion on the −Z axis side of the light guide member base 137, and the other is located at an end portion on the +Z axis side of the light guide member base 137.

The adjustment base 136 is a plate-like member. In FIG. 4, the adjustment base 136 is disposed in parallel with a Z-X plane. The adjustment base 136 has, on its surface on the +Y axis side parallel to a Z-X plane, two Z axis adjustment slots 144. The two Z axis adjustment slots 144 are disposed at positions corresponding to the Z axis adjustment pins 146. In FIG. 4, the two Z axis adjustment slots 144 are arranged at a certain interval in parallel with the Z axis. In FIG. 4, one of the Z axis adjustment slots 144 is located at an end portion on the −Z axis side of the adjustment base 136 and the other is located at an end portion on the +Z axis side of the adjustment base 136. The Z axis adjustment slots 144 are long holes elongated in a direction parallel to the Z axis. The Z axis adjustment pins 146 are inserted in the Z axis adjustment slots 144. The dimensions of the Z axis adjustment slots 144 in the X axis direction are slightly larger than diameters of the Z axis adjustment pins 146. Thus, the dimensions of the Z axis adjustment slots 144 in the X axis direction are set to prevent the Z axis adjustment pins 146 from rattling in the X axis direction and allow the Z axis adjustment pins 146 to move in the Z axis direction. Thus, the light guide member base 137 is movable relative to the adjustment base 136 only in the Z axis direction.

The adjustment base 136 has, on its surface on the −Y axis side, X axis adjustment pins 147. The X axis adjustment pins 147 are pins extending in the −Y axis direction. The X axis adjustment pins 147 are provided at two positions: the +X axis side and −X axis side of the adjustment base 136. That is, the number of the X axis adjustment pins 147 are two; one of them is located on the −X axis side of the adjustment base 136 and the other is located on the +X axis side of the adjustment base 136. In FIG. 4, the two X axis adjustment pins 147 are arranged at a certain interval in parallel with the X axis. In FIG. 4, one of the X axis adjustment pins 147 is located at an end portion on the −X axis side of the adjustment base 136 and the other is located at an end portion on the +X axis side of the adjustment base 136.

The base portion 104 has, on its surface on the +Y axis side parallel to a Z-X plane, two X axis adjustment slots 145. The two X axis adjustment slots 145 are provided at positions corresponding to the X axis adjustment pins 147. In FIG. 4, the two X axis adjustment slots 145 are arranged at a certain interval in parallel with the X axis. The X axis adjustment slots 145 are long holes elongated in a direction parallel to the X axis. The X axis adjustment pins 147 are inserted in the X axis adjustment slots 145. The dimensions of the X axis adjustment slots 145 in the Z axis direction are slightly larger than diameters of the X axis adjustment pins 147. Thus, the dimensions of the X axis adjustment slots 145 in the Z axis direction are set to prevent the X axis adjustment pins 147 from rattling in the Z axis direction and allow the X axis adjustment pins 147 to move in the X axis direction. Thus, the adjustment base 136 is movable relative to the base portion 104 only in the X axis direction.

From these, the light guide member 102 is positionally adjustable in the X axis direction and Z axis direction on an X-Z plane without rotating about the Y axis. The light guide member base 137 can be screwed to the base portion 104 with the adjustment base 136 sandwiched therebetween.

<Projection Lens 103>

The projection lens 103 is held by the lens holder 106. The projection lens 103 transmits light emitted from the light source 101 in the +Z axis direction and projects it in the +Z axis direction (forward). The projection lens 103 has flange portions at both ends in the X axis direction. Holding holes 134a and 134b are formed in the flange portions. The holding holes 134a and 134b are holes parallel to the Z axis. The holding holes 134a and 134b are through holes. The holding hole 134a is formed in the flange on the +X axis side. The holding hole 134b is formed in the flange on the −X axis side.

The lens holder 106 is a plate-like member. The lens holder 106 has, at its center, an opening through which light passes. The lens holder 106 is disposed in parallel with an X-Y plane. An end portion on the +Y axis side of the lens holder 106 is bent toward the −Z axis side. A leading end portion of the bent portion is further bent toward the −Y axis side, so that a slide surface 129 is formed. The slide surface 129 is a flat surface inclined about the Y axis relative to an X-Y plane.

End portions on the +X and −X axis sides of the lens holder 106 are bent toward the −Z axis side. A rotation pin 128a is provided on a surface on the +X axis side of the bent portion of the end portion on the +X axis side. The rotation pin 128a is a pin extending in the +X axis direction. A rotation pin 128b is provided on a surface on the −X axis side of the bent portion of the end portion on the −X axis side. The rotation pin 128b is a pin extending in the −X axis direction. The rotation pins 128a and 128b are disposed in parallel with the X axis. The rotation pins 128a and 128b are coaxially arranged.

An end portion on the −Y axis side of the lens holder 106 is bent toward the −Z axis side. This bent portion is provided to increase the strength of the lens holder 106. In the first embodiment, the slide surface 129 is formed at an end portion on the +Y axis side of the lens holder 106. However, the slide surface 129 may be formed at an end portion on the −Y axis side of the lens holder 106. Specifically, the slide surface 129 is formed by bending an end portion on the −Y axis side of the lens holder 106 toward the −Z axis side and further bending it toward the +Y axis side.

The lens holder 106 has fixing holes 135a and 135b on both sides in the X axis direction of the opening through which light passes. The fixing holes 135a and 135b are provided in a surface parallel to an X-Y plane. The fixing hole 135a is formed on the +X axis side of the opening. The fixing hole 135b is formed on the −X axis side of the opening. The fixing hole 135a is provided at a position corresponding to the holding hole 134a. The fixing hole 135b is provided at a position corresponding to the holding hole 134b.

<Fixing Pins 133a and 133b>

Fixing pins 133a and 133b are pins for mounting the projection lens 103 to the lens holder 106.

The projection lens 103 is mounted from the +Z axis side of the lens holder 106. The projection lens 103 is mounted on a surface parallel to an X-Y plane of the lens holder 106. That is, the projection lens 103 is mounted on the surface parallel to an X-Y plane on the +Z axis side of the lens holder 106. The fixing pin 133a is inserted in the holding hole 134a from the +Z axis direction and inserted in the fixing hole 135a. Then, a coil spring is inserted in the fixing pin 133a from the −Z axis direction. After the coil spring is inserted in the fixing pin 133a, a fixing ring is attached to the fixing pin 133a from the −Z axis direction side of the fixing pin 133a. The coil spring is mounted so that an end portion on the +Z axis direction side of the coil spring is in contact with a surface parallel to an X-Y plane on the −Z axis side of the lens holder 106. On the other hand, an end portion on the −Z axis direction side of the coil spring is in contact with the fixing ring fixed to the fixing pin 133a. The contact of the coil spring with the fixing ring prevents the coil spring from coming off the fixing pin 133a.

Similarly, the fixing pin 133b is inserted in the holding hole 134b from the +Z axis direction and inserted in the fixing hole 135b. Then, a coil spring is inserted in the fixing pin 133b from the −Z axis direction. After the coil spring is inserted in the fixing pin 133b, a fixing ring is attached to the fixing pin 133b from the −Z axis direction side of the fixing pin 133b. The coil spring is mounted so that an end portion on the +Z axis direction side of the coil spring is in contact with a surface parallel to an X-Y plane on the −Z axis side of the lens holder 106. On the other hand, an end portion on the −Z axis direction side of the coil spring is in contact with the fixing ring fixed to the fixing pin 133b. The contact of the coil spring with the fixing ring prevents the coil spring from coming off the fixing pin 133b.

The coil springs are compressed between the fixing rings attached to the fixing pins 133a and 133b and the surface parallel to an X-Y plane on the −Z side of the lens holder 106. The coil springs generate forces pulling the fixing pins 133a and 133b in the −Z axis direction. Thereby, the projection lens 103 is pressed against the lens holder 106.

<Base Portion 104>

The base portion 104 is a part having a surface parallel to a Z-X plane. The base portion 104 has, at both end portions thereof in the X axis direction, side plate portions 104a and 104b parallel to a Y-Z plane. The side plate portions 104a and 104b extend in the +Y direction from the surface parallel to the Z-X plane. Thus, it has a shape obtained by bending both end portions in the X axis direction of the plate-like base portion 104 in the +Y axis direction. These portions bent in the +Y axis direction are the "side plate portions." Rotation holes 130a and 130b are formed in the two side plate portions 104a and 104b of the base portion 104. The rotation hole 130a is provided in the side plate portion 104a on the +X axis side. The rotation hole 130b is provided in the side plate portion 104b on the −X axis side. Axes of the rotation holes 130a and 130b are parallel to the X axis. The rotation holes 130a and 130b are coaxially arranged. The rotation holes 130a and 130b are provided at positions corresponding to the rotation pins 128a and 128b.

The lens holder 106 is disposed on the forward direction side (+Z axis side) of the light guide member 102. As described above, the lens holder 106 has the rotation pins 128a and 128b, slide surface 129, and fixing holes 135a and 135b. The rotation pins 128a and 128b are pins parallel to the X axis. The rotation pin 128a is inserted in the rotation hole 130a provided in the side plate portion 104a of the base portion 104. The rotation pin 128b is inserted in the rotation hole 130b provided in the side plate portion 104b of the base portion 104. The lens holder 106 is held rotatably about the X axis relative to the base portion 104. The lens holder 106 is held rotatably about the axis of the rotation pins 128a and 128b relative to the base portion 104.

<Drive Unit 112>

Figure 5:
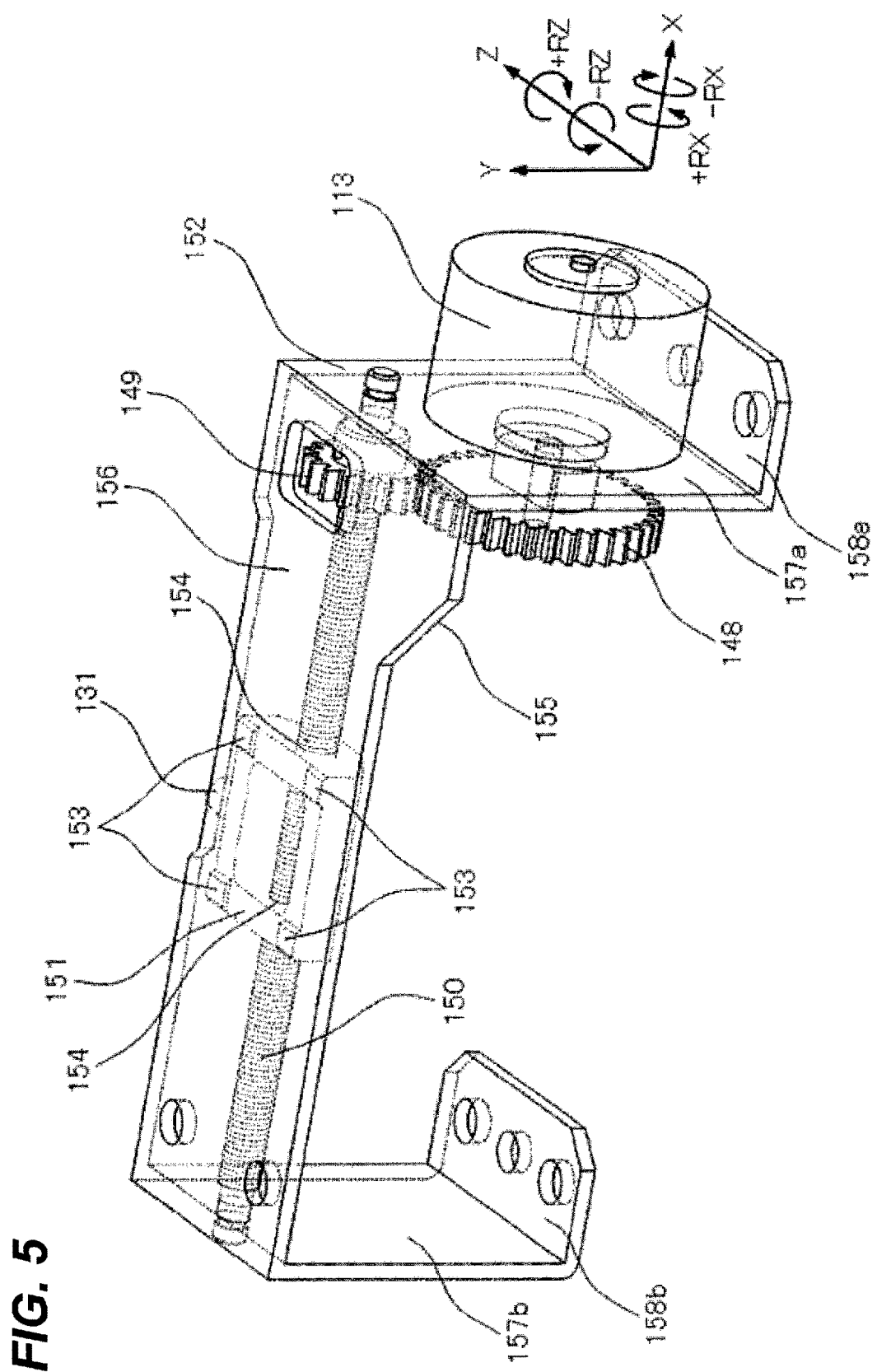
FIG. 5 is a back perspective view of a drive unit 112 according to the first embodiment.

FIG. 5 is a back perspective view of the drive unit 112. The drive unit 112 includes a motor 113, a motor spur gear 148, a feed screw gear 149, a feed screw 150, a translation member 151, and a motor holder 152.

The motor 113 is mounted to the motor holder 152 in such a manner that its rotational axis is parallel to the X axis. The motor gear 148 is mounted to a rotation shaft of the motor 113. In FIG. 5, the motor gear 148 is mounted to a tip portion of the rotation shaft.

The feed screw 150 is mounted to the motor holder 152 in such a manner that its rotational axis is parallel to the X axis. The feed screw 150 is rotatable about the rotational axis relative to the motor holder 152. However, the feed screw 150 is held so as not to move in a direction (the X axis direction) of the rotational axis.

The feed screw gear 149 is fixed to an end portion on the +X axis side of the feed screw 150. The feed screw gear 149 rotates in accordance with rotation of the feed screw 150. That is, the amount of rotation of the feed screw gear 149 is identical to the amount of rotation of the feed screw 150. The feed screw gear 149 is disposed to mesh with the motor gear 148. Thereby, a rotational force of the motor 113 is transmitted to the feed screw gear 149. Thus, as the motor 113 rotates, the feed screw 150 rotates. The feed screw gear 149 may be made as a separate part from the feed screw 150. However, the feed screw gear 149 may be made integrally with the feed screw 150.

The translation member 151 is a member having a rectangular parallelepiped shape thin in the Y axis direction. The translation member 151 is a drive member. The translation member 151 has two opposite surfaces parallel to a Z-X plane. The translation member 151 has two opposite surfaces parallel to a Y-Z plane. The translation member 151 has two opposite surfaces parallel to an X-Y plane. The translation member 151 has internally threaded holes 154. The internally threaded holes 154 are formed in the two respective surfaces parallel to the Y-Z plane. A threaded portion of the feed screw 150 is inserted in the two internally threaded holes 154. The translation member 151 has translation member sliding surfaces 153. The translation member sliding surfaces 153 are provided on the +Y axis side surface of the surfaces parallel to the Z-X plane. The translation member sliding surfaces 153 are formed on portions at four corners of the surface parallel to the Z-X plane. The translation member sliding surfaces 153 are convex portions projecting in the +Y axis direction. In FIG. 5, the leading ends of the convex portions are flat surfaces.

In FIG. 5, an opening is formed at a center portion of the +Y axis side surface of the surfaces parallel to the Z-X plane of the translation member 151. Thus, the translation member 151 has a box shape having an opening in the +Y axis side surface. Thus, the internally threaded holes 154 are formed in two opposite plate-like portions parallel to an Y-Z plane. This shortens the length of the internally threaded holes 154, thereby facilitating the machining. Further, since the internally threaded holes 154 are provided at the two positions of the translation member 151, the amount of tilt of the feed screw 150 relative to the translation member 151 can be reduced.

The motor holder 152 has a shape obtained by bending a plate. The motor holder 152 has a top plate portion 156 parallel to a Z-X plane. Side plate portions 157a and 157b bent in the −Y axis direction are formed at both ends in the X axis direction of a surface (the top plate portion 156) parallel to a Z-X plane. Bottom plate portions 158a and 158b bent in the +X axis direction are formed at end portions in the −Y axis direction of the side plate portions 157a and 157b, respectively. The surface on the −Y axis direction side of the top plate portion 156 of the motor holder 152 is a holder sliding surface 155. The translation member 151 is disposed on the −Y axis side of the top plate portion 156 of the motor holder 152. The translation member 151 moves while the translation member sliding surfaces 153 are in contact with the holder sliding surface 155.

Thus, as the rotation shaft of the motor 113 rotates, the motor gear 148 rotates. As the motor gear 148 rotates, the feed screw gear 149 rotates. As the feed screw gear 149 rotates, the feed screw 150 rotates. At this time, since the translation member sliding surfaces 153 are in contact with the holder sliding surface 155, the translation member 151 does not rotate about the X axis. The translation member 151 is moved in the X axis direction by the screw action.

The translation member 151 has a sliding pin 131. The sliding pin 131 is formed on the +Z axis side surface of the surfaces parallel to the X-Y plane of the translation member 151. The sliding pin 131 is a pin extending in the +Z axis direction. The tip of the sliding pin 131 has a hemispherical shape. The sliding pin 131 is a contact against the slide surface 129. Specifically, the translation member 151 moves in the X axis direction while the sliding pin 131 is in contact with the slide surface 129.

As described above, the lens holder 106 has the slide surface 129. The slide surface 129 is a surface perpendicular to a Z-X plane. The slide surface 129 is inclined so that a surface on the −X side of the slide surface 129 is located on the +Z axis side of a surface on the +X side of the slide surface 129. The translation member 151 moves in the X axis direction while the sliding pin 131 is in contact with the slide surface 129.

The rotation pin 128a of the lens holder 106 is inserted in the rotation hole 130a of the base portion 104. The rotation pin 128b of the lens holder 106 is inserted in the rotation hole 130b of the base portion 104. The lens holder 106 rotates in the +RX direction or −RX direction about the rotation pins 128a and 128b. Thus, the lens holder 106 rotates about an axis parallel to the X axis relative to the base portion 104.

The motor holder 152 is mounted on the base portion 104. The motor holder 152 is mounted on a surface parallel to a Z-X plane of the base portion 104. The motor holder 152 is mounted on the +Y axis direction side of the base portion 104. The sliding pin 131 provided on the translation member 151 is disposed in contact with the slide surface 129 provided on the lens holder 106. Further, the lens holder 106 is connected to the base portion 104 or motor holder 152 by a spring (not illustrated). This spring is, for example, a tension coil spring, and rotates the lens holder 106 in a direction in which the slide surface 129 makes contact with the sliding pin 131. Thus, in the first embodiment, this spring rotates the lens holder 106 in the +RX direction. This can keep the slide surface 129 in contact with the sliding pin 131.

<Motion of Lens Holder 106>

Figures 6A, 6B, 6C:
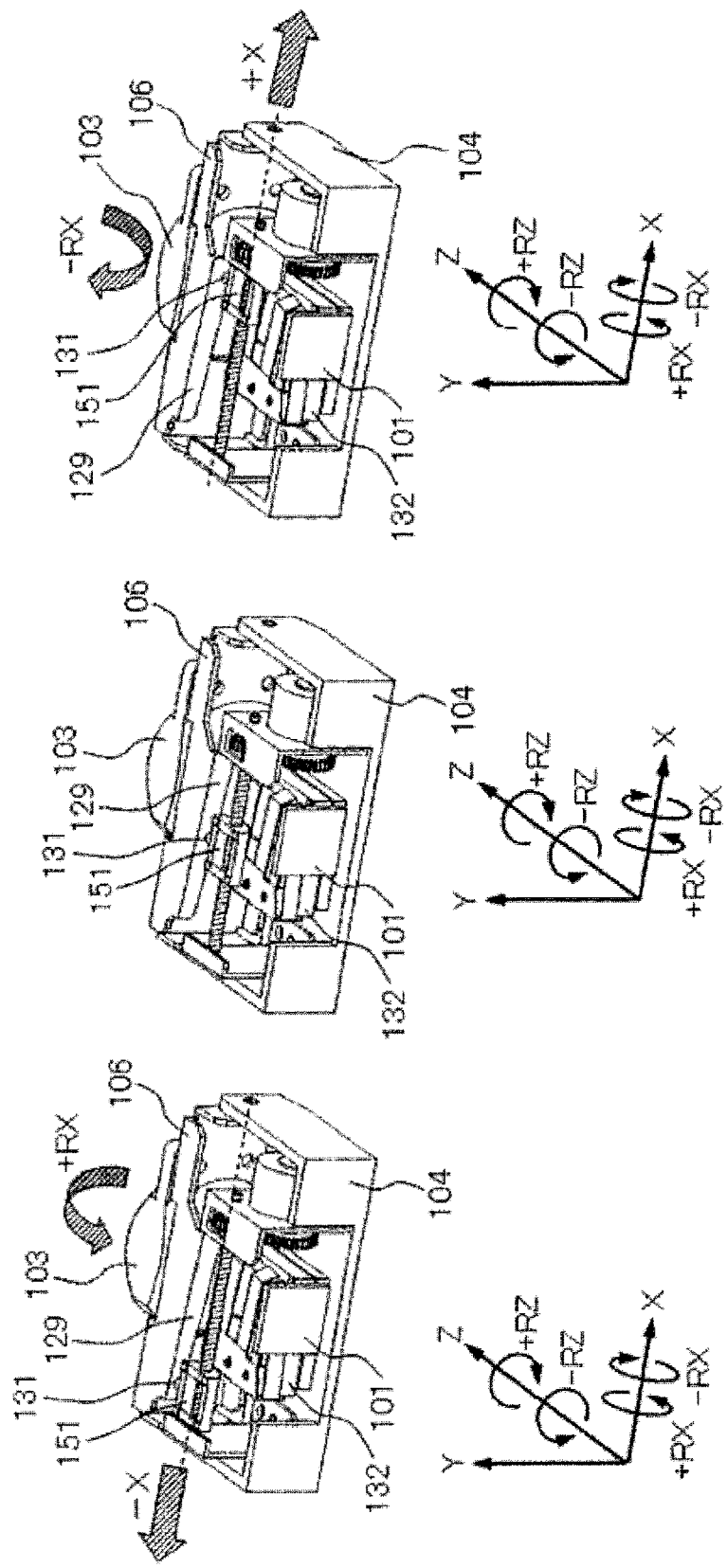
FIGS. 6(A), 6(B), and 6(C) are views illustrating the appearance of a motion of a lens holder 106 according to the first embodiment.

FIGS. 6(A), 6(B), and 6(C) are views illustrating the appearance of a motion of the lens holder 106 when the translation member 151 is driven by the motor 113. FIG. 6(A) illustrates a state where the translation member 151 is at an end position on the −X axis direction side of a movement range in the X axis direction and the lens holder 106 has rotated in the +RX direction about a rotational axis parallel to the X axis. FIG. 6(B) illustrates a state where the translation member 151 is at an intermediate position of the movement range in the X axis direction and the lens holder 106 is at an intermediate position of a rotational range about the rotational axis parallel to the X axis. FIG. 6(C) illustrates a state where the translation member 151 is at an end position on the +X axis direction side of the movement range in the X axis direction and the lens holder 106 has rotated in the −RX direction about the rotational axis parallel to the X axis.

The slide surface 129 is a surface facing in the −Z axis direction. The slide surface 129 is inclined so that it goes in the −Z axis direction as it goes in the +X axis direction. Thus, as the translation member 151 moves in the −X axis direction, the sliding pin 131 moves in the −X axis direction on the slide surface 129. "The translation member 151 moves in the −X axis direction" indicates that the state changes from FIG. 6(C) to FIG. 6(B) and then to FIG. 6(A), and is illustrated in FIGS. 6(A), 6(B), and 6(C). Thus, as the translation member 151 moves in the −X axis direction, the slide surface 129 moves in the −Z axis direction. The lens holder 106 is pulled in the +RX direction by the above-described spring. This rotates the lens holder 106 in the +RX direction about an axis (the rotation pins 128a and 128b) parallel to the X axis.

On the other hand, as the translation member 151 moves in the +X axis direction, the sliding pin 131 moves in the +X axis direction on the slide surface 129. "The translation member 151 moves in the +X axis direction" indicates that the state changes from FIG. 6(A) to FIG. 6(B) and then to FIG. 6(C), and is illustrated in FIGS. 6(A), 6(B), and 6(C). Thus, as the translation member 151 moves in the +X axis direction, the slide surface 129 moves in the +Z axis direction. The lens holder 106 is pulled in the +RX direction by the above-described spring. The sliding pin 131 presses the slide surface 129 in the +Z direction against the force of the spring. This rotates the lens holder 106 in the −RX direction about an axis (the rotation pins 128a and 128b) parallel to the X axis.

The lens holder 106 is pulled in the +RX direction by the above-described spring. Thus, as illustrated in FIGS. 6(A), 6(B), and 6(C), as the translation member 151 moves in the X axis direction, the sliding pin 131 moves in the X axis direction while in contact with the slide surface 129. The slide surface 129 is inclined so that it goes in the −Z axis direction as it goes in the +X axis direction. Thus, the contact position in the Z axis direction between the sliding pin 131 and the slide surface 129 changes relative to the lens holder 106. Since the position in the Z axis direction of the translation member 151 does not change relative to the base portion 104, as the translation member 151 moves in the X axis direction, the lens holder 106 rotates about the axis parallel to the X axis. Thus, the lens holder 106 and projection lens 103 rotate about the rotation pins 128a and 128b. As described above, the movement of the translation member 151 in the X axis direction moves the sliding pin 131 in the X axis direction, rotating the lens holder 106 and projection lens 103 about the axis parallel to the X axis.

The structure of the present invention allows the slide surface 129 provided on the lens holder 106 to be widely extended in the X axis direction. This allows the translation member 151 to move widely in the X axis direction, allowing the angle of inclination of the slide surface 129 to be made small. Thus, the amount of change in the position in the −Z axis direction with respect to change in the position in the +X axis direction of the slide surface 129 can be made small. This allows the amount of rotation of the lens holder 106 with respect to the amount of movement of the translation member 151 to be made small, thereby facilitating a fine optical axis adjustment for the projection lens 103.

<Change in Light Ray Trajectory>

Figure 8:
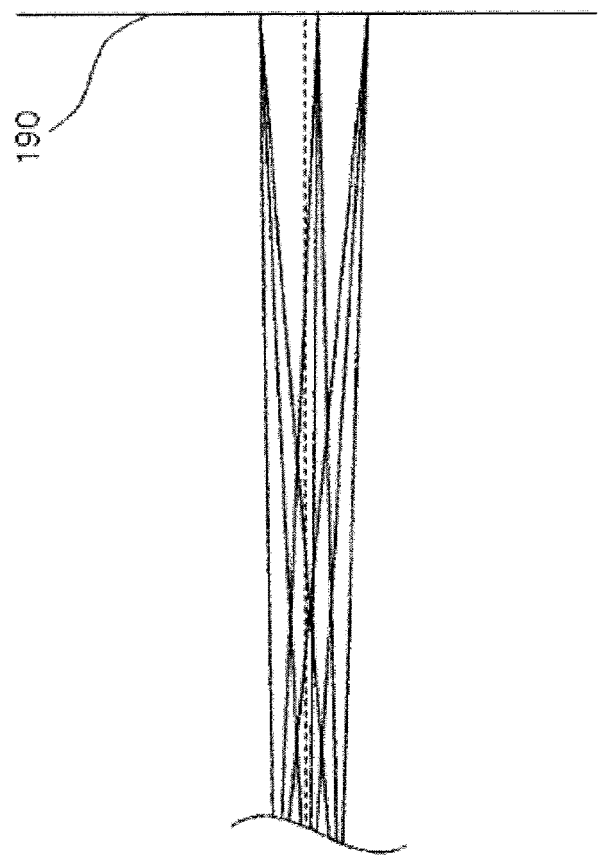
FIG. 8 is a diagram illustrating light ray trajectories when the vehicle body according to the first embodiment is tilted forward.

FIGS. 7, 8, and 9 are schematic diagrams illustrating trajectories of light rays emitted from the light source 101. FIGS. 7, 8, and 9 illustrate the light source 101, light guide member 102, and projection lens 103 without illustrating the light guide member holder 105, heat dissipation unit 126, and the like, which are not relevant to the explanation. FIGS. 7, 8, and 9 are diagrams as viewed from the +X axis direction side toward the −X axis direction side.

When a vehicle body is not tilted forward or backward, the translation member 151 is located at a position such that the lens holder 106 and projection lens 103 are located at a reference position. "Reference position" refers to a position of the lens holder 106 and projection lens 103 where light is radiated to an irradiated area in a state where the vehicle body is not tilted forward or backward. In FIG. 7, for example, it is a position where an optical axis of the projection lens 103 coincides with an optical axis of the light source 101. For example, it is the position in FIG. 6(B). Light emitted from the light source 101 passes through the light guide member 102 and is emitted from the projection lens 103. Specifically, the light emitted from the light source 101 enters the light guide member 102 and travels in the +Z axis direction inside the light guide member 102. The light emitted from the light guide member 102 enters the projection lens 103. The light passing through the projection lens 103 is emitted forward (+Z axis direction) from the projection lens 103.

FIG. 7 is a diagram illustrating light ray trajectories when the vehicle body is not tilted forward or backward. Thus, FIG. 7 illustrates the trajectories of light rays in a state where the vehicle body is parallel to the ground. FIG. 7 illustrates the trajectories of light rays such that the irradiated area is formed slightly below a position in front of the light source 101. The light emitted from the headlight has a light distribution directed downward to illuminate the ground. "Front" refers to a direction in which the vehicle travels and is the +Z axis direction in the drawing.

The irradiated surface 190 is a virtual surface in front of the vehicle. The projection lens 103 magnifies and projects light onto the irradiated surface 190 in front of the vehicle. The irradiated surface 190 is set at a predetermined position in front of the vehicle. The predetermined position in front of the vehicle is a position at which the luminous intensity or illuminance of the headlight 10 is measured, and is specified in road traffic rules or the like. For example, in Europe, United Nations Economic Commission for Europe (UNECE) specifies a position 25 m from a light source as the position at which the luminous intensity of an automobile headlight is measured. In Japan, Japanese Industrial Standards Committee (JIS) specifies a position 10 m from a light source as the position at which the luminous intensity is measured.

When the vehicle body is tilted forward, the motor 113 moves the translation member 151 in the −X axis direction. Thus, the lens holder 106 and projection lens 103 rotate in the +RX direction about the rotation pins 128a and 128b. This is the state of FIG. 6(A), for example. In this case, the direction of the light emitted from the projection lens changes to the upward direction (+Y axis direction).

FIG. 8 is a diagram illustrating trajectories of light rays in a case where the vehicle body is tilted forward. However, to simplify explanation, FIG. 8 depicts the trajectories of the light rays without tilting of the vehicle body. "Case where the vehicle body is tilted forward" refers to, for example, a case of braking and decelerating during traveling, a case where a person or a load is loaded on a passenger seat side, or the like. Actually, as illustrated in FIG. 7, the light from the headlight has a light distribution directed downward to illuminate the ground. The light distribution illustrated in FIG. 8 is directed upward as compared to the light distribution illustrated in FIG. 7. Thus, the irradiated area illustrated in FIG. 8 in a state where the vehicle body is tilted forward is formed above the irradiated area illustrated in FIG. 7. Thus, the position in the Y axis direction at which light reaches the irradiated surface 190 in FIG. 8 is on the positive side of the position in the Y axis direction at which light reaches the irradiated surface 190 in FIG. 7. Thus, actually, since the vehicle body is tilted forward, the irradiated area is formed slightly below a position in front of the light source 101 as in the state of FIG. 7. Even if the vehicle body is tilted forward, an optimum light distribution is provided as in the case where the vehicle body is not tilted forward or backward.

When the vehicle body is tilted backward, the motor 113 moves the translation member 151 in the +X axis direction. Thus, the lens holder 106 and projection lens 103 rotate in the −RX direction about the rotation pins 128a and 128b. This is the state of FIG. 6(C), for example. In this case, the direction of the light emitted from the projection lens changes to the downward direction (−Y axis direction).

FIG. 9 is a diagram illustrating trajectories of light rays in a case where the vehicle body is tilted backward. However, to simplify explanation, FIG. 9 depicts the trajectories of the light rays without tilting of the vehicle body. "Case where the vehicle body is tilted backward" refers to, for example, a case of increasing the speed and accelerating, a case where a person or a load is loaded on a rear seat, or the like. Actually, as illustrated in FIG. 7, the light from the headlight has a light distribution directed downward to illuminate the ground. The light distribution illustrated in FIG. 9 is directed downward as compared to the light distribution illustrated in FIG. 7. Thus, the irradiated area illustrated in FIG. 9 in a state where the vehicle body is tilted backward is formed below the irradiated area illustrated in FIG. 7. Thus, the position in the Y axis direction at which light reaches the irradiated surface 190 in FIG. 9 is on the negative side of the position in the Y axis direction at which light reaches the irradiated surface 190 in FIG. 7. Thus, actually, since the vehicle body is tilted backward, the irradiated area is formed slightly below a position in front of the light source 101 as in the state of FIG. 7. Even if the vehicle body is tilted backward, an optimum light distribution is provided as in the case where the vehicle body is not tilted forward or backward. Further, the headlight can provide the optimum light distribution without dazzling an oncoming vehicle.

As described above, the light guide unit 132 has a plate-like shape. Alternatively, the light guide unit 132 has a plate-like portion. On the other hand, the projection lens 103 receives light emitted from the light guide member 102 while spreading. "Light emitted while spreading" refers to light having a divergence angle. Thus, the dimension of the projection lens 103 in the Y axis direction is larger than the dimension of the light guide unit 132 in the Y axis direction. The translation member 151 of the drive unit 112 has a plate-like shape. Thus, the dimension of the translation member 151 in the Y axis direction is easily designed to be thin. Further, the feed screw 150 is a rod-like part. The feed screw 150 is disposed in parallel with the X axis. Thus, the dimension of the feed screw 150 in the Y axis direction is easily designed to be small.

In the first embodiment, the feed screw 150 and translation member 151 for rotationally driving the projection lens 103 are disposed on the +Y axis side of the light guide unit 132. The translation member 151 moves in the X axis direction along the feed screw 150 on the +Y axis side of the light guide unit 132. Specifically, the translation member 151 and feed screw 150 for driving the projection lens 103 are disposed in a portion corresponding to a difference in dimension in the Y axis direction between the projection lens 103 and the light guide unit 132. The "portion corresponding to a difference in dimension in the Y axis direction between the projection lens 103 and the light guide unit 132" corresponds to a space illustrated in FIG. 12, which will be described later. These configurations allow the projection lens 103, lens holder 106, light guide unit 132, and drive unit 112 to be easily arranged in a compact manner.

Further, the light distribution pattern of the headlight unit 100 may be a light distribution pattern for increasing illuminance at a part of a light distribution area, instead of a horizontally long shape as described above. In such a case, for example, the light distribution pattern has a square shape or the like. Thus, the emitting surface of the light guide member 102 has a square shape or the like. Even in such a case, light emitted from the emitting surface of the light guide member 102 has a divergence angle and enters the projection lens 103 while spreading. Thus, the dimension of the emitting surface of the light guide member 102 in a height direction (Y axis direction) is smaller than the dimension of the projection lens 103 in the height direction (Y axis direction). Thus, it is possible to secure a space to arrange the translation member 151 and feed screw 150, on the upper side (+Y axis direction) of the light guide member 102 or the lower side (−Y axis direction) of the light guide member 102. The same applies to embodiments described later.

A difference in dimension between the light guide member 102 and the projection lens 103 also occurs in the X axis direction. Thus, depending on the configuration of the drive unit 112, it is also possible to dispose the drive unit 112 in a space occurring in the X axis direction of the light guide member 102. The same applies to embodiments described later.

Further, by arranging the configuration of the drive unit 112 described in the first embodiment in the space occurring in the X axis direction, it is possible to easily rotate the projection lens 103 about the Y axis. It is a configuration obtained by rotating the drive unit 112 by 90 degrees about an axis parallel to the Z axis. This makes it possible to move the light distribution in the left-right direction. The same applies to embodiments described later.

Further, in a case where the drive unit 112 having a configuration for moving the translation member 151 is arranged near the plate-like light guide member 102, by arranging it on the upward or downward direction side of the light guide member 102, it is possible to easily secure the length of movement of the translation member 151. This is because, in general, in view of the light distribution pattern, the length of the light guide member 102 in the X axis direction is larger than the length of the light guide member 102 in the Y axis direction. The same applies to a slider or the like in embodiments described later.

<Modifications>

Figure 10:
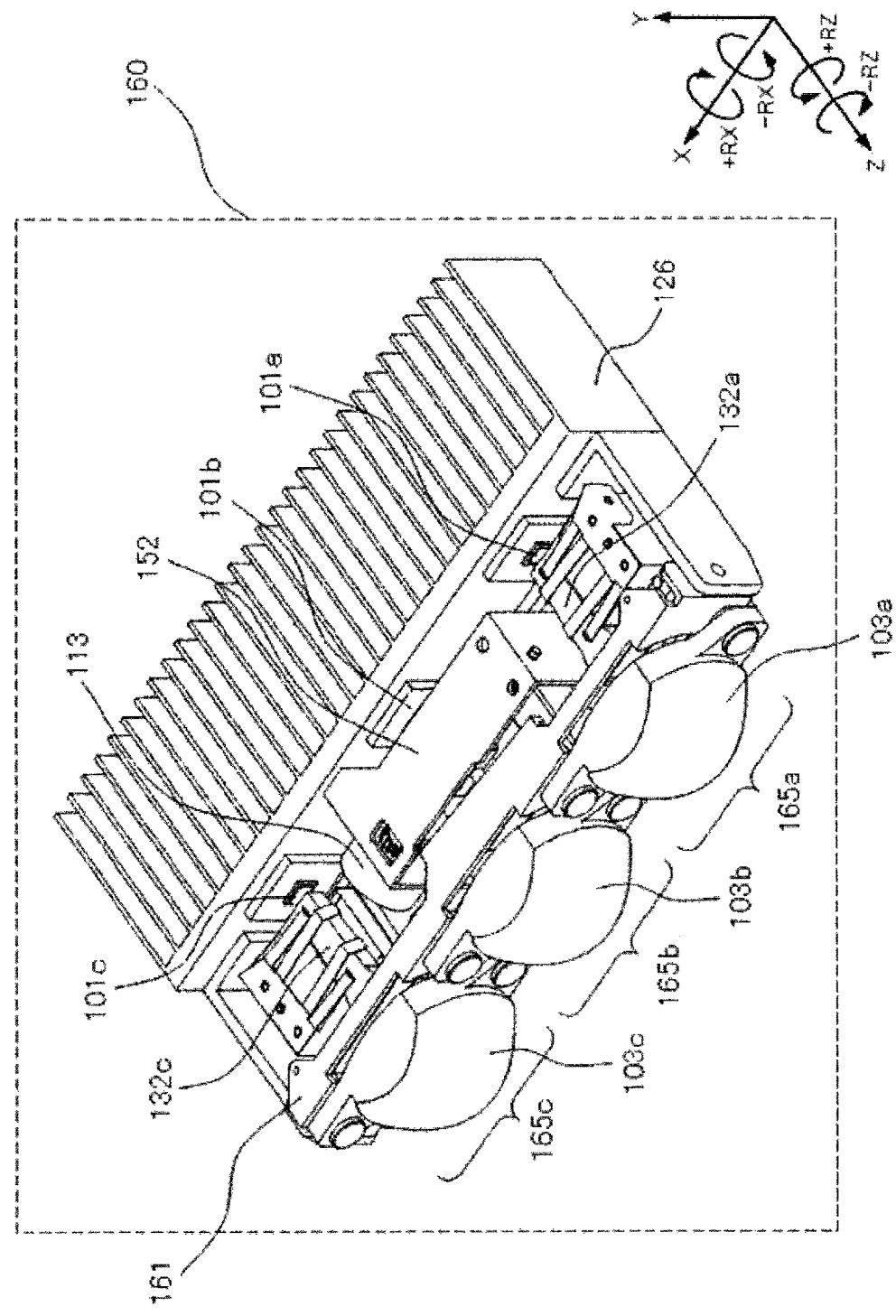
FIG. 10 is a perspective view of a headlight unit 160 according to the first embodiment.

There is a headlight that overlaps light distributions from multiple light sources to provide an illumination area. FIG. 10 is a perspective view of a headlight unit 160 configured by arranging a plurality of the headlight units 100 described in the first embodiment. In a conventional headlight using multiple light sources, optical axis adjustment is performed by integrally driving the light sources, a heat sink, a projection lens, and the like. In this case, a member that performs the optical axis adjustment is large, and an actuator, a drive mechanism, and the like that move the member are also large.

Figure 11:
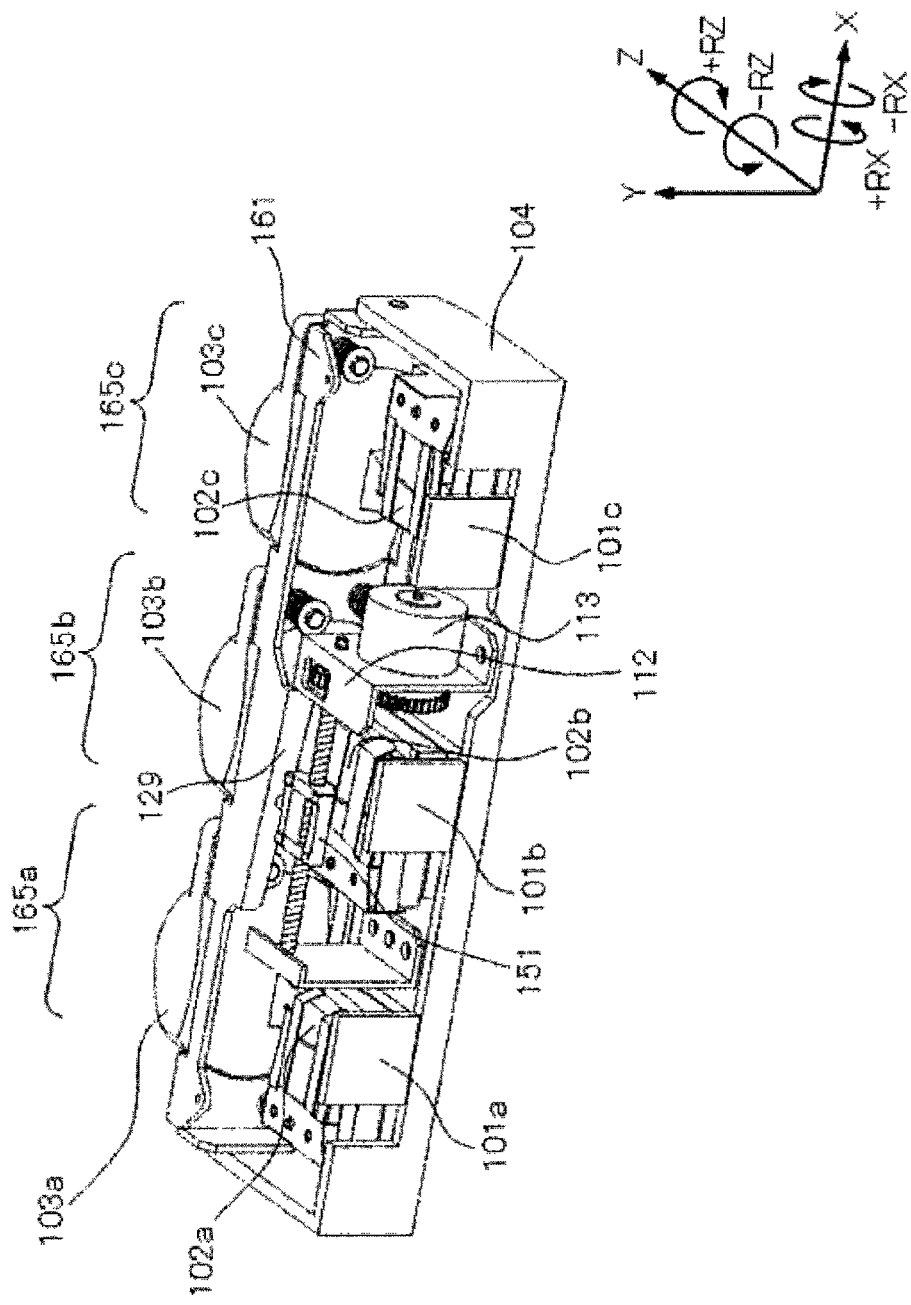
FIG. 11 is a perspective view illustrating a drive part of the headlight unit 160 according to the first embodiment.

FIG. 11 is a perspective view illustrating a drive part of the headlight unit 160 described in the first embodiment. The headlight unit 160 includes three sets of the light source 101, light guide member 102, and projection lens 103. An assembly obtained by assembling the light source 101, light guide member 102, and projection lens 103 will be referred to as a headlight module 165. Here, the base portion 104 is a common component. The headlight unit 160 uses an integrated lens holder 161 obtained by integrating the lens holders into a common component.

The headlight unit 160 includes three headlight modules 165a, 165b, and 165c. The headlight modules 165a, 165b, and 165c are arranged in parallel with the X axis. The headlight module 165a includes a light source 101a, a light guide member 102a, and a projection lens 103a, and is disposed at a position on the −X axis direction side. The headlight module 165b includes a light source 101b, a light guide member 102b, and a projection lens 103b, and is disposed at a center position in the X axis direction. The headlight module 165c includes a light source 101c, a light guide member 102c, and a projection lens 103c, and is disposed at a position on the +X axis direction side.

According to the first embodiment, even if there are a plurality of the light sources 101, the integrated lens holder 161 obtained by integrating the lens holders 106 provided in the headlight units 100 can be used. The integrated lens holder 161 holds the projection lenses 103a, 103b, and 103c so that they are arranged in the X axis direction. The projection lens 103a is held on the −X axis direction side of the integrated lens holder 161. The projection lens 103b is held at a center portion in the X axis direction of the integrated lens holder 161. The projection lens 103c is held on the +X axis direction side of the integrated lens holder 161. Thus, the projection lens 103b is disposed between the projection lens 103a and the projection lens 103c.

The integrated lens holder 161 has a slide surface 129 similar to that of the lens holder 106. The slide surface 129 is formed on the −Z axis direction side of the center portion in the X axis direction of the integrated lens holder 161. The drive unit 112 is mounted to a position of the headlight module 165b. The positional relationship between the light guide member 102b, feed screw 150, and translation member 151 in the headlight unit 160 is the same as the positional relationship between the light guide member 102, feed screw 150, and translation member 151 in the headlight unit 100. The headlight unit 160 can adjust optical axes of the projection lenses 103a, 103b, and 103c by using the drive unit 112, which is the same as that of the headlight unit 100. In FIG. 11, the top plate portion 156 of the motor holder 152 is cut away to reveal the inside of the drive unit 112.

Rotating motion of the integrated lens holder 161 simultaneously rotates the projection lenses 103a, 103b, and 103c. In response to change in attitude of the vehicle body, the translation member 151 is moved in the X axis direction by the motor 113. Thereby, the integrated lens holder 161 is rotated, and the optical axes of all the headlight modules 165a, 165b, and 165c can be adjusted. This eliminates the need for performing optical axis adjustment for each headlight module.

In the first embodiment, the slide surface 129 is provided to the lens holder 106 and the sliding pin 131 is provided to the translation member 151. However, the present invention provides the same advantages even if the slide surface 129 is provided to the translation member 151 and the sliding pin 131 is provided to the lens holder 106. However, if the sliding pin 131, which is small in the X axis direction, is provided to the translation member 151, the feed screw 150 can be made shorter. This allows the drive unit 112 to be downsized.

In the first embodiment, the projection lens 103 is mounted to the lens holder 106 and the lens holder 106 is rotatably mounted to the base portion 104. However, the way to mount the projection lens 103 to the base portion 104 is not limited to this. For example, if the projection lens 103 is made of plastic, the rotation pins 128a and 128b and the slide surface 129 can be provided directly on the projection lens 103. In this case, the lens holder 106 need not be used. However, if the rotation pins 128a and 128b and the slide surface 129 are provided directly on the projection lens 103, there is a problem that distortion is likely to occur on the lens surface or the like and it is difficult to ensure optical performance of the projection lens 103.

A rolling bearing or the like may be used to rotatably mount the lens holder 106. Further, although the projection lens 103 is mounted to the lens holder 106 by using the fixing pins 133a and 133b, the projection lens 103 may be fixed to the lens holder 106 by adhesion. The projection lens 103 may also be fixed to the lens holder 106 by screwing.

In the first embodiment, the power of the motor 113 is transmitted to the feed screw by using the gears. However, a belt and pulley may be used instead of the gears. A link mechanism may also be used. Further, the motor used in the first embodiment may be, for example, a direct current motor, a stepping motor, or an ultrasonic motor.

In the first embodiment, the light guide member 102 is mounted to the base portion 104 by using the light guide unit 132. However, the way to hold the light guide member 102 is not limited to this. A structure for holding the light guide member 102 may be provided directly to the base portion 104. In this case, at least, the adjustment base 136 or light guide member base 137 of the light guide unit 132 need not be used.

As above, in the headlight unit 100 or 160, the feed screw 150 is disposed at a position on the +Y axis direction side or the −Y axis direction side of the light guide member 102, and the sliding pin 131 of the translation member 151 is moved. This arrangement allows the translation member 151 to move without providing an additional space. This allows the headlight unit 100 or 160 to be downsized.

Figure 12:
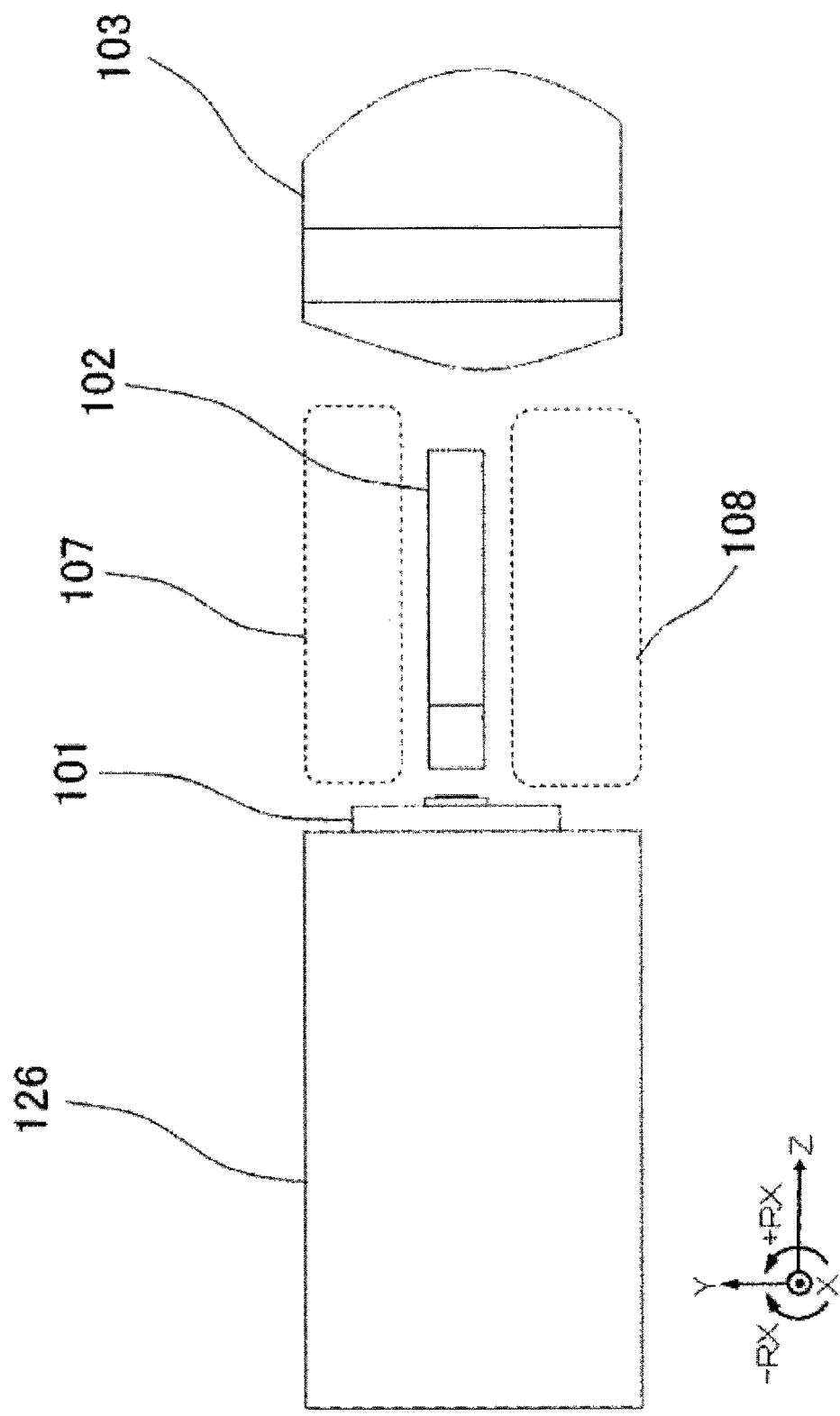
FIG. 12 is a configuration diagram illustrating the configuration of the headlight unit 100 according to the first embodiment.

FIG. 12 is a configuration diagram illustrating components of an optical system of the headlight unit 100 according to the first embodiment. A configuration of the present invention has a space 107 on the upper side (+Y axis direction) of the light guide member 102. It also has a space 108 on the lower side (−Y axis direction) of the light guide member 102. The spaces 107 and 108 are indicated by the dashed lines in FIG. 12. Thus, in the headlight unit 100 or 160, the feed screw 150 can be arranged at a position on the +Y axis direction side or the −Y axis direction side of the light guide member 102. Arranging the feed screw 150 at a position in the space 107 or 108 allows the translation member 151 to move along the feed screw 150 without requiring an additional space. This allows the headlight unit 100 or 160 to be downsized.

Specifically, the headlight unit 100 or 160 can be thinned by an amount corresponding to the height (length in the Y axis direction) of a part passing through the space 107 or 108 of the translation member 151. If the height of the translation member 151 is greater than the height of the space 107 or 108, the headlight unit 100 or 160 can be thinned by an amount corresponding to the height of the space 107 or 108. If the height of the translation member 151 is less than the height of the space 107 or 108, the headlight unit 100 or 160 can be thinned by an amount corresponding to the height of the translation member 151.

Typically, in a multi-light headlight, multiple optical modules are arranged in the left-right direction (X axis direction) of the vehicle. Thus, the thin headlight unit 100 or 160 can increase degree of freedom in design of the vehicle.

The headlight unit 100 includes the light source 101, light guide member 102, projection lens 103, and drive unit 112. The light source 101 emits a light beam for irradiating a forward area in a traveling direction. The light guide member 102 receives the light beam emitted from the light source 101 and emits planar light having a divergence angle. The projection lens 103 receives the planar light emitted from the light guide member 102 and projects it forward. The drive unit 112 changes the positional relationship between the light guide member 102 and the projection lens 103. The drive unit 112 is disposed in a region overlapping with the projection lens 103 in a direction perpendicular to an optical axis of the light guide member 102 from the light guide member 102, as optically viewed from an optical axis direction of the projection lens 103.

"Optically viewed" refers to, for example, when light emitted from the light guide member 102 is reflected by a mirror or the like and enters the projection lens 103, being viewed while the optical axis bent by the mirror or the like is changed into a straight line.

"Region" here corresponds to the space 107 or 108 illustrated in FIG. 12, for example.

The drive unit 112 includes the drive member 151 having the contact 131. The drive member 151 moves on an axis that is non-parallel to and non-intersecting with the optical axis of the light guide member 102. The slide surface 129 of the projection lens 103 and the contact 131 of the drive member 151, which moves on and in contact with the slide surface 129, are used to change the positional relationship between the light guide member 102 and the projection lens 103.

In the first embodiment, the translation member 151 is described as the drive member.

"The slide surface 129 of the projection lens 103" includes, for example, a case where the slide surface 129 is formed integrally with the projection lens 103. It also includes a case where the lens holder 106 having the slide surface 129 is mounted to the projection lens 103, as described in the first embodiment.

In the first embodiment, the feed screw 150 is disposed in parallel with the X axis. However, for example, even if the feed screw 150 is disposed in parallel with a Z-X plane and at an angle to the X axis, the same advantages can be obtained.

The drive unit 112 may include the drive member 151 having the slide surface 129. The drive member 151 moves on an axis that is non-parallel to and non-intersecting with the optical axis of the light guide member 102. The contact 131 of the projection lens 103 and the slide surface 129 of the drive member 151, which moves in contact with the contact 131, may be used to change the positional relationship between the light guide member 102 and the projection lens 103.

In the first embodiment, the slide surface 129 is provided to the lens holder 106 and the sliding pin 131 is provided to the translation member 151. However, the present invention can provide the same advantages even if the slide surface 129 is provided to the translation member 151 and the sliding pin 131 is provided to the lens holder 106.

"The contact 131 of the projection lens 103" includes, for example, a case where the contact 131 is formed integrally with the projection lens 103. It also includes a case where the lens holder 106 having the contact 131 is mounted to the projection lens 103.

The drive member 151 moves in an axial direction of the feed screw 150 due to a screw effect of the feed screw 150. Here, "screw effect" refers to an effect of a screw of converting rotating motion to linear motion.

In the first embodiment, the axial direction of the feed screw 150 is the X axis direction.

The projection lens 103 rotates about an axis parallel to a horizontal direction.

In the first embodiment, the horizontal direction is the X axis direction. Further, the axis is an axis formed by the rotation pins 128a and 128b.

The headlight unit 160 includes multiple headlight modules 165a, 165b, and 165c. The multiple headlight modules 165a, 165b, and 165c respectively include the light sources 101a, 101b, and 101c, the light guide members 102a, 102b, and 102c, and the projection lenses 103a, 103b, and 103c. The drive unit 112 collectively changes positions of the projection lenses 103a, 103b, and 103c of the multiple headlight modules 165a, 165b, and 165c.

"Respectively include" indicates, for example, that the headlight module 165a includes the light source 101a, light guide member 102a, and projection lens 103a; the headlight module 165b includes the light source 101b, light guide member 102b, and projection lens 103b; and the headlight module 165c includes the light source 101c, light guide member 102c, and projection lens 103c.

"Collectively changes" indicates, for example, that the drive unit 112 simultaneously moves the projection lenses 103a, 103b, and 103c.

The headlight unit 100 according to the first embodiment includes the light source 101, light guide member 102, projection lens 103, and drive unit 112. The light source 101 emits a light beam for irradiating a forward area in a traveling direction. The light guide member 102 receives the light beam emitted from the light source 101 and emits planar light. The projection lens 103 receives the planar light emitted from the light guide member 102 and projects it forward to form the irradiated area. The drive unit 112 changes the positional relationship between the light guide member 102 and the projection lens 103. The drive unit 112 includes the translation member (drive member) 151 having the sliding pin (contact) 131 or slide surface 129. The translation member (drive member) 151 moves on an axis that is non-parallel to and non-intersecting with the optical axis of the light guide member 102; the positional relationship is changed by using the slide surface 129 mounted to the projection lens 103 and the sliding pin (contact) 131 of the translation member (drive member) 151, which moves on and in contact with the slide surface 129, or the sliding pin (contact) 131 mounted to the projection lens 103 and the slide surface 129 of the translation member (drive member) 151, which moves in contact with the sliding pin (contact) 131.

Second Embodiment

Figure 13:
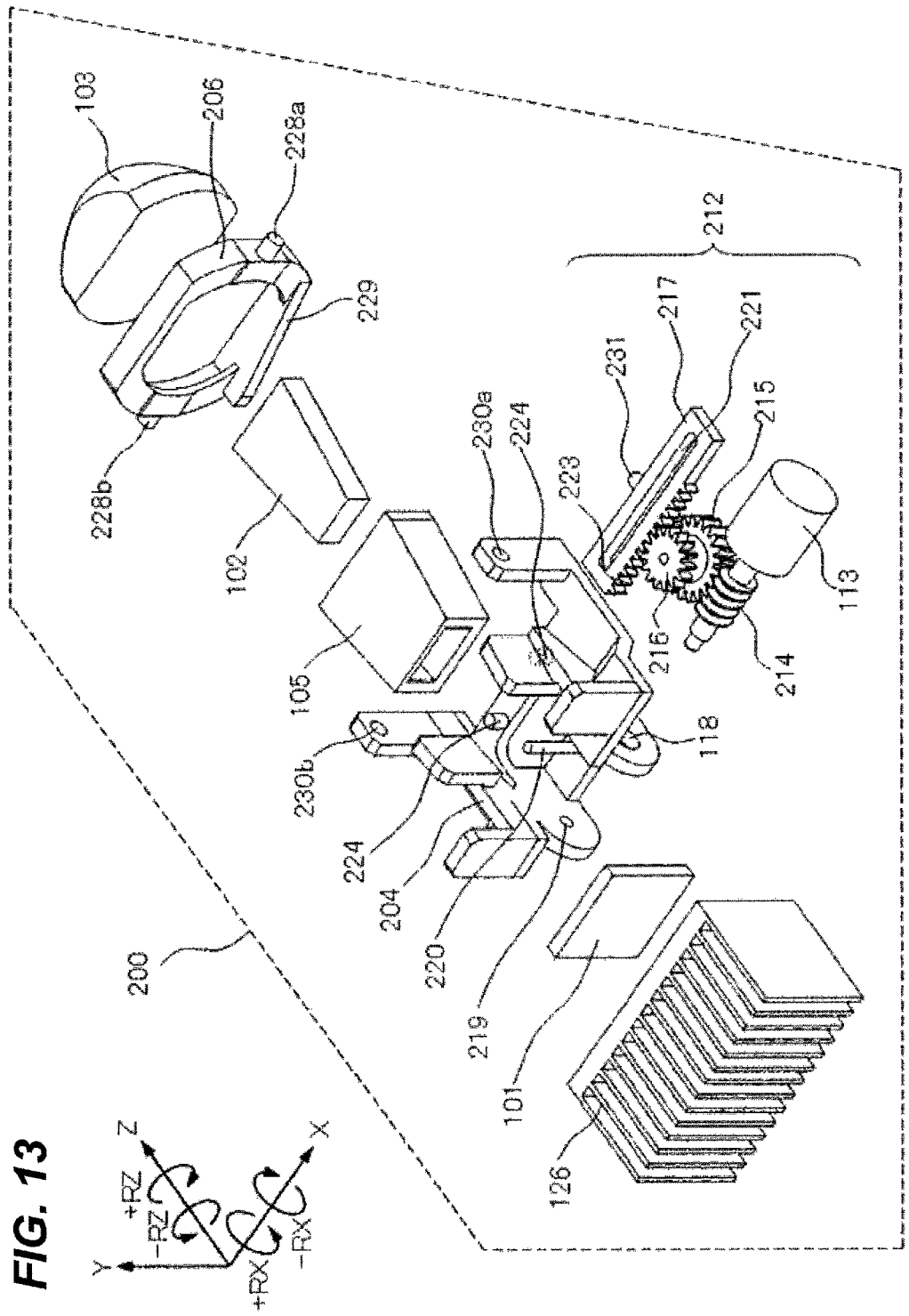
FIG. 13 is an exploded back perspective view of a headlight unit 200 according to a second embodiment.
Figure 14:
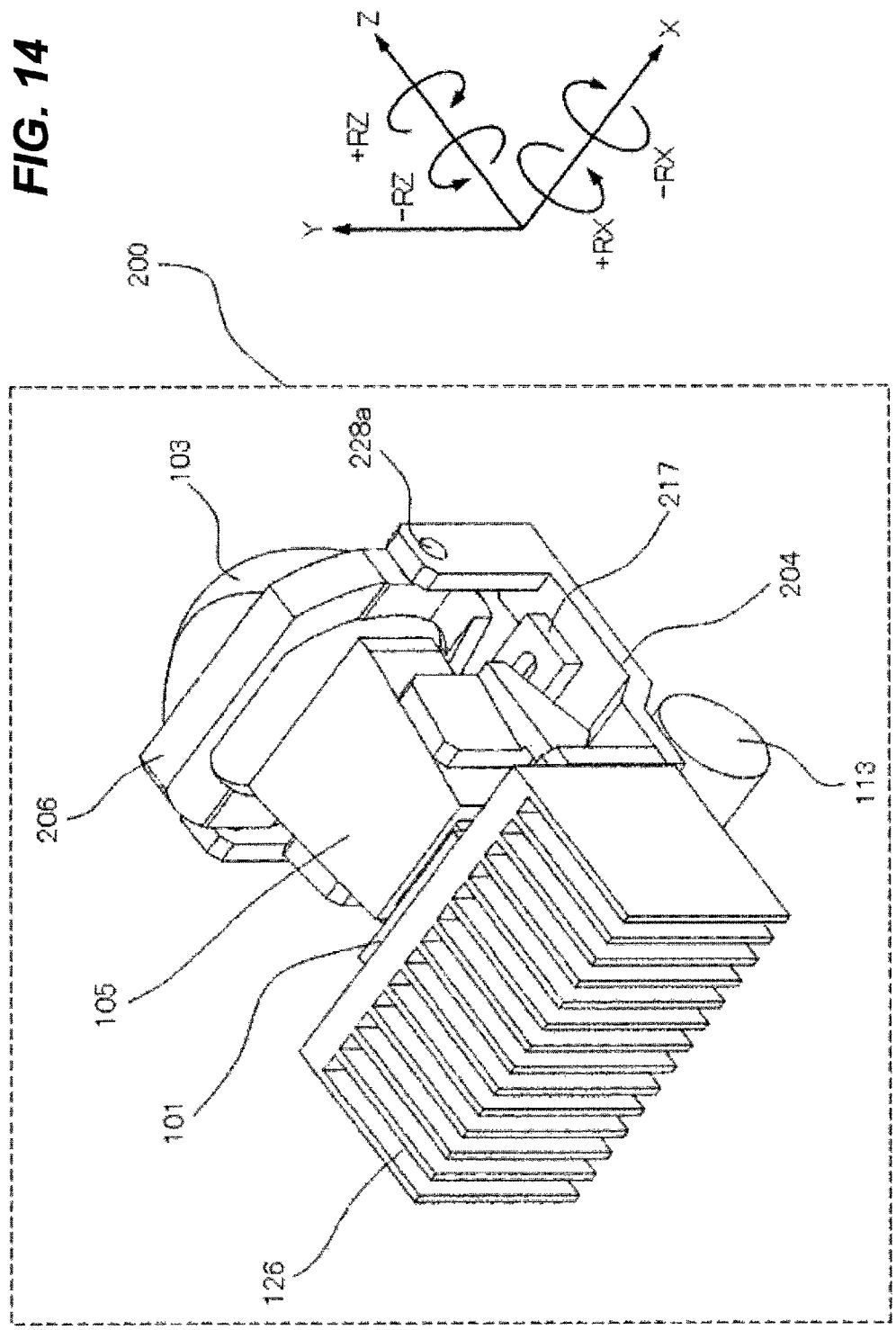
FIG. 14 is a back perspective view of the headlight unit 200 according to the second embodiment in an assembled state.
Figure 15:
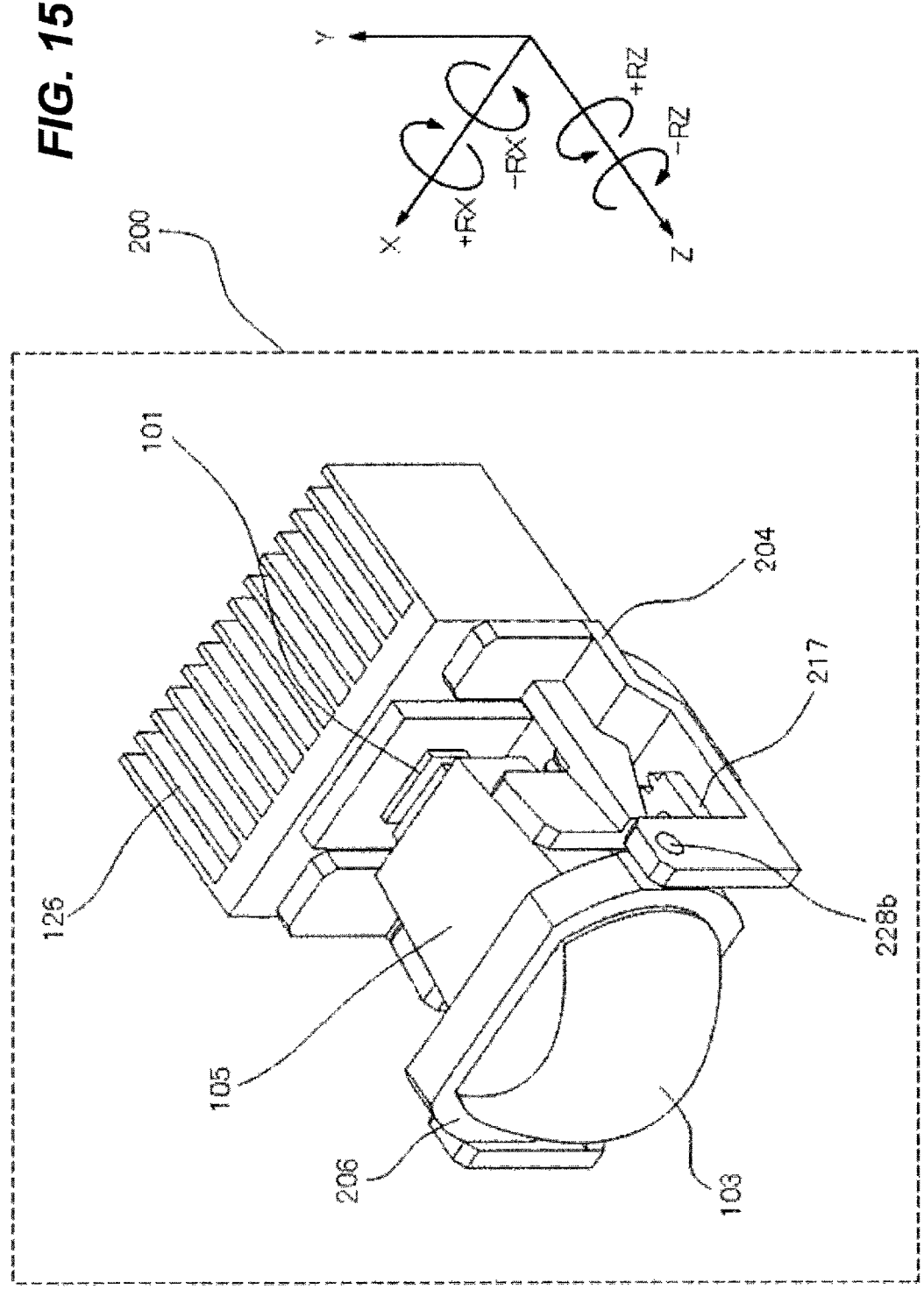
FIG. 15 is a front perspective view of the headlight unit 200 according to the second embodiment in the assembled state.

FIG. 13 is an exploded back perspective view of a headlight unit 200 according to a second embodiment. FIG. 14 is a back perspective view of the headlight unit 200 in an assembled state. FIG. 15 is a front perspective view of the headlight unit 200 in the assembled state.

To facilitate explanation, XYZ-orthogonal coordinate axes are shown in the drawings. In the following description, it will be assumed that a forward direction of the headlight unit 200 is the +Z axis direction and a backward direction is the −Z axis direction. It will be assumed that, as viewed in the forward direction, a rightward direction is the +X axis direction and a leftward direction is the −X axis direction. It will be assumed that an upward direction (direction toward the sky) of the headlight unit 200 is the +Y axis direction and a downward direction (direction toward the ground) of the headlight unit 200 is the −Y axis direction. It will be assumed that, when the headlight unit 200 is viewed from the backward direction (−Z axis direction), a clockwise direction about the Z axis is the +RZ direction and a counterclockwise direction about the Z axis is the −RZ direction. It will also be assumed that, when the headlight unit 200 is viewed from the left (−X axis direction), a clockwise direction about the X axis is the +RX direction and a counterclockwise direction about the X axis is the −RX direction.

The headlight unit 200 includes the light source 101, light guide member 102, projection lens 103, and a drive unit 212. The headlight unit 200 may also include a lens holder 206 and a base portion 204.

The headlight unit 100 uses the feed screw 150 and translation member 151 to move the sliding pin 131 in the X axis direction. The headlight unit 200 is different in that it uses a slider 217 having a rack 223 to move a sliding pin 231 in the X axis direction. "Slider" refers to a sliding part. "Sliding" refers to moving slidingly. Thus, "sliding part" refers to a part that moves slidingly.

Further, the headlight unit 160 simultaneously rotates the projection lenses 103a, 103b, and 103c by holding the projection lenses 103a, 103b, and 103c in the integrated lens holder 161. A headlight unit 260 is different in that it simultaneously rotates the projection lenses 103a, 103b, and 103c by using a connected slider 227 obtained by integrating sliders of respective headlight modules 265a, 265b, and 265c. The headlight modules 265a, 265b, and 265c include lens holders 206a, 206b, and 206c, respectively.

Elements that are the same as the elements of the headlight unit 100 described in the first embodiment will be given the same reference characters, and descriptions thereof will be omitted. The elements that are the same as the elements of the headlight unit 100 are the light source 101, light guide member 102, projection lens 103, light guide member holder 105, motor 113, and heat dissipation unit 126.

The projection lens 103 is depicted in the drawings with the flanges and holding holes 134a and 134b, which are described in the first embodiment, omitted. The descriptions will also be omitted below. Further, the light guide member holder 105 is depicted in the drawings with the adjustment base 136, light guide member base 137, and plate spring 138, which are described in the first embodiment, omitted. The descriptions will also be omitted below.

<Configuration of Headlight Unit 200>

The light source 101 is, for example, a light emitting diode (LED), a xenon lamp, a halogen lamp, or the like. An electroluminescence element, a semiconductor laser, or the like may be used as the light source 101. The following description will be made assuming that the light source 101 is an LED. The light source 101 is mounted with the heat dissipation unit 126 for releasing heat generated from the light source 101 to the outside. The light source 101 is fixed directly to the base portion 204, or is fixed to the base portion 204 via the heat dissipation unit 126.

The light guide member 102 is, for example, a light guide, a light pipe, or the like. The light guide member 102 is disposed in front (+Z axis direction) of the light source 101. The light guide member 102 is held by the light guide member holder 105. The light guide member holder 105 is held by the base portion 204. That is, the light guide member 102 is held by the base portion 204 via the light guide member holder 105. If all the surfaces of the light guide member 102 are optical surfaces as in a light guide, by holding the light guide member 102 using the light guide member holder 105, an optical influence on the light guide member 102 can be made as small as possible.

The projection lens 103 is held by the lens holder 206. The projection lens 103 transmits light emitted from the light source 101 and projects it in the forward direction (+Z axis direction). The lens holder 206 is disposed on the forward direction side (+Z axis direction side) of the light guide member 102.

The lens holder 206 includes rotation pins 228a and 228b and a slide surface 229. The rotation pins 228a and 228b are shafts parallel to the X axis. The rotation pins 228a and 228b are coaxially arranged. Thus, the rotation pin 228a and rotation pin 228b are coaxial and have an axis parallel to the X axis. The rotation pin 228a is disposed on an outer surface on the +X axis direction side of the lens holder 206. The rotation pin 228a is disposed at a center position of the lens holder 206 in the Y axis direction. The rotation pin 228a extends in the +X axis direction. The rotation pin 228b is disposed on an outer surface on the −X axis direction side of the lens holder 206. The rotation pin 228b is disposed at a center position of the lens holder 206 in the Y axis direction. The rotation pin 228b extends in the −X axis direction. The rotation pin 228a is inserted in a rotation hole 230a provided in the base portion 204. The rotation pin 228b is inserted in a rotation hole 230b provided in the base portion 204. The rotation holes 230a and 230b are holes parallel to the X axis direction. The rotation holes 230a and 230b are disposed at positions corresponding to the rotation pins 228a and 228b. The lens holder 206 is held rotatably about an axis parallel to the X axis relative to the base portion 204.

<Drive Unit 212>

The drive unit 212 includes the slider 217. The drive unit 212 may include the motor 113, a worm screw 214, a worm wheel 215, and a spur gear 216.

The motor 113 is held by the base portion 204 so that the rotational axis of the motor is parallel to the X axis. The shaft of the motor 113 is inserted in a fixing hole 118 provided in the base portion 204. The motor 113 is mounted to the base portion 204 using a screw or the like through a hole provided around the fixing hole 118, for example. The motor 113 is, for example, a direct current motor, a stepping motor, or the like. The worm screw 214 is mounted to the shaft of the motor 113. In FIG. 13, the worm screw 214 is mounted to a tip portion of the shaft of the motor 113. A tip portion of the worm screw 214 is inserted in a support hole 219 provided in the base portion 204. Thus, the rotation shaft of the motor 113 is inserted in the fixing hole 118 and a housing of the motor 113 is held by the base portion 204.

Further, the tip portion of the worm screw 214 mounted to the rotation shaft is rotatably supported in the support hole 219. The worm wheel 215 and spur gear 216 are inserted in a rotation shaft 220 provided in the base portion 204. The rotation shaft 220 is a pin parallel to the Y axis and extends from the base portion 204 in the +Y axis direction. The worm wheel 215 and spur gear 216 are held rotatably about an axis parallel to the Y axis relative to the base portion 204. The worm wheel 215 and spur gear 216 are integrated. Thus, the worm wheel 215 and spur gear 216 rotate without slippage therebetween. The worm wheel 215 and spur gear 216 have the same direction and angle of rotation.

The slider 217 has a linear motion slot 221, the sliding pin 231, and the rack 223. The slider 217 is a drive member. In FIG. 13, the slider 217 has a plate-like shape. The slider 217 has a rectangular shape. The slider 217 is disposed in parallel with a Z-X plane. The base portion 204 is provided with two linear motion pins 224. The linear motion pins 224 are pins parallel to the Y axis and extend from the base portion 204 in the +Y axis direction. The two linear motion pins 224 are arranged at an interval in parallel with the X axis. The two linear motion pins 224 are inserted in the linear motion slot 221 of the slider 217. The slider 217 can translate in the X axis direction relative to the base portion 204 while guided by the two linear motion pins 224. The slider 217 is held on the base portion 204 by the two linear motion pins 224.

The sliding pin 231 is disposed on a surface on the +Z axis side of the slider 217. In FIG. 13, the sliding pin 231 is disposed on a side surface on the +Z axis side of the slider 217. The sliding pin 231 is a pin extending in the +Z axis direction. A tip portion of the sliding pin 231 has a hemispherical shape. The sliding pin 231 is a contact against the slide surface 229.

The worm screw 214 meshes with the worm wheel 215. The spur gear 216 meshes with the rack 223. As the rotation shaft of the motor 113 rotates, the worm screw 214 rotates about an axis parallel to the X axis. As the worm screw 214 rotates, the worm wheel 215 rotates about an axis parallel to the Y axis. Simultaneously, the spur gear 216 also rotates about the axis parallel to the Y axis. As the spur gear 216 rotates, the slider 217 moves in the X axis direction while guided by the linear motion pins 224.

The sliding pin 231 of the slider 217 is disposed on the base portion 204 so as to be in contact with the slide surface 229 provided on the lens holder 206. Further, the lens holder 206 is connected to the base portion 204 by a spring (not illustrated). This spring is, for example, a tension coil spring, and rotates the lens holder 206 in a direction in which the slide surface 229 makes contact with the sliding pin 231. The spring provides the lens holder 206 with a rotational force about the rotation pins 228a and 228b. In FIG. 13, the spring provides the lens holder 206 with a rotational force in the −RX direction. The spring keeps the slide surface 229 in contact with the sliding pin 231.

For example, the lens holder 206 and base portion 204 are connected by a tension coil spring so that the lens holder 206 rotates in the −RX direction. The reason why the direction of rotation of the lens holder 206 by the tension coil spring is different from that in the first embodiment is because the slide surface 229 of the lens holder 206 is formed on the −Y axis side while the slide surface 129 of the lens holder 106 is formed on the +Y axis side.

<Motion of Lens Holder 206>

Figure 16A:
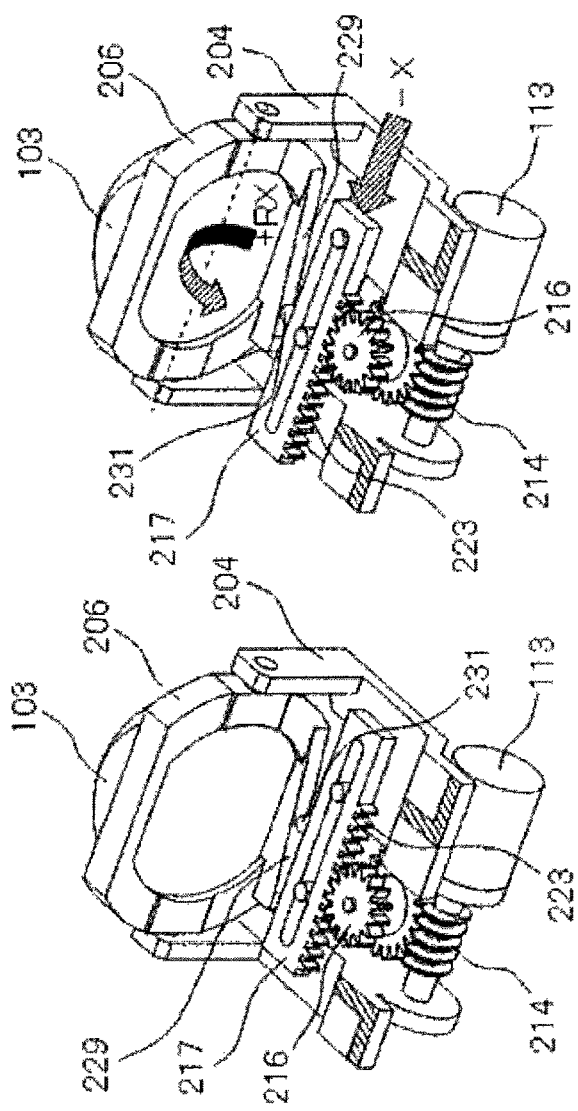
FIGS. 16(A), 16(B), and 16(C) are views illustrating the appearance of a motion of the lens holder 206 according to the second embodiment.
Figure 16B:
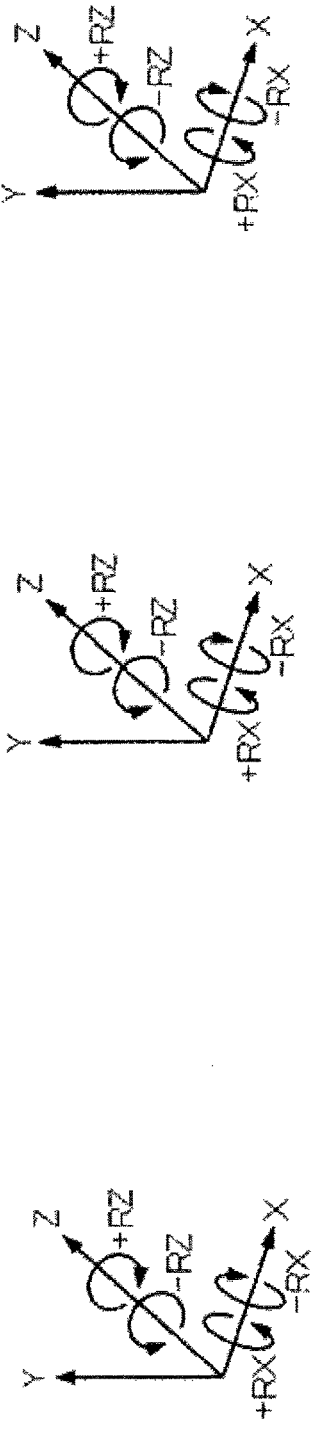
Figure 16C:
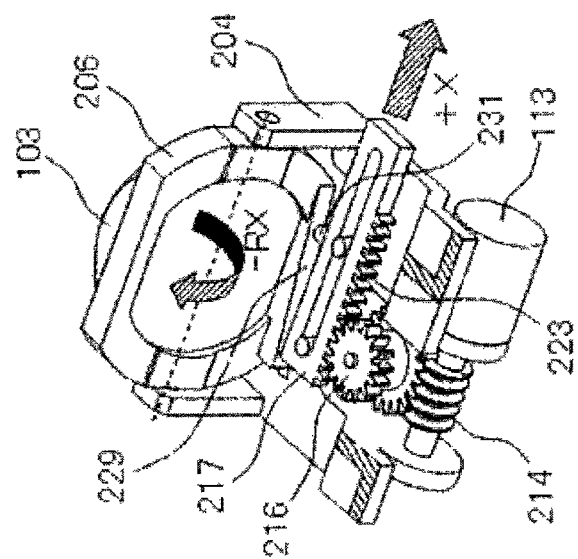

FIGS. 16(A), 16(B), and 16(C) are views illustrating the appearance of a motion of the lens holder 206 when the slider 217 is driven by the motor 113. FIG. 16(A) illustrates a state where the slider 217 is at an end position on the +X axis direction side of a movement range in the X axis direction and the lens holder 206 has rotated in the −RX direction about an axis parallel to the X axis. FIG. 16(B) illustrates a state where the slider 217 is at an intermediate position of the movement range in the X axis direction and the lens holder 206 is at an intermediate position of a rotational range about the axis parallel to the X axis. FIG. 16(C) illustrates a state where the slider 217 is at an end position on the −X axis direction side of the movement range in the X axis direction and the lens holder 206 has rotated in the +RX direction about the axis parallel to the X axis.

The slide surface 229 is a surface facing in the −Z axis direction. The slide surface 229 is inclined so that it goes in the −Z axis direction as it goes in the −X axis direction. Thus, as the slider 217 moves in the −X axis direction, the sliding pin 231 moves in the −X axis direction on the slide surface 229. "The slider 217 moves in the −X axis direction" indicates that the state changes from FIG. 16(A) to FIG. 16(B) and then to FIG. 16(C), and is illustrated in FIGS. 16(A), 16(B), and 16(C). Thus, the slide surface 229 moves in the +Z axis direction. This rotates the lens holder 206 in the +RX direction about an axis (rotation pins 228a and 228b) parallel to the X axis. The lens holder 206 is pulled in the −RX direction by the above-described spring. Thus, the lens holder 206 rotates while the slide surface 229 is in contact with the sliding pin 231.

On the other hand, as the slider 217 moves in the +X axis direction, the sliding pin 231 moves in the +X axis direction on the slide surface 229. "The slider 217 moves in the +X axis direction" indicates that the state changes from FIG. 16(C) to FIG. 16(B) and then to FIG. 16(A), and is illustrated in FIGS. 16(A), 16(B), and 16(C). Thus, the slide surface 229 moves in the −Z axis direction. This rotates the lens holder 206 in the −RX direction about the axis (rotation pins 228a and 228b) parallel to the X axis. The lens holder 206 is pulled in the −RX direction by the above-described spring. The sliding pin 231 presses the slide surface 229 in the +Z direction against the force of the spring. Thus, the lens holder 206 rotates while the slide surface 229 is in contact with the sliding pin 231.

As above, the slider 217 moves in the X axis direction to move the sliding pin 231 in the X axis direction, thereby rotating the lens holder 206 and projection lens 103 about the axis (rotation pins 228a and 228b) parallel to the X axis.

<Change in Light Ray Trajectory>

Figure 17:
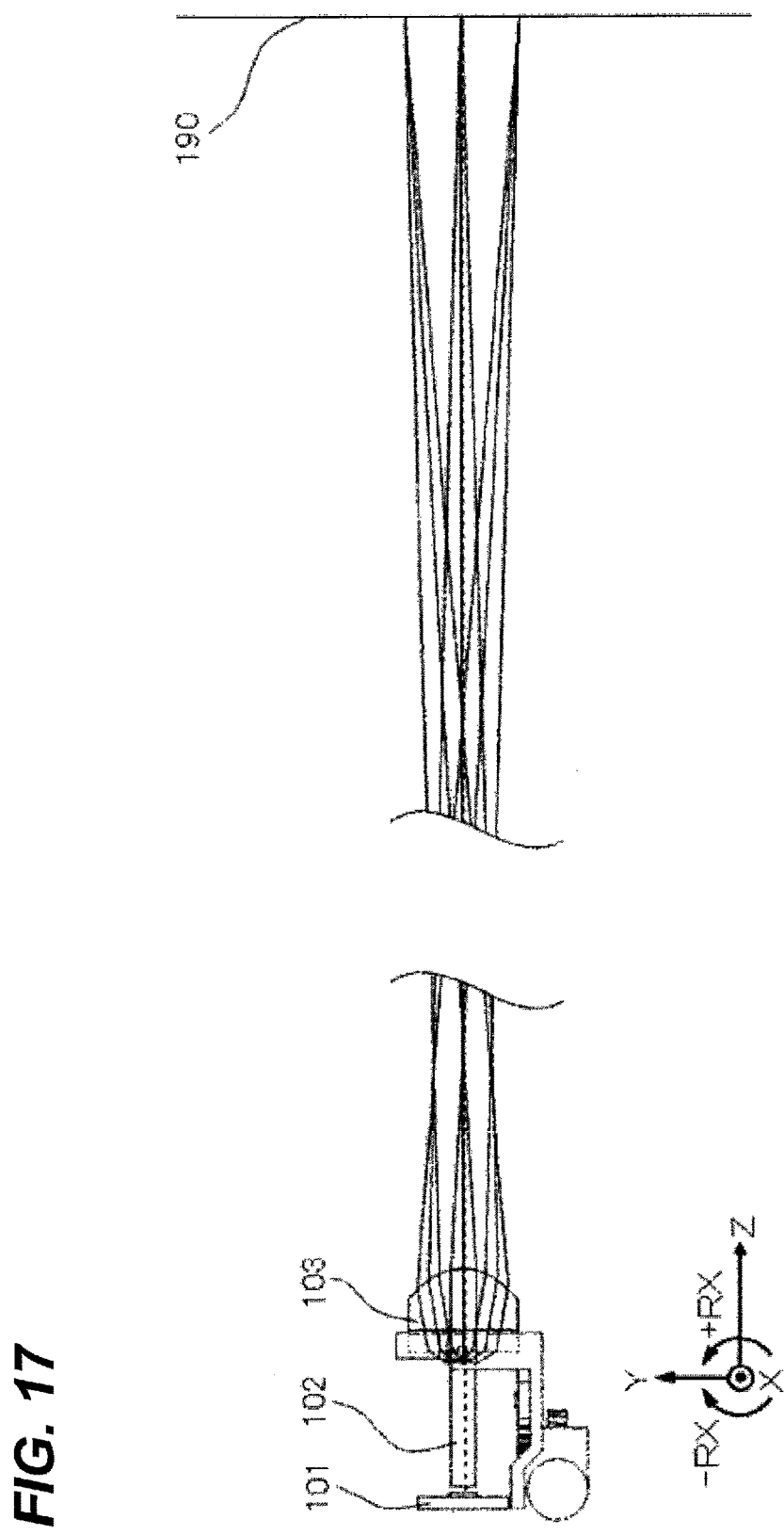
FIG. 17 is a diagram illustrating light ray trajectories when a vehicle body according to the second embodiment is not tilted forward or backward.
Figure 18:
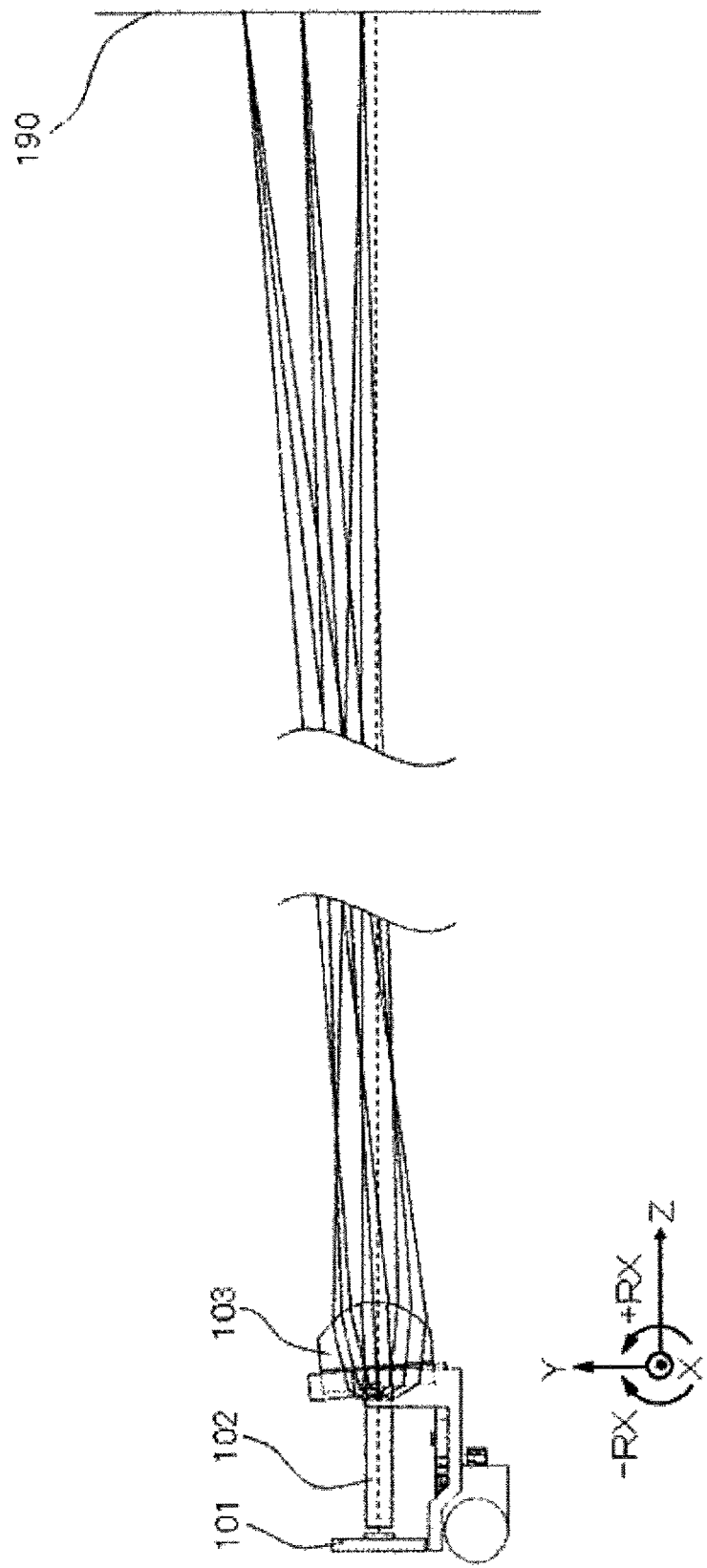
FIG. 18 is a diagram illustrating light ray trajectories when the vehicle body according to the second embodiment is tilted forward.
Figure 19:
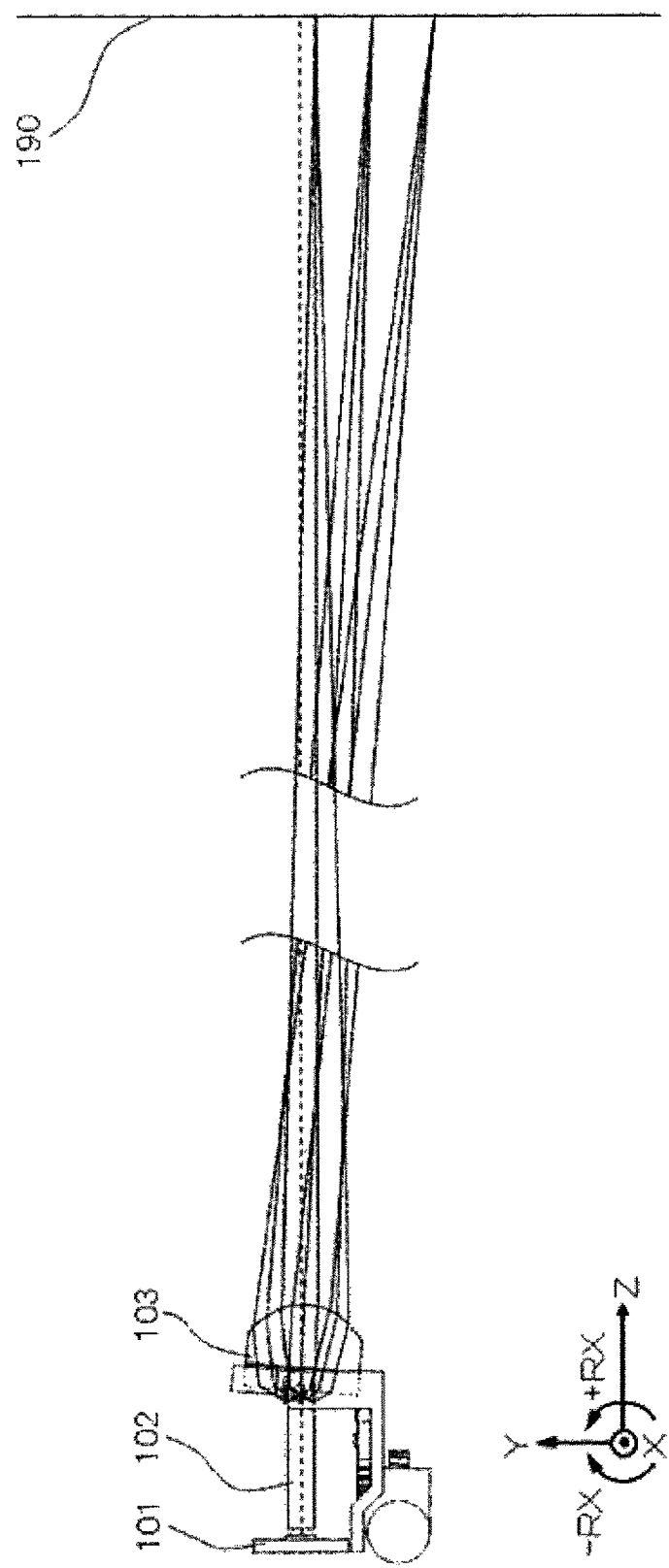
FIG. 19 is a diagram illustrating light ray trajectories when the vehicle body according to the second embodiment is tilted backward.

FIGS. 17, 18, and 19 are schematic diagrams illustrating trajectories of light rays emitted from the light source 101. FIGS. 17, 18, and 19 illustrate the light source 101, light guide member 102, and projection lens 103 without illustrating the light guide member holder 105, heat dissipation unit 126, and the like, which are not relevant to the explanation. FIGS. 17, 18, and 19 are diagrams as viewed from the +X axis direction side toward the −X axis direction side. The irradiated surface 190 in FIGS. 17, 18, and 19 is the same as the irradiated surface 190 described in the first embodiment.

When a vehicle body is not tilted forward or backward, the slider 217 is located at a position such that the lens holder 206 and projection lens 103 are located at a reference position. "Reference position" refers to a position of the lens holder 206 and projection lens 103 where light is radiated to an irradiated area in a state where the vehicle body is not tilted forward or backward. In FIG. 17, for example, it is a position where the optical axis of the projection lens 103 coincides with the optical axis of the light source 101. For example, it is the position in FIG. 16(B). Light emitted from the light source 101 passes through the light guide member 102 and is emitted from the projection lens 103. Specifically, the light emitted from the light source 101 enters the light guide member 102 and travels in the +Z axis direction inside the light guide member 102. The light emitted from the light guide member 102 enters the projection lens 103. The light passing through the projection lens 103 is emitted forward (+Z axis direction) from the projection lens 103.

FIG. 17 is a diagram illustrating light ray trajectories when the vehicle body is not tilted forward or backward. Thus, FIG. 17 illustrates the trajectories of light rays in a state where the vehicle body is parallel to the ground. In FIG. 17, a light beam projected from the projection lens 103 generally travels in parallel with the Z axis. However, actually, the light projected from the headlight has a light distribution directed downward to illuminate the ground. To simplify explanation, FIG. 17 illustrates trajectories of light rays such that the irradiated area is formed in front of the light source 101. "Front" refers to a direction in which the vehicle travels and is the +Z axis direction in the drawing. In the state of FIG. 17 where the vehicle body is not tilted forward or backward, the irradiated area is formed in front of the light source 101. This representation of the light ray trajectories is different from that in FIGS. 7, 8, and 9, which is no more than a difference in representation and does not indicate a difference in the actual manner of application to the vehicle.

When the vehicle body is tilted forward, the motor 113 moves the slider 217 in the −X axis direction. Thus, the lens holder 206 and projection lens 103 rotate in the +RX direction about the rotation pins 228a and 228b. This is the state of FIG. 16(C), for example. In this case, the direction of the light emitted from the projection lens changes to the upward direction (+Y axis direction).

FIG. 18 is a diagram illustrating trajectories of light rays in a case where the vehicle body is tilted forward. However, to simplify explanation, FIG. 18 depicts the trajectories of the light rays without tilting of the vehicle body. "Case where the vehicle body is tilted forward" refers to, for example, a case of braking and decelerating during traveling, a case where a person or a load is loaded on a passenger seat, or the like.

Actually, when a vehicle body is not tilted, the light projected from the headlight has a light distribution directed downward to illuminate the ground. However, to simplify explanation, as illustrated in FIG. 17, the description is made on the assumption that the irradiated area is formed in front of the light source 101. Thus, in FIG. 18, which illustrates a case where the vehicle body is tilted forward, the light ray trajectories of light rays emitted from the headlight is tilted forward and upward relative to the Z axis. Thus, in the state of FIG. 18 in which the vehicle body is tilted forward, the irradiated area is formed above a position in front of the light source 101.

From this, actually, since the vehicle body is tilted forward, the irradiated area is formed in front of the light source 101 as in the state of FIG. 17. Even when the vehicle body is tilted forward, an optimum light distribution is provided as in the case where the vehicle body is not tilted forward or backward.

When the vehicle body is tilted backward, the motor 113 moves the slider 217 in the +X axis direction. Thus, the lens holder 206 and projection lens 103 rotate in the −RX direction about the rotation pins 228a and 228b. This is the state of FIG. 16(A), for example. In this case, the direction of the light emitted from the projection lens changes to the downward direction (−Y axis direction).

FIG. 19 is a diagram illustrating trajectories of light rays in a case where the vehicle body is tilted backward. However, to simplify explanation, FIG. 19 depicts the trajectories of the light rays without tilting of the vehicle body. "Case where the vehicle body is tilted backward" refers to, for example, a case of increasing the speed and accelerating, a case where a person or a load is loaded on a rear seat, or the like.

Actually, when the vehicle body is not tilted, the light projected from the headlight has a light distribution directed downward to illuminate the ground. However, to simplify explanation, as illustrated in FIG. 17, the description is made on the assumption that the irradiated area is formed in front of the light source 101. Thus, in FIG. 19, which illustrates a case where the vehicle body is tilted backward, the light ray trajectories of light rays emitted from the headlight is tilted forward and downward relative to the Z axis. Thus, in the state of FIG. 19 in which the vehicle body is tilted backward, the irradiated area is formed below a position in front of the light source 101.

From this, actually, since the vehicle body is tilted backward, the irradiated area is formed in front of the light source 101 as in the state of FIG. 17. Even when the vehicle body is tilted backward, an optimum light distribution is provided as in the case where the vehicle body is not tilted forward or backward. Further, the headlight can provide the optimum light distribution without dazzling an oncoming vehicle.

In the second embodiment, the slider 217 for rotationally driving the projection lens 103 is disposed on the −Y axis side of the light guide member holder 105. The slider 217 moves in the X axis direction on the −Y axis side of the light guide member holder 105. Specifically, the slider 217 for driving the projection lens 103 is disposed in a portion corresponding to a difference in dimension in the Y axis direction between the projection lens 103 and the light guide member holder 105. These configurations allow the projection lens 103, lens holder 206, light guide member holder 105, and drive unit 212 to be easily arranged in a compact manner. The light guide member 102 is held in the light guide member holder 105. Thus, the light guide member holder 105 here corresponds to the light guide unit 132 in the first embodiment.

<Modifications>

Figure 20:
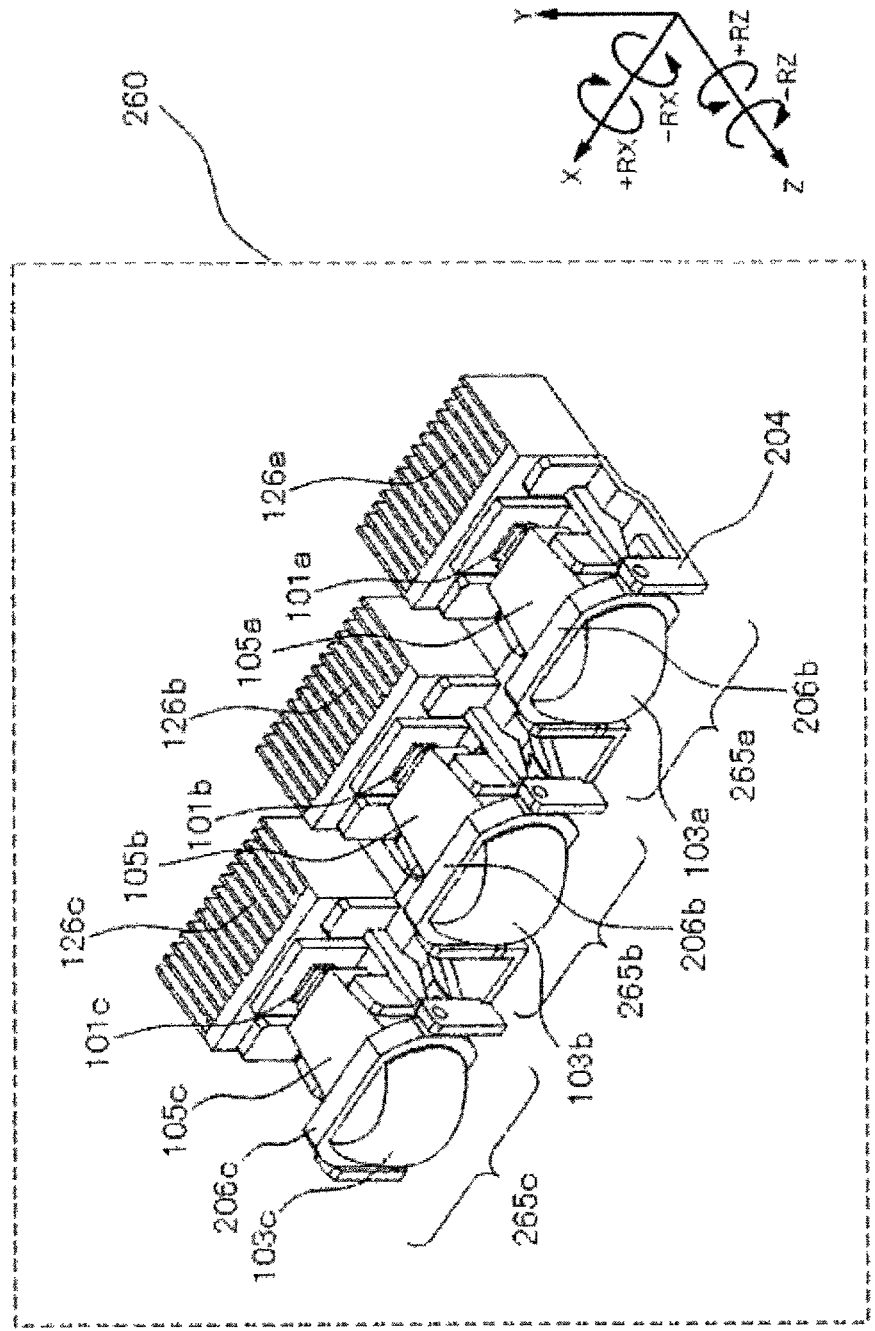
FIG. 20 is a perspective view of a headlight unit 260 configured by arranging a plurality of the headlight units 200 according to the second embodiment.

There is a headlight that overlaps light distributions from multiple light sources to provide an illumination area. FIG. 20 is a perspective view of the headlight unit 260 configured by arranging a plurality of the headlight units 200 described in the second embodiment. In a conventional headlight using multiple light sources, optical axis adjustment is performed by integrally driving the light sources, a heat sink, a projection lens, and the like. In this case, a member that performs the optical axis adjustment is large, and an actuator, a drive mechanism, and the like that move the member are also large.

The headlight unit 260 includes three sets of the light source 101, light guide member 102, and projection lens 103. The heat dissipation unit 126 is provided for each of the light sources 101a, 101b, and 101c. However, as described in the first embodiment, a single heat dissipation unit may be configured by integrating the heat dissipation units 126. An assembly obtained by assembling the light source 101, light guide member 102, and projection lens 103 will be referred to as a headlight module 265. The headlight module 265 may include the lens holder 206.

Figure 21:
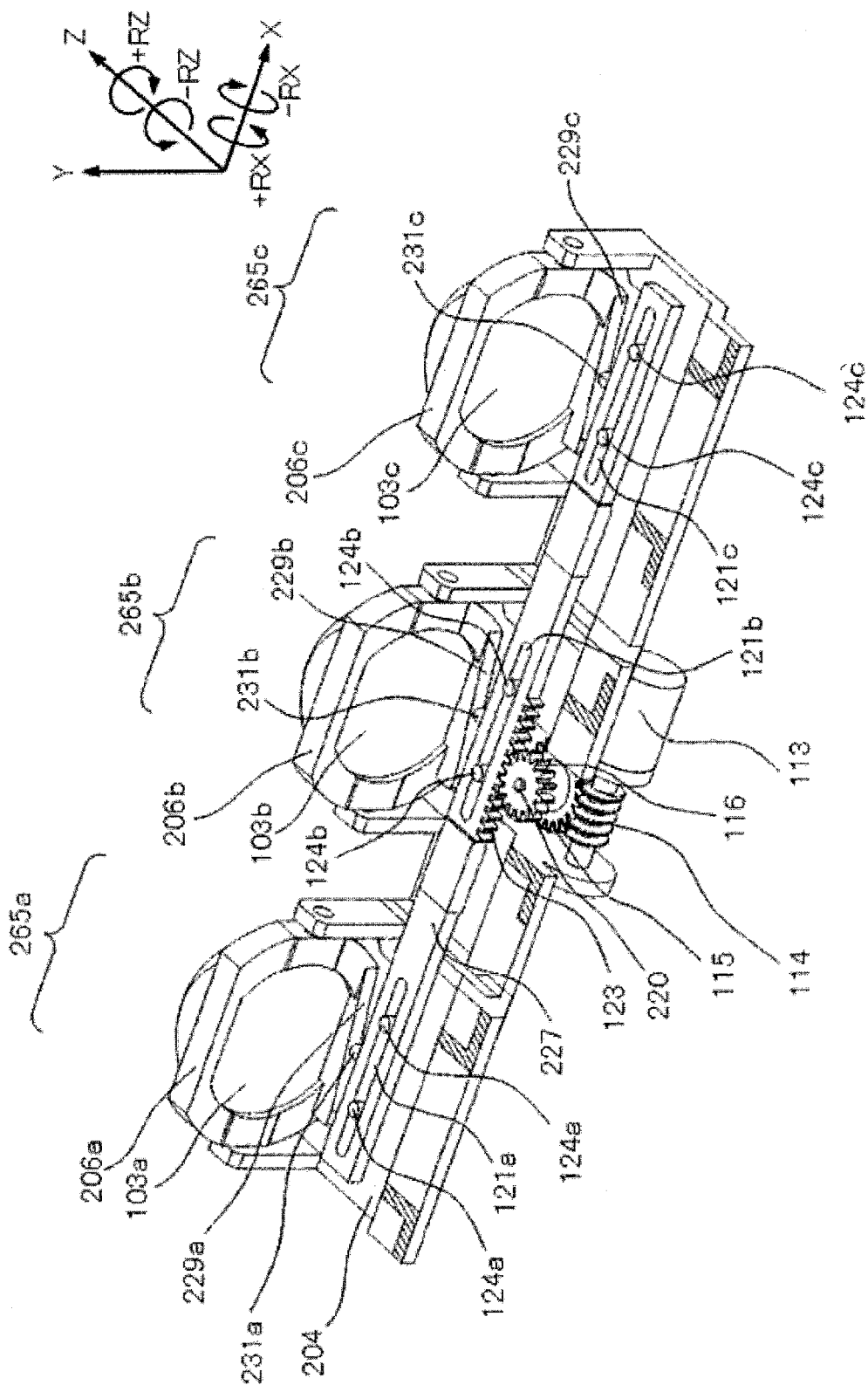
FIG. 21 is a perspective view illustrating a drive part of the headlight unit 260 according to the second embodiment.

FIG. 21 is a perspective view illustrating a drive part of the headlight unit 260 described in the second embodiment. The headlight unit 260 includes the three headlight modules 265a, 265b, and 265c. The headlight modules 265a, 265b, and 265c are arranged in parallel with the X axis. However, optical axes of the projection lenses 103a, 103b, and 103c of the headlight modules 265a, 265b, and 265c may be arranged to be mutually displaced in the Y axis direction. Further, the projection lenses 103a, 103b, and 103c of the headlight modules 265a, 265b, and 265c may be arranged to be mutually displaced in the Z axis direction. These arrangements can be easily achieved by changing the positional relationship between the lens holders 206a, 206b, and 206c and the projection lenses 103a, 103b, and 103c. These arrangements makes it possible to arrange the headlight modules 265a, 265b, and 265c with a degree of freedom and improve the design of the headlight.

The headlight module 265a includes the light source 101a, light guide member 102a, and projection lens 103a, and is disposed at a position on the −X axis direction side. The headlight module 265a may include the lens holder 206a. The headlight module 265b includes the light source 101b, light guide member 102b, and projection lens 103b, and is disposed at a center position in the X axis direction. The headlight module 265b may include the lens holder 206b. The headlight module 265c includes the light source 101c, light guide member 102c, and projection lens 103c, and is disposed at a position on the +X axis direction side. The headlight module 265c may include the lens holder 206c. The light guide member 102a is held in a light guide member holder 105a. The light guide member 102b is held in a light guide member holder 105b. The light guide member 102c is held in a light guide member holder 105c.

According to the second embodiment, even if there are a plurality of the light sources 101, the headlight unit 260 can be simply configured by integrating the sliders 217 provided in the headlight units 200. The connected slider 227 is obtained by integrating the three sliders 217. The connected slider 227 is a drive member. The connected slider 227 is a plate-like member. In FIG. 21, the connected slider 227 is a plate-like member long in the X axis direction. The connected slider 227 has a linear motion slot 121a on the −X axis direction side thereof. The connected slider 227 has a linear motion slot 121b at a center position thereof in the X axis direction. The connected slider 227 has a linear motion slot 121c on the +X axis direction side thereof. Thus, the linear motion slot 121b is disposed between the linear motion slot 121a and the linear motion slot 121c.

A rack 123 is formed on the −Z axis direction side of the connected slider 227. In FIG. 21, the rack 123 is formed on the −Z axis direction side at a center position of the connected slider 227 in the X axis direction. Thus, the drive unit 212 is disposed at a position of the headlight module 265b. However, the drive unit 212 may be disposed at a position of the headlight module 265a. The drive unit 212 may also be disposed at a position of the headlight module 265c.

The base portion 204 includes linear motion pins 124a, 124b, and 124c. The linear motion pins 124a are inserted in the linear motion slot 121a. The linear motion pins 124b are inserted in the linear motion slot 121b. The linear motion pins 124c are inserted in the linear motion slot 121c. In FIG. 21, the number of the linear motion pins 124a, the number of the linear motion pins 124b, and the number of the linear motion pins 124c are each two, but may be each one. Also, a total of two linear motion pins 124 including the linear motion pins 124a and 124c at both ends in the X axis direction may be provided.

The motor 113 is held by the base portion 204. A worm wheel 115 and a spur gear 116 are also mounted to the base portion 204. A worm screw 114 meshes with the worm wheel 115. The spur gear 116 meshes with the rack 123. As the shaft of the motor 113 rotates, the worm screw 114 mounted to the shaft of the motor 113 rotates. As the worm screw 114 rotates, the worm wheel 115 and spur gear 116 rotate about the rotation shaft 220. As the spur gear 116 rotates, the rack 123 moves in the X axis direction and the connected slider 227 moves in the X axis direction.

The lens holders 206a, 206b, and 206c have slide surfaces 229a, 229b, and 229c. The connected slider 227 has sliding pins 231a, 231b, and 231c respectively corresponding to the slide surfaces 229a, 229b, and 229c.

When an optical axis is adjusted in response to change in attitude of the vehicle body, the connected slider 227 is moved in the X axis direction by the motor 113. As the connected slider 227 moves in the X axis direction, the sliding pins 231a, 231b, and 231c move in the X axis direction. As the sliding pins 231a, 231b, and 231c move in the X axis direction, the slide surfaces 229a, 229b, and 229c rotate about an axis parallel to the X axis. As the slide surfaces 229a, 229b, and 229c rotate about the axis parallel to the X axis, the lens holders 206a, 206b, and 206c and the projection lenses 103a, 103b, and 103c rotate about axes parallel to the X axis.

According to the second embodiment, even when there are a plurality of the light sources 101, by using the connected slider 227, it is possible to adjust the optical axis by a single actuator. Further, by changing the angles of inclination of the slide surfaces 229a, 229b, and 229c, it is possible to adjust the amounts and speeds of rotation of the respective lens holders 206a, 206b, and 206c about the axes parallel to the X axis. When multiple optical systems different in optical characteristics are used, the amounts of adjustment of optical axes of the respective optical systems may be different. In such a case, the amounts of adjustment of optical axes appropriate for the respective optical systems are required. According to the second embodiment, even in such a case, an optimum optical axis adjustment can be performed.

In the second embodiment, the heat dissipation unit 126 is provided to release heat generated by the light source 101. However, if the light source 101 is fixed directly to the base portion 204 and the base portion 204 can dissipate the heat by itself, the heat dissipation unit 126 is not necessarily required. The same applies to the first embodiment and a third embodiment described later.

The second embodiment employs a configuration including the light source 101, light guide member 102, projection lens 103, base portion 204, and drive unit 212. However, elements of the second embodiment are not limited to these. For example, a lens for controlling a light distribution may be provided between the light source 101 and the light guide member 102. The projection lens 103 may be composed of one lens. The projection lens 103 may also be composed using multiple lenses. The same applies to the first embodiment and the third embodiment described later.

The second embodiment uses the light guide member holder 105 to hold the light guide member 102 on the base portion 204. However, the way to hold the light guide member 102 is not limited to this. It is also possible to directly provide a structure for holding the light guide member 102 to the base portion 204. In this case, the light guide member holder 105 need not be used. The same applies to the first embodiment and the third embodiment described later.

The second embodiment uses the drive unit 212 to move the slider 217 in the X axis direction. However, the way to move the slider 217 is not limited to this. For example, the direct current motor 113 may be a stepping motor or an ultrasonic motor. The translational movement of the slider 217 may be implemented by using a feed screw mechanism. It may also be implemented by using a belt and pulley. It may also be implemented by using a link mechanism.

In the second embodiment, the slide surface 229 is provided to the lens holder 206 and the sliding pin 231 is provided to the slider 217. However, even if the slide surface 229 is provided to the slider 217 and the sliding pin 231 is provided to the lens holder 206, the same advantages are obtained.

The second embodiment uses the lens holder 206 to rotatably mount the projection lens 103 to the base portion 204. However, the way to mount the projection lens 103 is not limited to this. For example, if the projection lens 103 is made of plastic, the rotation pins 228a and 228b and the slide surface 229 can be provided directly to the projection lens 103. In this case, the lens holder 206 need not be used. However, if the rotation pins 228a and 228b and the slide surface 229 are provided directly to the projection lens 103, there is a problem that distortion is likely to occur on the lens surface or the like and it is difficult to ensure optical performance of the projection lens 103.

As above, the slider 217 is disposed at a position on the +Y axis direction side or −Y axis direction side of the light guide member 102, and the headlight unit 200 moves the sliding pin 231 of the slider 217. This arrangement allows the slider 217 to move without providing an additional space. This allows the headlight unit 200 to be downsized.

The connected slider 227 is disposed at a position on the +Y axis direction side or −Y axis direction side of the light guide member 102, and the headlight unit 260 moves the sliding pins 231a, 231b, and 231c of the connected slider 227. This arrangement allows the connected slider 227 to move without providing an additional space. This allows the headlight unit 260 to be downsized.

Specifically, the headlight unit 200 or 260 can be thinned by an amount corresponding to the height (length in the Y axis direction) of a part passing through the space 107 or 108 illustrated in FIG. 12 of the slider 217 or connected slider 227. If the height of the slider 217 or connected slider 227 is greater than the height of the space 107 or 108, the headlight unit 200 or 260 can be thinned by an amount corresponding to the height of the space 107 or 108. If the height of the slider 217 or connected slider 227 is less than the height of the space 107 or 108, the headlight unit 200 or 260 can be thinned by an amount corresponding to the height of the slider 217 or connected slider 227.

The headlight unit 200 includes the light source 101, light guide member 102, projection lens 103, and drive unit 212. The light source 101 emits a light beam for irradiating a forward area in a traveling direction. The light guide member 102 receives the light beam emitted from the light source 101 and emits planar light having a divergence angle. The projection lens 103 receives the planar light emitted from the light guide member 102 and projects it forward. The drive unit 212 changes the positional relationship between the light guide member 102 and the projection lens 103. The drive unit 212 is disposed in a region overlapping with the projection lens 103 in a direction perpendicular to an optical axis of the light guide member 102 from the light guide member 102, as optically viewed from an optical axis direction of the projection lens 103.

"Optically viewed" refers to, for example, when light emitted from the light guide member 102 is reflected by a mirror or the like and enters the projection lens 103, being viewed while the optical axis bent by the mirror or the like is changed into a straight line.

"Region" here corresponds to the space 107 or 108 illustrated in FIG. 12 in the first embodiment, for example.

The drive unit 212 includes the drive member 217 having the contact 231. The drive member 217 moves on an axis that is non-parallel to and non-intersecting with the optical axis of the light guide member 102. The slide surface 229 of the projection lens 103 and the contact 231 of the drive member 217, which moves on and in contact with the slide surface 229, are used to change the positional relationship between the light guide member 102 and the projection lens 103.

In the second embodiment, the slider 217 is described as the drive member.

"The slide surface 229 of the projection lens 103" includes, for example, a case where the slide surface 229 is formed integrally with the projection lens 103. It also includes a case where the lens holder 206 having the slide surface 229 is mounted to the projection lens 103, as described in the second embodiment.

In the second embodiment, the slider 217 moves in parallel with the X axis. However, for example, even if the slider 217 is moved in parallel with a Z-X plane and at an angle to the X axis, the same advantages can be obtained. In this case, the sliding pin 231 moves in the Z axis direction while moving in the X axis direction. This provides the same effects as those by the inclination of the slide surface 229.

The drive unit 212 may include the drive member 217 having the slide surface 229. The drive member 217 moves on an axis that is non-parallel to and non-intersecting with the optical axis of the light guide member 102. The contact 231 of the projection lens 103 and the slide surface 229 of the drive member 217, which moves in contact with the contact 231, may be used to change the positional relationship between the light guide member 102 and the projection lens 103.

In the second embodiment, the slide surface 229 is provided to the lens holder 206 and the sliding pin 231 is provided to the slider 217. However, the present invention can provide the same advantages even if the slide surface 229 is provided to the slider 217 and the sliding pin 231 is provided to the lens holder 206.

"The contact 231 of the projection lens 103" includes, for example, a case where the contact 231 is formed integrally with the projection lens 103. It also includes a case where the lens holder 206 having the contact 231 is mounted to the projection lens 103.

The drive member 217 is a plate-like slider.

In the second embodiment, the slider 217 is described as the drive member.

The projection lens 103 rotates about an axis parallel to a horizontal direction.

In the second embodiment, the horizontal direction is the X axis direction. Further, the axis is an axis formed by the rotation pins 228a and 228b.

The headlight unit 260 includes the multiple headlight modules 265a, 265b, and 265c. The multiple headlight modules 265a, 265b, and 265c respectively include the light sources 101a, 101b, and 101c, the light guide members 102a, 102b, and 102c, and the projection lenses 103a, 103b, and 103c. The drive unit 212 collectively changes positions of the projection lenses 103a, 103b, and 103c of the multiple headlight modules 265a, 265b, and 265c.

"Respectively include" indicates, for example, that the headlight module 265a includes the light source 101a, light guide member 102a, and projection lens 103a; the headlight module 265b includes the light source 101b, light guide member 102b, and projection lens 103b; and the headlight module 265c includes the light source 101c, light guide member 102c, and projection lens 103c.

"Collectively changes" indicates, for example, that the drive unit 212 simultaneously moves the projection lenses 103a, 103b, and 103c.

The headlight unit 200 according to the second embodiment includes the light source 101, light guide member 102, projection lens 103, and drive unit 212. The light source 101 emits a light beam for irradiating a forward area in a traveling direction. The light guide member 102 receives the light beam emitted from the light source 101 and emits planar light. The projection lens 103 receives the planar light emitted from the light guide member 102 and projects it forward to form the irradiated area. The drive unit 212 changes the positional relationship between the light guide member 102 and the projection lens 103. The drive unit 212 includes the slider (drive member) 217 having the sliding pin (contact) 231 or slide surface 229, The slider (drive member) 217 moves on an axis that is non-parallel to and non-intersecting with the optical axis of the light guide member 102; the positional relationship is changed by using the slide surface 229 mounted on the projection lens 103 and the sliding pin (contact) 231 of the slider (drive member) 217, which moves on and in contact with the slide surface 229, or the sliding pin (contact) 231 mounted to the projection lens 103 and the slide surface 229 of the slider (drive member) 217, which moves in contact with the sliding pin (contact) 231.

The headlight unit 260 according to the second embodiment includes the light sources 101a, 101b, and 101c, the light guide members 102a, 102b, and 102c, the projection lenses 103a, 103b, 103c, and the drive unit 212. The light sources 101a, 101b, and 101c emit light beams for irradiating a forward area in a traveling direction. The light guide members 102a, 102b, and 102c receive the light beams emitted from the light sources 101a, 101b, and 101c and emit planar light. The projection lenses 103a, 103b, and 103c receive the planar light emitted from the light guide members 102a, 102b, and 102c and project it forward to form the irradiated area. The drive unit 212 changes the positional relationship between the light guide members 102a, 102b, and 102c and the projection lenses 103a, 103b, and 103c. The drive unit 212 includes the connected slider (drive member) 227 having the sliding pins (contacts) 231a, 231b, and 231c or slide surfaces 229a, 229b, and 229c. The connected slider (drive member) 227 moves on an axis that is non-parallel to and non-intersecting with the optical axes of the light guide members 102a, 102b, and 102c; the positional relationship is changed by using the slide surfaces 229a, 229b, and 229c mounted to the projection lenses 103a, 103b, and 103c and the sliding pins (contacts) 231a, 231b, 231c of the connected slider (drive member) 227, which move on and in contact with the slide surfaces 229a, 229b, and 229c, or the sliding pins (contacts) 231a, 231b, and 231c mounted to the projection lenses 103a, 103b, and 103c and the slide surfaces 229a, 229b, and 229c of the connected slider (drive member) 227, which move in contact with the sliding pins (contacts) 231a, 231b, and 231c.

Third Embodiment

Figure 22:
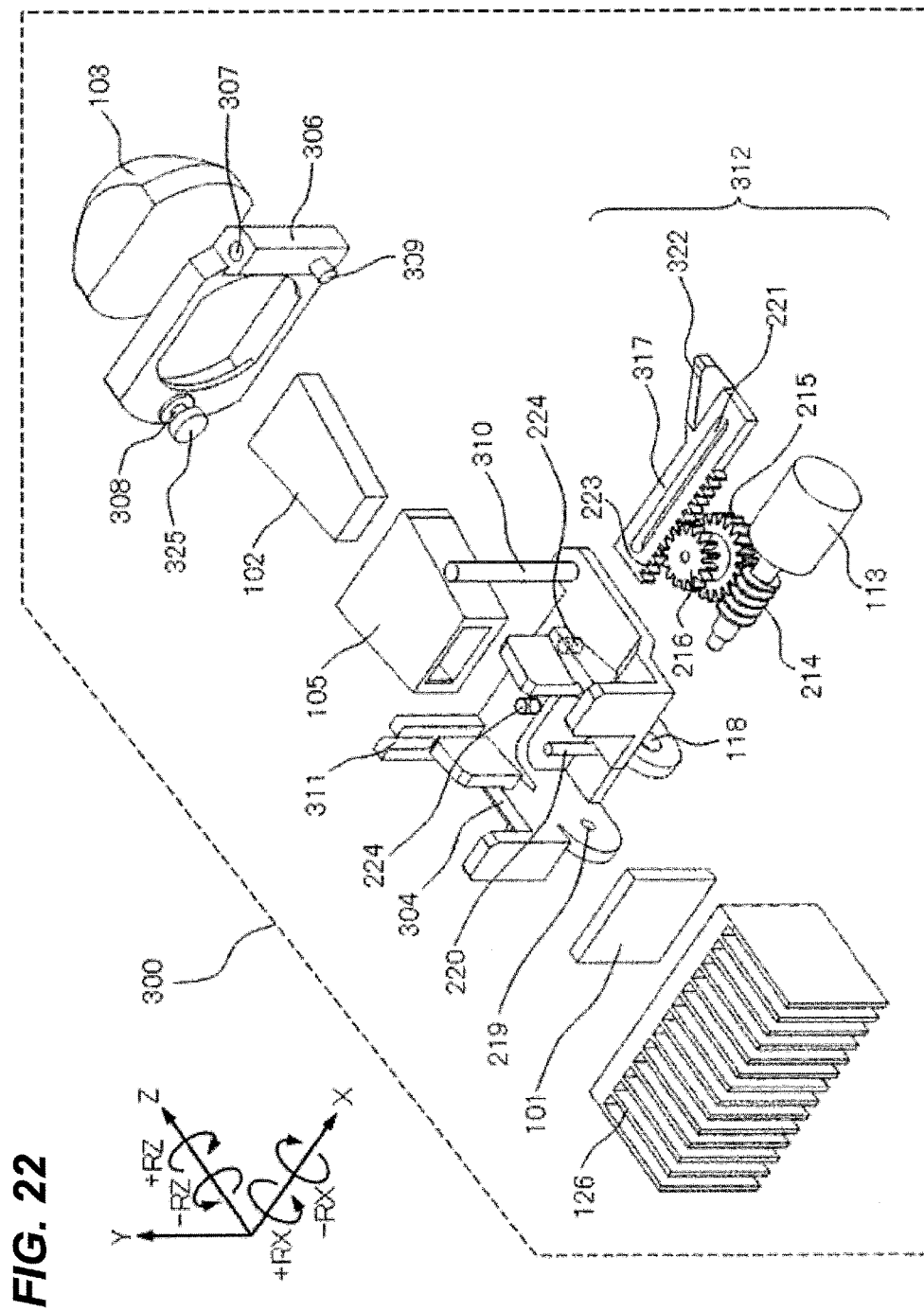
FIG. 22 is an exploded back perspective view of a headlight unit 300 according to a third embodiment.
Figure 23:
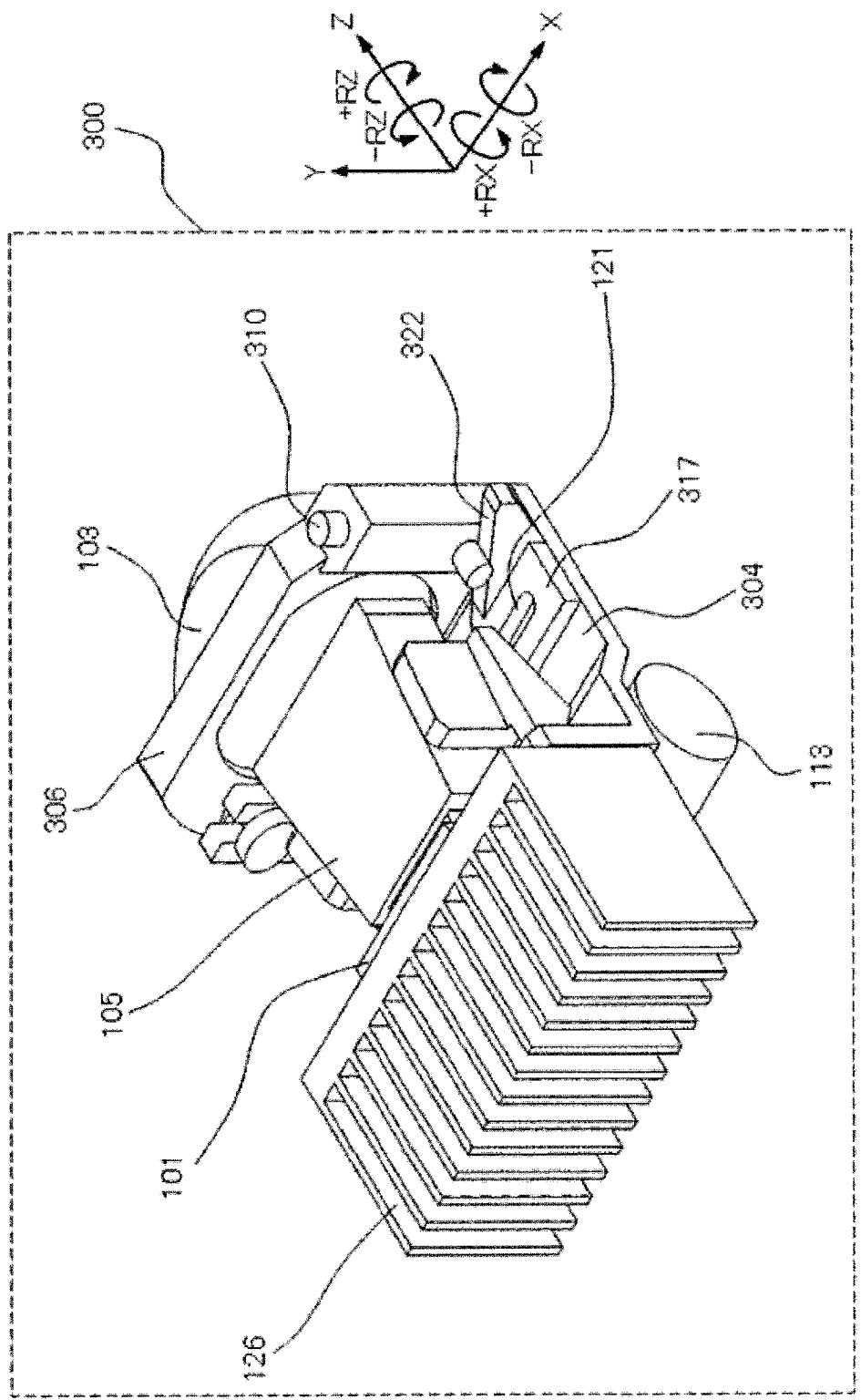
FIG. 23 is a back perspective view of the headlight unit 300 according to the third embodiment in an assembled state.
Figure 24:
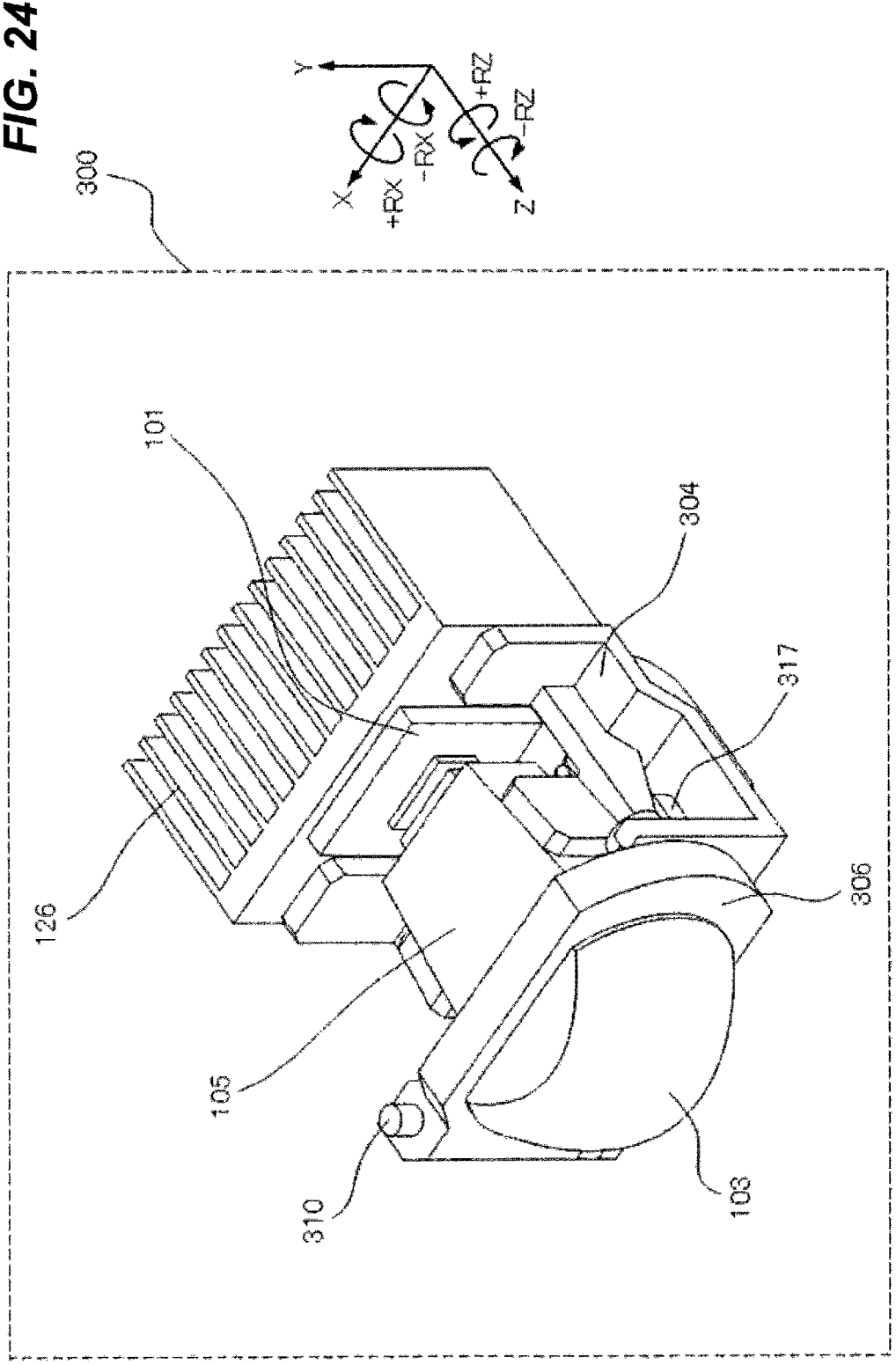
FIG. 24 is a view of the headlight unit 300 according to the third embodiment in the assembled state.

FIG. 22 is an exploded back perspective view of a headlight unit 300 according to the third embodiment. FIG. 23 is a back perspective view of the headlight unit 300 in an assembled state. FIG. 24 is a front perspective view of the headlight unit 300 in the assembled state.

To facilitate explanation, XYZ-orthogonal coordinate axes are shown in the drawings. In the following description, it will be assumed that a forward direction of the headlight unit 300 is the +Z axis direction and a backward direction is the −Z axis direction. It will be assumed that, as viewed in the forward direction, a rightward direction is the +X axis direction and a leftward direction is the −X axis direction. It will be assumed that an upward direction (direction toward the sky) of the headlight unit 300 is the +Y axis direction and a downward direction (direction toward the ground) of the headlight unit 300 is the −Y axis direction. It will be assumed that, when the headlight unit 300 is viewed from the backward direction (−Z axis direction), a clockwise direction about the Z axis is the +RZ direction and a counterclockwise direction about the Z axis is the −RZ direction. It will also be assumed that, when the headlight unit 300 is viewed from the left (−X axis direction), a clockwise direction about the X axis is the +RX direction and a counterclockwise direction about the X axis is the −RX direction.

The headlight unit 300 includes the light source 101, the light guide member 102, the projection lens 103, and a drive unit 312. The headlight unit 300 may also include a lens holder 306 and a base portion 304.

The headlight unit 100 uses the feed screw 150 and translation member 151 to move the sliding pin 131 in the X axis direction. However, the headlight unit 300 is different in that it uses a slider 317 having the rack 223 to move a slide surface 322 in the X axis direction. "Slider" refers to a sliding part. "Sliding" refers to moving slidingly. Thus, "sliding part" refers to a part that moves slidingly.

The headlight unit 160 simultaneously rotates the projection lenses 103a, 103b, and 103c by holding the projection lenses 103a, 103b, and 103c in the integrated lens holder 161. However, a headlight unit 360 is different in that it simultaneously rotates the projection lenses 103a, 103b, and 103c by using a connected slider 327 obtained by integrating sliders of respective headlight modules 365a, 365b, and 365c. The headlight modules 365a, 365b, and 365c include lens holders 306a, 306b, and 306c, respectively.

In the headlight unit 100 or 200, the lens holder 106 or 206 rotates about the X axis. However, the headlight unit 300 is different in that the lens holder 306 translates in the Y axis direction.

Further, in the headlight unit 200, the slider 217 has the sliding pin 231. However, the headlight unit 300 is different in that the slider 317 has the slide surface 322 instead of the sliding pin 231.

Further, in the headlight unit 100, the lens holder 106 includes the rotation pins 128a and 128b and the slide surface 129. In the headlight unit 200, the lens holder 206 includes the rotation pins 228a and 228b and the slide surface 229. However, the headlight unit 300 is different in that the lens holder 306 includes a slide hole 307, a slide pin 308, and a slide pin 309, instead of the rotation pins 128a and 128b or 228a and 228b and the slide surface 129 or 229.

Further, in the headlight unit 100, the base portion 104 includes the rotation holes 130a and 130b. In the headlight unit 200, the base portion 204 includes the rotation holes 230a and 230b. However, the headlight unit 300 is different in that the base portion 304 includes a slide shaft 310 and a slide slot 311, instead of the rotation holes 130a and 130b or 230a and 230b.

Elements that are the same as the elements of the headlight unit 100 described in the first embodiment will be given the same reference characters, and descriptions thereof will be omitted. The elements that are the same as the elements of the headlight unit 100 are the light source 101, light guide member 102, projection lens 103, light guide member holder 105, motor 113, and heat dissipation unit 126.

The projection lens 103 is depicted in the drawings with the flanges and holding holes 134a and 134b, which are described in the first embodiment, omitted. The descriptions will also be omitted below. Further, the light guide member holder 105 is depicted in the drawings with the adjustment base 136, light guide member base 137, and plate spring 138, which are described in the first embodiment, omitted. The descriptions will also be omitted below.

Further, elements that are the same as the elements of the headlight unit 200 described in the second embodiment will be given the same reference characters, and descriptions thereof will be omitted. The elements that are the same as the elements of the headlight unit 200 are the worm screw 214, worm wheel 215, spur gear 216, fixing hole 118, support hole 219, rotation shaft 220, rack 223, and linear motion pins 224.

<Configuration of Headlight Unit 300>

The light source 101 is, for example, a light emitting diode (LED), a xenon lamp, a halogen lamp, or the like. An electroluminescence element, a semiconductor laser, or the like may be used as the light source 101. The following description will be made on the assumption that the light source 101 is an LED. The light source 101 is mounted with the heat dissipation unit 126 for releasing heat generated from the light source 101 to the outside. The light source 101 is fixed directly to the base portion 304, or is fixed to the base portion 304 via the heat dissipation unit 126.

The light guide member 102 is, for example, a light guide, a light pipe, or the like. The light guide member 102 is disposed in front (+Z axis direction) of the light source 101. The light guide member 102 is held by the light guide member holder 105. The light guide member holder 105 is held by the base portion 304. That is, the light guide member 102 is held by the base portion 304 via the light guide member holder 105. If all the surfaces of the light guide member 102 are optical surfaces as in a light guide, by holding the light guide member 102 using the light guide member holder 105, an optical influence on the light guide member 102 can be made as small as possible.

The projection lens 103 is held by the lens holder 306. The projection lens 103 transmits light emitted from the light source 101 and projects it in the forward direction (+Z axis direction). The lens holder 306 is disposed on the forward direction side (+Z axis direction side) of the light guide member 102.

The lens holder 306 includes the slide hole 307 and the slide pins 308 and 309. The slide hole 307 is a hole parallel to the Y axis. In FIG. 22, it is provided at an end portion on the +X axis direction side of the lens holder 306. The slide pins 308 and 309 are pins parallel to the Z axis. The slide pins 308 and 309 extend from the lens holder 306 in the −Z axis direction. The slide pin 308 is provided at an end portion on the −X axis direction side of the lens holder 306.

The slide pin 309 is provided at an end portion on the +X axis direction side of the lens holder 306. The slide shaft 310 provided in the base portion 304 is inserted in the slide hole 307. The slide pin 308 is inserted in the slide slot 311 provided in the base portion 304. The slide pin 309 is in contact with the slide surface 322.

The slide shaft 310 is a shaft parallel to the Y axis. The slide shaft 310 extends from the base portion 304 in the +Y axis direction. The slide shaft 310 is provided at an end portion on the +X axis direction side in an end portion on the +Z axis direction side of the base portion 304. The slide slot 311 is a slot parallel to the Y axis. The slide slot 311 extends from the base portion 304 in the +Y axis direction. In FIG. 22, it is provided in a plate-like portion parallel to an X-Y plane. The slide slot 311 is provided at an end portion on the −X axis direction side in an end portion on the +Z axis direction side of the base portion 304. An end portion on the +Y axis direction side of the slide slot 311 is unclosed and has an opening. Thus, the slide slot 311 has a U-shape. The lens holder 306 can move in the Y axis direction while guided by the slide shaft 310 and slide slot 311.

Thus, the lens holder 306 is held so that it can translate in the Y axis direction relative to the base portion 304. "Translate" refers to parallel displacement of each point constituting a rigid body or the like in the same direction. Further, a flange 325 is provided at a tip portion of the slide pin 308. When the slide pin 308 is inserted in the slide slot 311, the flange 325 is engaged with a surface on the −Z axis direction side of the slide slot 311. Thus, the lens holder 306 can translate in the Y axis direction without rotating about the slide shaft 310 (axis parallel to the Y axis).

<Drive Unit 312>

The drive unit 312 includes the slider 317. The drive unit 312 may include the motor 113, worm screw 214, worm wheel 215, and spur gear 216.

The motor 113 is held by the base portion 304 in such a manner that the rotational axis of the motor is parallel to the X axis. The shaft of the motor 113 is inserted in the fixing hole 118 provided in the base portion 304. The motor 113 is mounted to the base portion 304 using a screw or the like through a hole provided around the fixing hole 118, for example. The motor 113 is, for example, a direct current motor, a stepping motor, or the like. The worm screw 214 is mounted to the shaft of the motor 113. In FIG. 22, the worm screw 214 is mounted to a tip portion of the shaft of the motor 113. A tip portion of the worm screw 214 is inserted in the support hole 219 provided in the base portion 304. Thus, the rotation shaft of the motor 113 is inserted in the fixing hole 118 and a housing of the motor 113 is held by the base portion 304.

Further, the tip portion of the worm screw 214 mounted to the rotation shaft is rotatably supported in the support hole 219. The worm wheel 215 and spur gear 216 are inserted in the rotation shaft 220 provided in the base portion 304. The rotation shaft 220 is a pin parallel to the Y axis and extends from the base portion 304 in the +Y axis direction. The worm wheel 215 and spur gear 216 are held rotatably about an axis parallel to the Y axis relative to the base portion 304. The worm wheel 215 and spur gear 216 are integrated. Thus, the worm wheel 215 and spur gear 216 rotate without slippage therebetween. The worm wheel 215 and spur gear 216 have the same direction and angle of rotation.

The slider 317 has a linear motion slot 221, the slide surface 322, and the rack 223. The slider 317 is a drive member. In FIG. 22, the slider 317 has a plate-like shape. The slider 317 has a rectangular shape. The slider 317 is disposed in parallel with a Z-X plane. The base portion 304 is provided with two linear motion pins 224. The linear motion pins 224 are pins parallel to the Y axis and extend from the base portion 304 in the +Y axis direction. The two linear motion pins 224 are arranged at an interval in parallel with the X axis. The two linear motion pins 224 are inserted in the linear motion slot 221 of the slider 317. The slider 317 can translate in the X axis direction relative to the base portion 304 while guided by the two linear motion pins 224. The slider 317 is held in the base portion 304 by the two linear motion pins 224.

The slide surface 322 is disposed on a surface parallel to a Z-X plane of the slider 317. In FIG. 22, the slide surface 322 is disposed at an end portion on the +X axis side of the slider 317. The slide surface 322 is disposed on the +Z axis side of the linear motion slot 221. The slide surface 322 is a slope such that the height in the Y axis direction of an end portion on the +X axis direction side is high and the height in the Y axis direction decreases in the −X axis direction. Thus, the height in the Y axis direction of the end portion on the +X axis direction side of the slide surface 322 is higher than the height in the Y axis direction of an end portion on the −X axis direction side of the slide surface 322. It is depicted as a planar slope in FIG. 22, but may be a curved slope.

The worm screw 214 meshes with the worm wheel 215. The spur gear 216 meshes with the rack 223. As the rotation shaft of the motor 113 rotates, the worm screw 214 rotates about an axis parallel to the X axis. As the worm screw 214 rotates, the worm wheel 215 rotates about an axis parallel to the Y axis. Simultaneously, the spur gear 216 also rotates about the axis parallel to the Y axis. As the spur gear 216 rotates, the slider 317 moves in the X axis direction while guided by the linear motion pins 224.

The slide surface 322 of the slider 317 is disposed on the base portion 304 so as to be in contact with the slide pin 309 provided on the lens holder 306. The slide pin 309 is a contact against the slide surface 322.

Further, the lens holder 306 is connected to the base portion 304 by a spring (not illustrated). This spring provides a force to move the lens holder 306 in the Y axis direction. In FIG. 22, the spring provides a force to move the lens holder 306 in the −Y axis direction. The spring keeps the slide pin 309 in contact with the slide surface 322. For example, the lens holder 306 and the base portion 304 are connected by a tension coil spring so that the lens holder 306 is pulled in the −Y axis direction.

<Motion of Lens Holder 306>

Figures 25A, 25B, 25C:
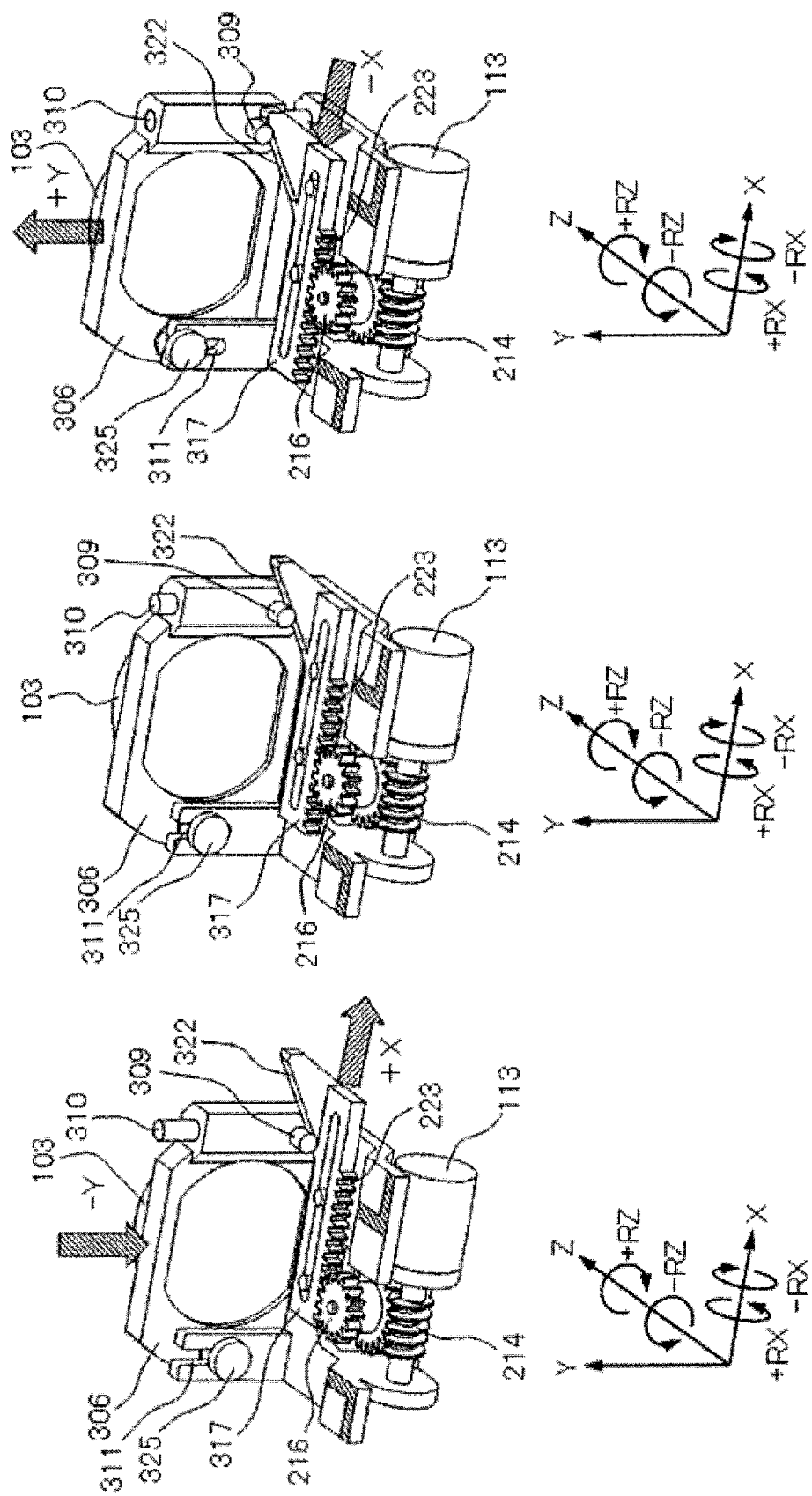
FIGS. 25(A), 25(B), and 25(C) are views illustrating the appearance of a motion of a lens holder 306 according to the third embodiment.

FIGS. 25(A), 25(B), and 25(C) are views illustrating the appearance of a motion of the lens holder 306 when the slider 317 is driven by the motor 113. FIG. 25(A) illustrates a state where the slider 317 is at an end position on the +X axis direction side of a movement range in the X axis direction and the lens holder 306 is at a lower end of a movement range in the Y axis direction. FIG. 25(B) illustrates a state where the slider 317 is at an intermediate position of the movement range in the X axis direction and the lens holder 306 is at an intermediate position of the movement range in the Y axis direction. FIG. 25(C) illustrates a state where the slider 317 is at an end position on the −X axis direction side of the movement range in the X axis direction and the lens holder 306 is at an upper end of the movement range in the Y axis direction.

The slide surface 322 is a surface facing in the +Y axis direction. The slide surface 322 is inclined so that it goes in the +Y axis direction as it goes in the +X axis direction. Thus, as the slider 317 moves in the −X axis direction, the position at which the slide pin 309 is in contact with the slide surface 322 moves in the +Y axis direction. "The slider 317 moves in the −X axis direction" indicates that the state changes from FIG. 25(A) to FIG. 25(B) and then to FIG. 25(C), and is illustrated in FIGS. 25(A), 25(B), and 25(C). Thus, the lens holder 306 translates in the +Y axis direction while guided by the slide shaft 310. The lens holder 306 is pulled in the −Y axis direction by the above-described spring. Thus, the slide pin 309 moves in the +Y axis direction while in contact with the slide surface 322.

On the other hand, as the slider 317 moves in the +X axis direction, the position at which the slide pin 309 is in contact with the slide surface 322 moves in the −Y axis direction. "The slider 317 moves in the +X axis direction" indicates that the state changes from FIG. 25(C) to FIG. 25(B) and then to FIG. 25(A), and is illustrated in FIGS. 25(A), 25(B), and 25(C). Thus, the lens holder 306 translates in the −Y axis direction while guided by the slide shaft 310. The lens holder 306 is pulled in the −Y axis direction by the above-described spring. Thus, the slide pin 309 moves in the −Y axis direction while in contact with the slide surface 322.

As above, the slider 317 moves in the X axis direction to move the slide pin 309 in the Y axis direction, thereby moving the lens holder 306 and projection lens 103 in the Y axis direction.

<Change in Light Ray Trajectory>

Figure 26:
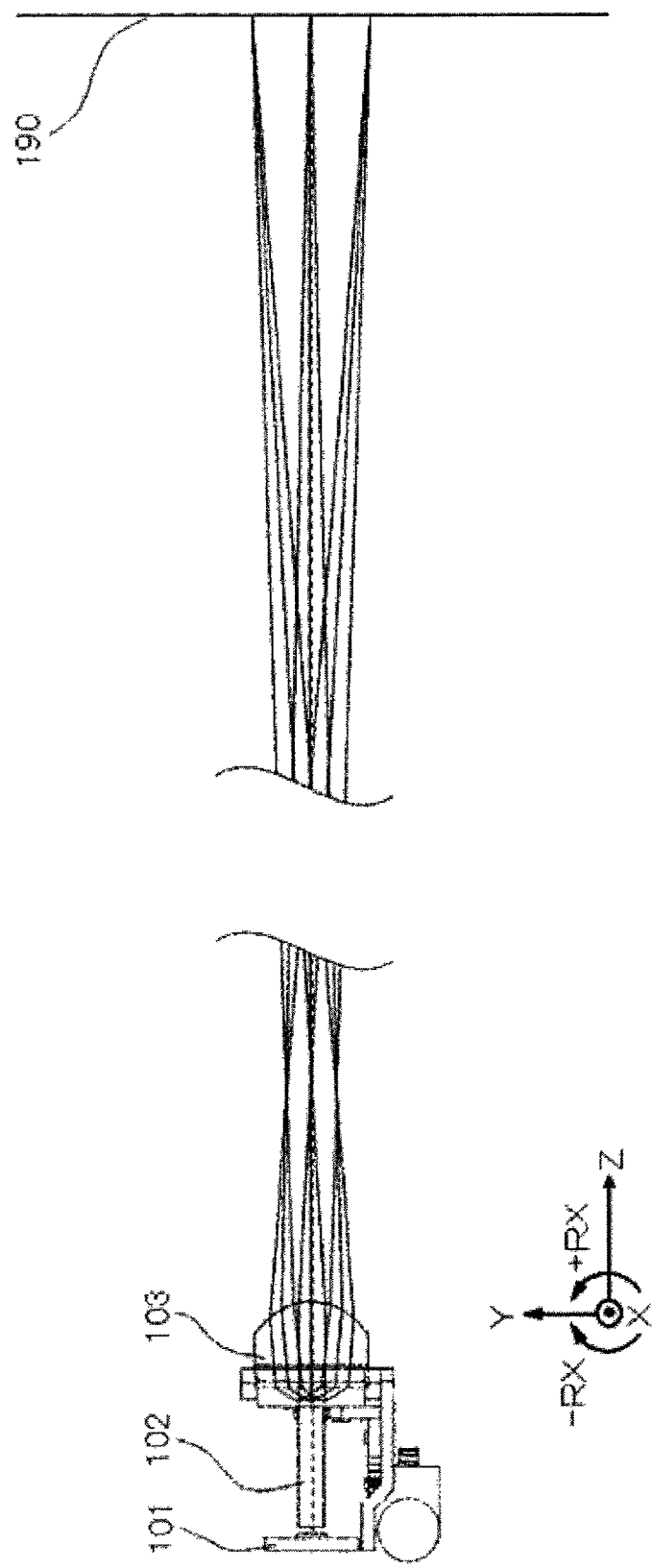
FIG. 26 is a diagram illustrating light ray trajectories when a vehicle body according to the third embodiment is not tilted forward or backward.

FIGS. 26, 27, and 28 are schematic diagrams illustrating trajectories of light rays emitted from the light source 101. FIGS. 26, 27, and 28 illustrate the light source 101, light guide member 102, and projection lens 103 without illustrating the light guide member holder 105, heat dissipation unit 126, and the like, which are not relevant to the explanation. FIGS. 26, 27, and 28 are diagrams as viewed from the +X axis direction side toward the −X axis direction side. The irradiated surface 190 in FIGS. 26, 27, and 28 is the same as the irradiated surface 190 described in the first embodiment.

When a vehicle body is not tilted forward or backward, the slider 317 is located at a position such that the lens holder 306 and projection lens 103 are located at a reference position. "Reference position" refers to a position of the lens holder 306 and projection lens 103 where light is radiated to an irradiated area in a state where the vehicle body is not tilted forward or backward. In FIG. 26, for example, it is a position where the optical axis of the projection lens 103 coincides with the optical axis of the light source 101. For example, it is the position in FIG. 25(B). Light emitted from the light source 101 passes through the light guide member 102 and is emitted from the projection lens 103. Specifically, the light emitted from the light source 101 enters the light guide member 102 and travels in the +Z axis direction inside the light guide member 102. The light emitted from the light guide member 102 enters the projection lens 103. The light passing through the projection lens 103 is emitted forward (+Z axis direction) from the projection lens 103.

FIG. 26 is a diagram illustrating light ray trajectories when the vehicle body is not tilted forward or backward. Thus, FIG. 26 illustrates the trajectories of light rays in a state where the vehicle body is parallel to the ground. In FIG. 26, a light beam projected from the projection lens 103 generally travels in parallel with the Z axis. However, actually, the light projected from the headlight has a light distribution directed downward to illuminate the ground. To simplify explanation, FIG. 26 illustrates trajectories of light rays such that the irradiated area is formed in front of the light source 101. "Front" refers to a direction in which the vehicle travels and is the +Z axis direction in the drawing. In the state of FIG. 26 where the vehicle body is not tilted forward or backward, the irradiated area is formed in front of the light source 101. As in the second embodiment, this representation of the light ray trajectories is different from that in FIGS. 7, 8, and 9, which is no more than a difference in representation and does not indicate a difference in the actual manner of application to the vehicle.

When the vehicle body is tilted forward, the motor 113 moves the slider 317 in the −X axis direction. Thus, the lens holder 306 and projection lens 103 move in the +Y axis direction. This is the state of FIG. 25(C), for example. In this case, the direction of the light emitted from the projection lens changes to the upward direction (+Y axis direction).

FIG. 27 is a diagram illustrating trajectories of light rays in a case where the vehicle body is tilted forward. However, to simplify explanation, FIG. 27 depicts the trajectories of the light rays without tilting of the vehicle body. "Case where the vehicle body is tilted forward" refers to, for example, a case of braking and decelerating during traveling, a case where a person or a load is loaded on a passenger seat, or the like.

Actually, when a vehicle body is not tilted, the light projected from the headlight has a light distribution directed downward to illuminate the ground. However, to simplify explanation, as illustrated in FIG. 26, the description is made on the assumption that the irradiated area is formed in front of the light source 101. Thus, in FIG. 27, which illustrates a case where the vehicle body is tilted forward, the light ray trajectories of light rays emitted from the headlight is tilted forward and upward relative to the Z axis. Thus, in the state of FIG. 27 in which the vehicle body is tilted forward, the irradiated area is formed above a position in front of the light source 101.

From this, actually, since the vehicle body is tilted forward, the irradiated area is formed in front of the light source 101 as in the state of FIG. 26. Even when the vehicle body is tilted forward, an optimum light distribution is provided as in the case where the vehicle body is not tilted forward or backward.

When the vehicle body is tilted backward, the motor 113 moves the slider 317 in the +X axis direction. Thus, the lens holder 306 and projection lens 103 move in the −Y axis direction. This is the state of FIG. 25(A), for example. In this case, the direction of the light emitted from the projection lens changes to the downward direction (−Y axis direction).

FIG. 28 is a diagram illustrating trajectories of light rays in a case where the vehicle body is tilted backward. However, to simplify explanation, FIG. 28 depicts the trajectories of the light rays without tilting of the vehicle body. "Case where the vehicle body is tilted backward" refers to, for example, a case of increasing the speed and accelerating, a case where a person or a load is loaded on a rear seat, or the like.

Actually, when the vehicle body is not tilted, the light projected from the headlight has a light distribution directed downward to illuminate the ground. However, to simplify explanation, as illustrated in FIG. 26, the description is made on the assumption that the irradiated area is formed in front of the light source 101. Thus, in FIG. 28, which illustrates a case where the vehicle body is tilted backward, the light ray trajectories of light rays emitted from the headlight is tilted forward and downward relative to the Z axis. Thus, in the state of FIG. 28 in which the vehicle body is tilted backward, the irradiated area is formed below a position in front of the light source 101.

From this, actually, since the vehicle body is tilted backward, the irradiated area is formed in front of the light source 101 as in the state of FIG. 26. Even when the vehicle body is tilted backward, an optimum light distribution is provided as in the case where the vehicle body is not tilted forward or backward. Further, the headlight can provide the optimum light distribution without dazzling an oncoming vehicle.

In the third embodiment, the slider 317 for translating the projection lens 103 in the Y axis direction is disposed on the −Y axis side of the light guide member holder 105. The slider 317 moves in the X axis direction on the −Y axis side of the light guide member holder 105. Specifically, the slider 317 for driving the projection lens 103 is disposed in a portion corresponding to a difference in dimension in the Y axis direction between the projection lens 103 and the light guide member holder 105. These configurations allow the projection lens 103, lens holder 306, light guide member holder 105, and drive unit 312 to be easily arranged in a compact manner. The light guide member 102 is held in the light guide member holder 105. Thus, the light guide member holder 105 here corresponds to the light guide unit 132 in the first embodiment.

<Modifications>

Figure 29:
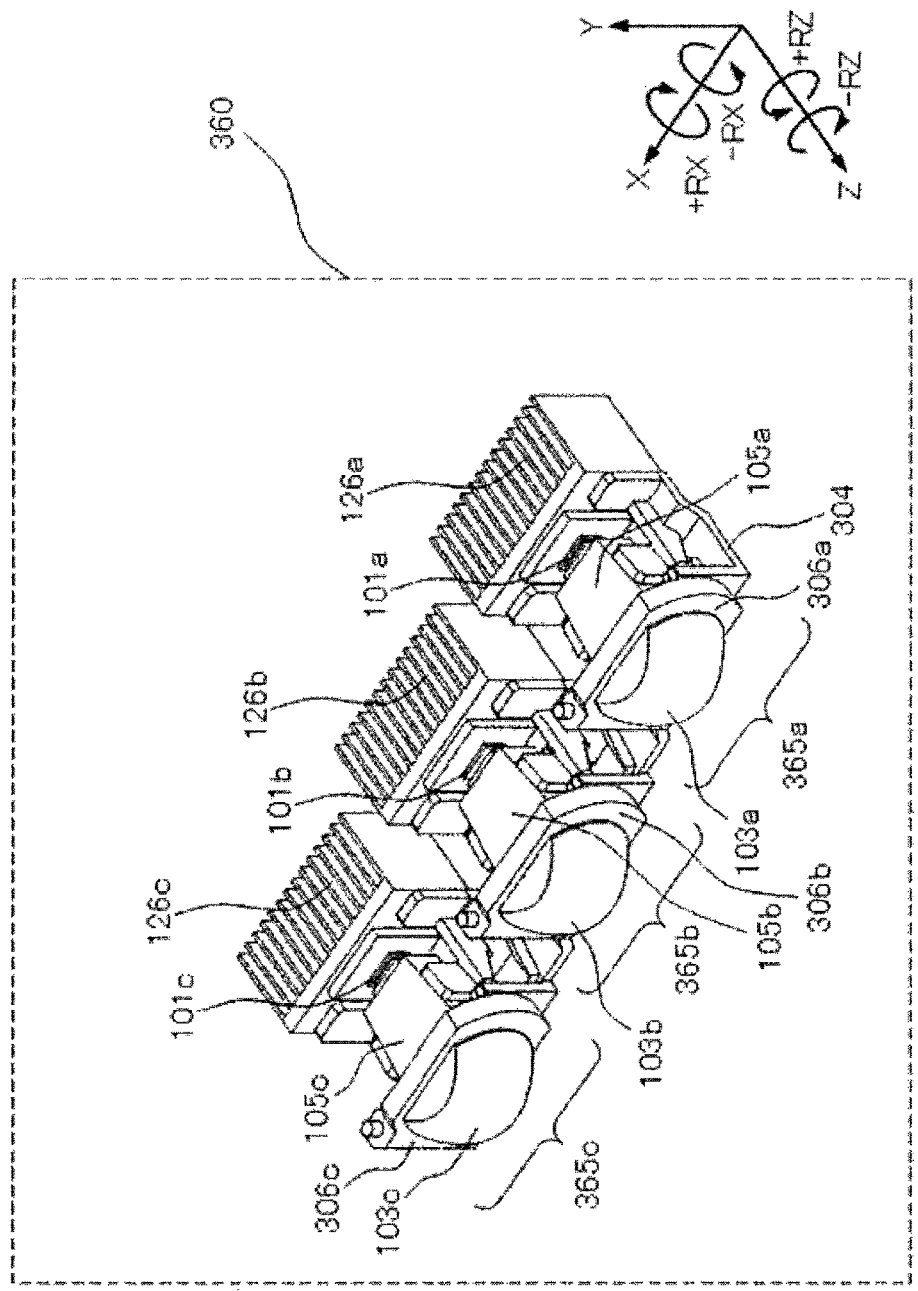
FIG. 29 is a perspective view of a headlight unit 360 configured by arranging a plurality of the headlight units 300 according to the third embodiment.

There is a headlight that overlaps light distributions from multiple light sources to provide an illumination area. FIG. 29 is a perspective view of the headlight unit 360 configured by arranging a plurality of the headlight units 300 described in the third embodiment. In a conventional headlight using multiple light sources, optical axis adjustment is performed by integrally driving the light sources, a heat sink, a projection lens, and the like. In this case, a member that performs the optical axis adjustment is large, and an actuator, a drive mechanism, and the like that move the member are also large.

The headlight unit 360 includes three sets of the light source 101, light guide member 102, and projection lens 103. The heat dissipation unit 126 is provided for each of the light sources 101a, 101b, and 101c. However, as described in the first embodiment, a single heat dissipation unit may be configured by integrating the heat dissipation units 126. An assembly obtained by assembling the light source 101, light guide member 102, and projection lens 103 will be referred to as a headlight module 365. The headlight module 365 may include the lens holder 306.

Figure 30:
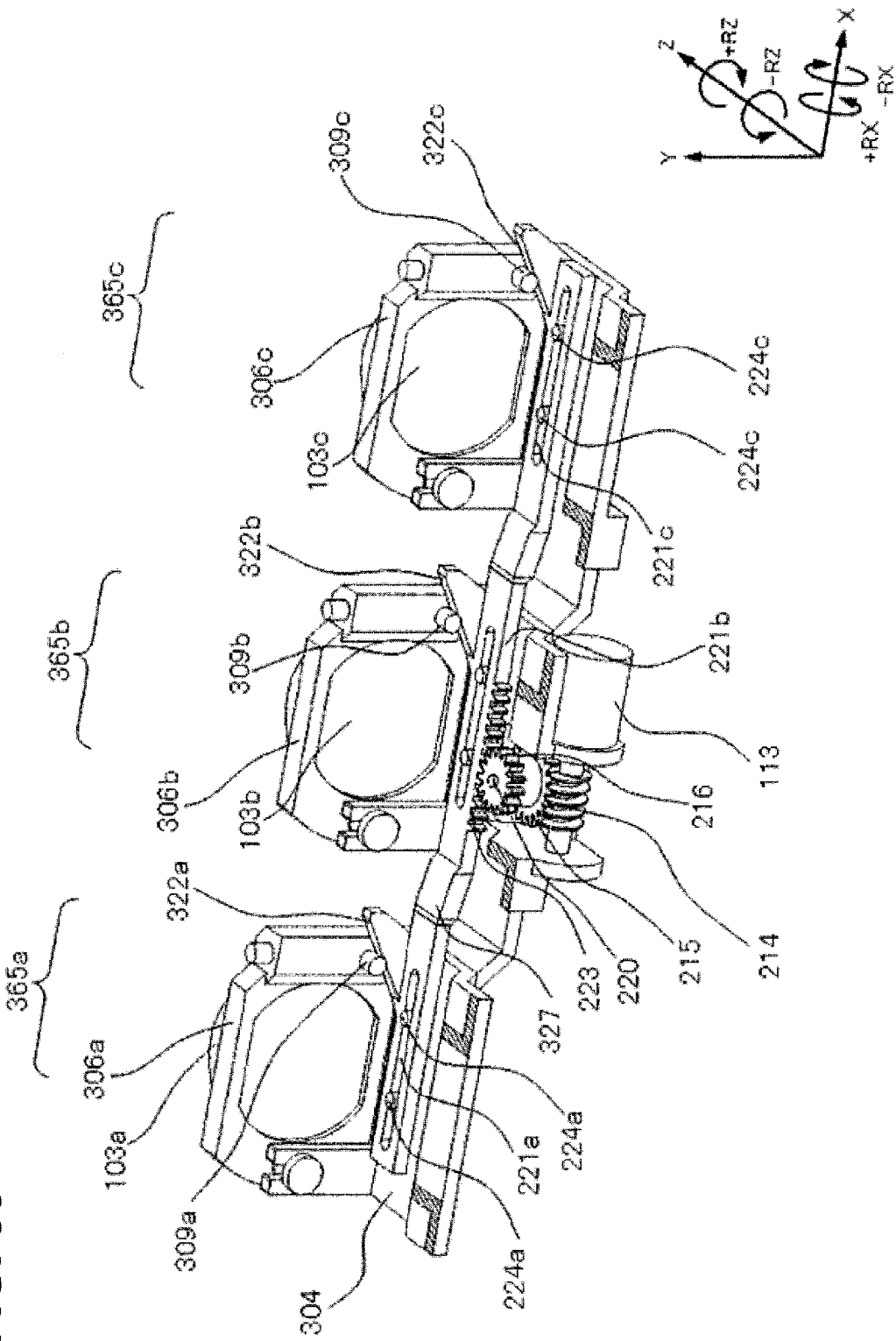
FIG. 30 is a perspective view illustrating a drive part of the headlight unit 360 according to the third embodiment.

FIG. 30 is a perspective view illustrating a drive part of the headlight unit 360 described in the third embodiment. The headlight unit 360 includes the three headlight modules 365a, 365b, and 365c. The headlight modules 365a, 365b, and 365c are arranged in parallel with the X axis. However, optical axes of the projection lenses 103a, 103b, and 103c of the headlight modules 365a, 365b, and 365c may be arranged to be mutually displaced in the Y axis direction. Further, the projection lenses 103a, 103b, and 103c of the headlight modules 365a, 365b, and 365c may be arranged to be mutually displaced in the Z axis direction. These arrangements can be easily achieved by changing the positional relationship between the lens holders 306a, 306b, and 306c and the projection lenses 103a, 103b, and 103c. These arrangements make it possible to arrange the headlight modules 365a, 365b, and 365c with a degree of freedom and improve the design of the headlight.

The headlight module 365a includes the light source 101a, light guide member 102a, and projection lens 103a, and is disposed at a position on the −X axis direction side. The headlight module 365a may include the lens holder 306a. The headlight module 365b includes the light source 101b, light guide member 102b, and projection lens 103b, and is disposed at a center position in the X axis direction. The headlight module 365b may include the lens holder 306b. The headlight module 365c includes the light source 101c, light guide member 102c, and projection lens 103c, and is disposed at a position on the +X axis direction side. The headlight module 365c may include the lens holder 306c. The light guide member 102a is held in a light guide member holder 105a. The light guide member 102b is held in a light guide member holder 105b. The light guide member 102c is held in a light guide member holder 105c.

According to the third embodiment, even if there are a plurality of the light sources 101, the headlight unit 360 can be simply configured by integrating the sliders 317 provided in the headlight units 300. The connected slider 327 is obtained by integrating the three sliders 317. The connected slider 327 is a drive member. The connected slider 327 is a plate-like member. In FIG. 30, the connected slider 327 is a plate-like member long in the X axis direction. The connected slider 327 has a linear motion slot 221a on the −X axis direction side thereof. The connected slider 327 has a linear motion slot 221b at a center position thereof in the X axis direction. The connected slider 327 has a linear motion slot 221c on the +X axis direction side thereof. Thus, the linear motion slot 221b is disposed between the linear motion slot 221a and the linear motion slot 221c.

The rack 223 is formed on the −Z axis direction side of the connected slider 327. In FIG. 30, the rack 223 is formed on the −Z axis direction side at a center position of the connected slider 327 in the X axis direction. Thus, the drive unit 312 is disposed at a position of the headlight module 365b. However, the drive unit 312 may be disposed at a position of the headlight module 365a. The drive unit 312 may also be disposed at a position of the headlight module 365c.

The base portion 304 includes linear motion pins 224a, 224b, and 224c. The linear motion pins 224a are inserted in the linear motion slot 221a. The linear motion pins 224b are inserted in the linear motion slot 221b. The linear motion pins 224c are inserted in the linear motion slot 221c. In FIG. 30, the number of the linear motion pins 224a, the number of the linear motion pins 224b, and the number of the linear motion pins 224c are each two, but may be each one. Also, a total of two linear motion pins 224 including the linear motion pins 224a and 224c at both ends in the X axis direction may be provided.

The motor 113 is held by the base portion 304. The worm wheel 215 and spur gear 216 are also mounted to the base portion 304. The worm screw 214 meshes with the worm wheel 215. The spur gear 216 meshes with the rack 223. As the shaft of the motor 113 rotates, the worm screw 214 mounted to the shaft of the motor 113 rotates. As the worm screw 214 rotates, the worm wheel 215 and spur gear 216 rotate about the rotation shaft 220. As the spur gear 216 rotates, the rack 223 moves in the X axis direction and the connected slider 327 moves in the X axis direction.

The lens holders 306a, 306b, and 306c have slide pins 309a, 309b, and 309c. The connected slider 327 has slide surfaces 322a, 322b, and 322c respectively corresponding to the slide pins 309a, 309b, and 309c.

When an optical axis is adjusted in response to change in attitude of the vehicle body, the connected slider 327 is moved in the X axis direction by the motor 113. As the connected slider 327 moves in the X axis direction, the slide surfaces 322a, 322b, and 322c move in the X axis direction. As the slide surfaces 322a, 322b, and 322c move in the X axis direction, the slide pins 309a, 309b, and 309c move in the Y axis direction. As the slide pins 309a, 309b, and 309c move in the Y axis direction, the lens holders 306a, 306b, and 306c and the projection lenses 103a, 103b, and 103c move in the Y axis direction.

According to the third embodiment, even when there are a plurality of the light sources 101, by using the connected slider 327, it is possible to adjust the optical axis by a single actuator. Further, by changing the angles of inclination of the slide surfaces 322a, 322b, and 322c, it is possible to adjust the amounts and speeds of movement of the respective lens holders 306a, 306b, and 306c. When multiple optical systems different in optical characteristics are used, the amounts of adjustment of optical axes of the respective optical systems may be different. In such a case, the amounts of adjustment of optical axes appropriate for the respective optical systems are required. According to the third embodiment, even in such a case, an optimum optical axis adjustment can be performed.

In the third embodiment, the heat dissipation unit 126 is provided to release heat generated by the light source 101. However, if the light source 101 is fixed directly to the base portion 304 and the base portion 304 can dissipate the heat by itself, the heat dissipation unit 126 is not necessarily required.

The third embodiment employs a configuration including the light source 101, light guide member 102, projection lens 103, base portion 304, and drive unit 312. However, elements of the third embodiment are not limited to these. For example, a lens for controlling a light distribution may be provided between the light source 101 and the light guide member 102. The projection lens 103 may be composed of one lens. The projection lens 103 may also be composed using multiple lenses.

The third embodiment uses the light guide member holder 105 to hold the light guide member 102 on the base portion 304. However, the way to hold the light guide member 102 is not limited to this. It is also possible to directly provide a structure for holding the light guide member 102 to the base portion 304. In this case, the light guide member holder 105 need not be used.

The third embodiment uses the drive unit 312 to move the slider 317 in the X axis direction. However, the way to move the slider 317 is not limited to this. For example, the direct current motor 113 may be a stepping motor or an ultrasonic motor. The translational movement of the slider 317 may be implemented by using a feed screw mechanism. It may also be implemented by using a belt and pulley. It may also be implemented by using a link mechanism.

In the third embodiment, the slide pin 309 is provided to the lens holder 306 and the slide surface 322 is provided to the slider 317. However, even if the slide pin 309 is provided to the slider 317 and the slide surface 322 is provided to the lens holder 306, the same advantages are obtained.

The third embodiment uses the lens holder 306 to translatably mount the projection lens 103 to the base portion 304. However, the way to mount the projection lens 103 is not limited to this. For example, if the projection lens 103 is made of plastic, the slide hole 307 and slide pins 308 and 309 can be provided directly to the projection lens 103. In this case, the lens holder 306 need not be used. However, if the slide hole 307 and slide pins 308 and 309 are provided directly to the projection lens 103, there is a problem that distortion is likely to occur on the lens surface or the like and it is difficult to ensure optical performance of the projection lens 103. A linear guide or the like may also be used to translatably hold the lens holder 306.

As above, the slider 317 is disposed at a position on the +Y axis direction side or −Y axis direction side of the light guide member 102, and the headlight unit 300 moves the slide surface 322 of the slider 317. This arrangement allows the slider 317 to move without providing an additional space. This allows the headlight unit 300 to be downsized.

The connected slider 327 is disposed at a position on the +Y axis direction side or −Y axis direction side of the light guide member 102, and the headlight unit 360 moves the slide surfaces 322a, 322b, and 322c of the connected slider 327. This arrangement allows the connected slider 327 to move without providing an additional space. This allows the headlight unit 360 to be downsized.

Specifically, the headlight unit 300 or 360 can be thinned by an amount corresponding to the height (length in the Y axis direction) of a part passing through the space 107 or 108 illustrated in FIG. 12 of the slider 317 or connected slider 327. If the height of the slider 317 or connected slider 327 is greater than the height of the space 107 or 108, the headlight unit 300 or 360 can be thinned by an amount corresponding to the height of the space 107 or 108. If the height of the slider 317 or connected slider 327 is less than the height of the space 107 or 108, the headlight unit 300 or 360 can be thinned by an amount corresponding to the height of the slider 317 or connected slider 327.

The headlight unit 300 includes the light source 101, light guide member 102, projection lens 103, and drive unit 312. The light source 101 emits a light beam for irradiating a forward area in a traveling direction. The light guide member 102 receives the light beam emitted from the light source 101 and emits planar light having a divergence angle. The projection lens 103 receives the planar light emitted from the light guide member 102 and projects it forward. The drive unit 312 changes the positional relationship between the light guide member 102 and the projection lens 103. The drive unit 312 is disposed in a region overlapping with the projection lens 103 in a direction perpendicular to an optical axis of the light guide member 102 from the light guide member 102, as optically viewed from an optical axis direction of the projection lens 103.

"Optically viewed" refers to, for example, when light emitted from the light guide member 102 is reflected by a mirror or the like and enters the projection lens 103, being viewed while the optical axis bent by the mirror or the like is changed into a straight line.

"Region" here corresponds to the space 107 or 108 illustrated in FIG. 12, for example.

The drive unit 312 includes the drive member 317 having the slide surface 322. The drive member 317 moves on an axis that is non-parallel to and non-intersecting with the optical axis of the light guide member 102. The contact 309 of the projection lens 103 and the slide surface 322 of the drive member 317, which moves in contact with the contact 309, are used to change the positional relationship between the light guide member 102 and the projection lens 103.

In the third embodiment, the slider 317 is described as the drive member. The slide pin 309 is described as the contact.

"The contact 309 of the projection lens 103" includes, for example, a case where the contact 309 is formed integrally with the projection lens 103. It also includes a case where the lens holder 306 having the contact 309 is mounted to the projection lens 103, as described in the third embodiment.

In the third embodiment, the slider 317 moves in parallel with the X axis. However, for example, even if the slider 317 is moved in parallel with a Z-X plane and at an angle to the X axis, the same advantages can be obtained. For example, in the case of the configuration illustrated in FIG. 22, the slide surface 322 moves in the Z axis direction while moving in the X axis direction. Thus, it is necessary to distance the slide surface 322 from the lens holder 306 and lengthen the slide pin 309.

The drive unit 312 may include the drive member 317 having the contact 309. The drive member 317 moves on an axis that is non-parallel to and non-intersecting with the optical axis of the light guide member 102. The slide surface 322 of the projection lens 103 and the contact 309 of the drive member 317, which moves in contact with the slide surface 322, may be used to change the positional relationship between the light guide member 102 and the projection lens 103.

In the third embodiment, the slide surface 322 is provided to the drive member 317 and the slide pin 309 is provided to the lens holder 306. However, the present invention can provide the same advantages even if the slide surface 322 is provided to the lens holder 306 and the slide pin 309 is provided to the drive member 317.

"The slide surface 322 of a projection lens 103" includes, for example, a case where the slide surface 322 is formed integrally with the projection lens 103. It also includes a case where the lens holder 306 having the slide surface 322 is mounted to the projection lens 103.

The drive member 317 is a plate-like slider.

In the third embodiment, the slider 317 is described as the drive member.

The projection lens 103 moves while guided in a vertical direction.

In the third embodiment, the vertical direction is the Y axis direction. Further, the projection lens 103 moves while guided by the slide shaft 310.

The headlight unit 360 includes the multiple headlight modules 365a, 365b, and 365c. The multiple headlight modules 365a, 365b, and 365c respectively include the light sources 101a, 101b, and 101c, the light guide members 102a, 102b, and 102c, and the projection lenses 103a, 103b, and 103c. The drive unit 312 collectively changes positions of the projection lenses 103a, 103b, and 103c of the multiple headlight modules 365a, 365b, and 365c.

"Respectively include" indicates, for example, that the headlight module 365a includes the light source 101a, light guide member 102a, and projection lens 103a; the headlight module 365b includes the light source 101b, light guide member 102b, and projection lens 103b; and the headlight module 365c includes the light source 101c, light guide member 102c, and projection lens 103c.

"Collectively changes" indicates, for example, that the drive unit 312 simultaneously moves the projection lenses 103a, 103b, and 103c.

The headlight unit 300 according to the third embodiment includes the light source 101, light guide member 102, projection lens 103, and drive unit 312. The light source 101 emits a light beam for irradiating a forward area in a traveling direction. The light guide member 102 receives the light beam emitted from the light source 101 and emits planar light. The projection lens 103 receives the planar light emitted from the light guide member 102 and projects it forward to form the irradiated area. The drive unit 312 changes the positional relationship between the light guide member 102 and the projection lens 103. The drive unit 312 includes the slider (drive member) 317 having the slide pin (contact) 309 or slide surface 322. The slider (drive member) 317 moves on an axis that is non-parallel to and non-intersecting with the optical axis of the light guide member 102; the positional relationship is changed by using the slide surface 322 mounted to the projection lens 103 and the slide pin (contact) 309 of the slider (drive member) 317, which moves on and in contact with the slide surface 322, or the slide pin (contact) 309 mounted to the projection lens 103 and the slide surface 322 of the slider (drive member) 317, which moves in contact with the slide pin (contact) 309.

The headlight unit 360 according to the third embodiment includes the light sources 101a, 101b, and 101c, the light guide members 102a, 102b, and 102c, the projection lenses 103a, 103b, 103c, and the drive unit 312. The light sources 101a, 101b, and 101c emit light beams for irradiating a forward area in a traveling direction. The light guide members 102a, 102b, and 102c receive the light beams emitted from the light sources 101a, 101b, and 101c and emit planar light. The projection lenses 103a, 103b, and 103c receive the planar light emitted from the light guide members 102a, 102b, and 102c and project it forward to form the irradiated area. The drive unit 312 changes the positional relationship between the light guide members 102a, 102b, and 102c and the projection lenses 103a, 103b, and 103c. The drive unit 312 includes the connected slider (drive member) 327 having the slide pins (contacts) 309a, 309b, and 309c or slide surfaces 322a, 322b, and 322c. The connected slider (drive member) 327 moves on an axis that is non-parallel to and non-intersecting with the optical axes of the light guide members 102a, 102b, and 102c; the positional relationship is changed by using the slide surfaces 322a, 322b, and 322c mounted to the projection lenses 103a, 103b, and 103c and the slide pins (contacts) 309a, 309b, 309c of the connected slider (drive member) 327, which move on and in contact with the slide surfaces 322a, 322b, and 322c, or the slide pins (contacts) 309a, 309b, and 309c mounted to the projection lenses 103a, 103b, and 103c and the slide surfaces 322a, 322b, and 322c of the connected slider (drive member) 327, which move in contact with the slide pins (contacts) 309a, 309b, and 309c.

<Headlight 10>

Figure 31:
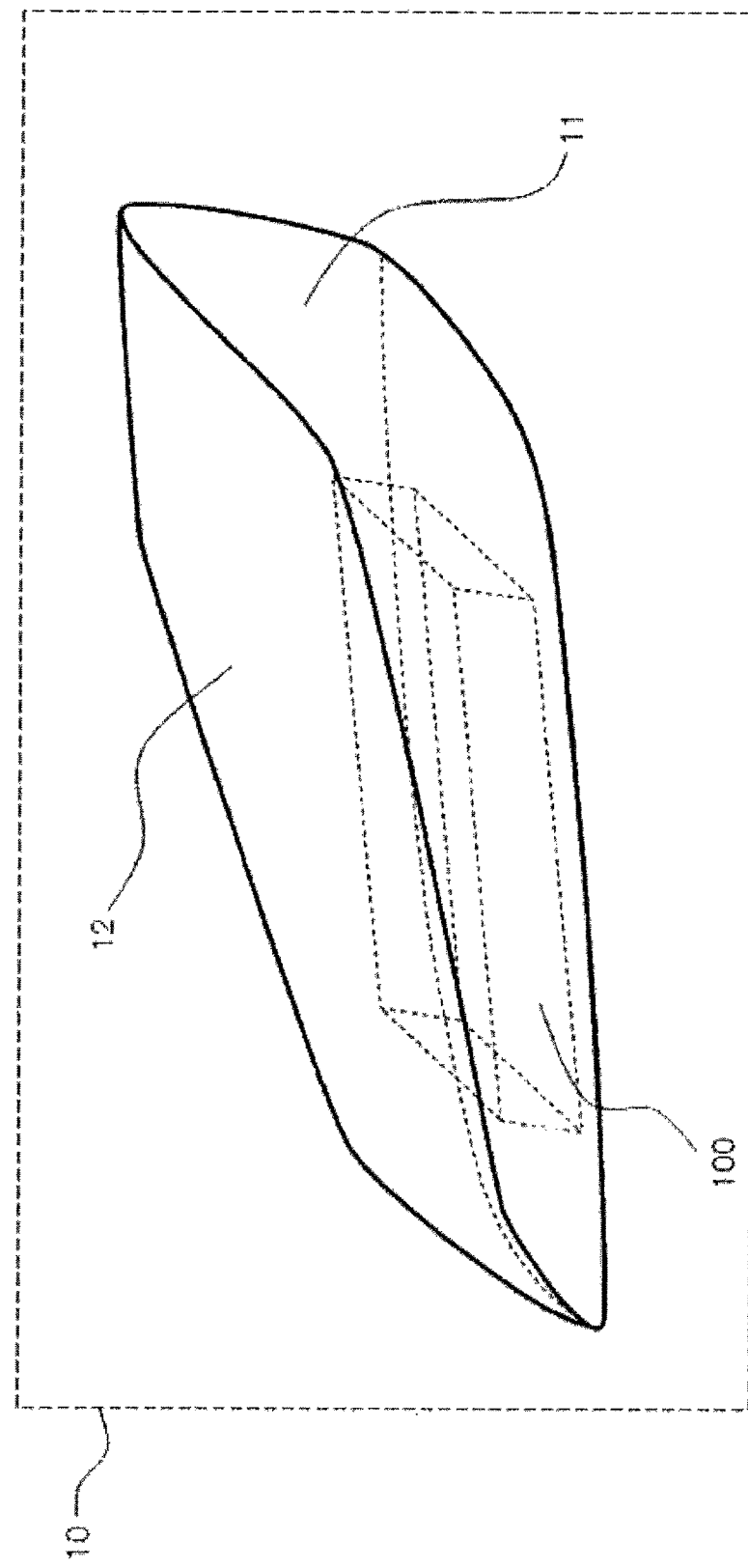
FIG. 31 is a configuration view illustrating a configuration of a headlight 10.

FIG. 31 is a configuration view illustrating a configuration of the headlight 10. The headlight unit 100, 160, 200, 260, 300, or 360 described in the above-described embodiments is held in a housing 12. A transparent cover 11 transmits light emitted from the projection lens or lenses 103. The transparent cover 11 functions to protect the headlight unit 100, 160, 200, 260, 300, or 360 from dust, dirt, rain, or the like. Power or the like for driving the headlight unit 100, 160, 200, 260, 300, or 360 is externally supplied by a cable passing through a hole (not illustrated) provided in the housing 12. The headlight 10 is attached to a vehicle or the like. In FIG. 31, the reference character of the headlight unit is indicated by reference character 100 as an example. Since the headlight unit 100 is disposed inside the headlight 10, it is represented by a dashed-line hexahedron. The shape of each surface of the hexahedron is depicted as a quadrangle.

The headlight 10 includes the headlight unit 100, 160, 200, 260, 300, or 360 described in the first to third embodiments.

In each of the above-described embodiments, the heat dissipation unit 126 is provided to release heat generated by the light source 101. However, if the light source 101 is fixed directly to the base portion 104, 204, or 304 and the base portion 104, 204, or 304 can dissipate the heat by itself, the heat dissipation unit 126 is not necessarily required.

Further, in each of the above-described embodiments, a lens for controlling a light distribution may be provided between the light source 101 and the light guide member 102. The projection lens 103 may be composed of one lens. The projection lens 103 may also be composed using multiple lenses.

Further, in each of the above-described embodiments, the light guide member 102 is held on the base portion 104, 204, or 304 by using the light guide member holder 105. However, the way to hold the light guide member 102 is not limited to this. It is also possible to directly provide a structure for holding the light guide member 102 to the base portion 104, 204, or 304. In this case, the light guide member holder 105 need not be used.

The above-described embodiments use terms, such as "parallel" or "perpendicular", indicating the positional relationships between parts or the shapes of parts. These terms are intended to include ranges taking account of manufacturing tolerances, assembly variations, or the like. Thus, recitations in the claims indicating the positional relationships between parts or the shapes of parts are intended to include ranges taking account of manufacturing tolerances, assembly variations, or the like.

Although the embodiments of the present invention are described as above, the present invention is not limited to these embodiments.

DESCRIPTION OF REFERENCE CHARACTERS 10 headlight, 11 transparent cover, 12 housing, 100, 160, 200, 260, 300, 360, 160 headlight unit, 165, 265, 365 headlight module, 101 light source, 102 light guide member, 103 projection lens, 104, 204, 304 base portion, 104a, 104b side plate portion, 105 light guide member holder, 106, 206, 306 lens holder, 107, 108 space, 112, 212, 312 drive unit, 113 motor, 118 fixing hole, 126 heat dissipation unit, 127, 227 connected slider, 128a, 128b, 228a, 228b rotation pin, 129, 229, 322 slide surface, 130a, 130b, 230a, 230b rotation hole, 131, 231 sliding pin, 132 light guide unit, 133a, 133b fixing pin, 134a, 134b holding hole, 135a, 135b fixing hole, 136 adjustment base, 137 light guide member base, 138 plate spring, 138a, 138b, 138c, 138d, 138e spring portion, 138f, 138g bent portion, 139 upper surface arc-shaped portion, 140 side surface arc-shaped portion, 141 abutting surface, 142 flange, 143 ridge line, 144 Z axis adjustment slot, 145 X axis adjustment slot, 146 Z axis adjustment pin, 147 X axis adjustment pin, 148 motor spur gear, 149 feed screw gear, 150 feed screw, 151 translation member, 152 motor holder, 153 translation member sliding surface, 154 internally threaded hole, 155 holder sliding surface, 156 top plate portion, 157a, 157b side plate portion, 158a, 158b bottom plate portion, 161 integrated lens holder, 190 irradiated surface, 214 worm screw, 215 worm wheel, 216 spur gear, 217, 317 slider, 219 support hole, 220 rotation shaft, 221 linear motion slot, 223 rack, 224 linear motion pin, 227, 327 connected slider, 307 slide hole, 308, 309 slide pin, 310 slide shaft, 311 slide slot, 325 flange.

What is claimed is:

1. A headlight unit comprising:
    a light source that emits a light beam for irradiating a forward area in a traveling direction;
    a light guide portion that receives the light beam and forms planar light having a divergence angle;
    a projection lens portion that projects the planar light forward; and
    a drive unit that changes a position of the projection lens portion,
    wherein the drive unit is disposed in a region overlapping with the projection lens portion, as optically viewed from an optical axis direction of the light guide portion or the projection lens portion,
    wherein the projection lens portion includes a slide surface, and the drive unit includes a drive member having a contact,
    wherein the drive member moves along an axis, and wherein the slide surface is inclined to the axis so that when the drive member moves in a direction of the axis, the contact moves in the direction of the axis relative to and in contact with the slide surface, thereby moving the slide surface in a direction perpendicular to the axis and changing the position of the projection lens portion.

2. A headlight unit comprising:
    a light source that emits a light beam for irradiating a forward area in a traveling direction;
    a light guide portion that receives the light beam and forms planar light having a divergence angle;
    a projection lens portion that projects the planar light forward; and
    a drive unit that changes a position of the projection lens portion,
    wherein the drive unit is disposed in a region overlapping with the projection lens portion, as optically viewed from an optical axis direction of the light guide portion or the projection lens portion,
    wherein the projection lens portion includes a contact, and the drive unit includes a drive member having a slide surface,
    wherein the drive member moves along an axis, and wherein the slide surface of the drive member is inclined to the axis so that when the drive member moves in a direction of the axis, the slide surface moves in the direction of the axis relative to and in contact with the contact, thereby moving the contact in a direction perpendicular to the axis and changing the position of the projection lens portion.

3. The headlight unit of claim 1, wherein the drive member moves in an axial direction of a feed screw due to a screw effect of the feed screw.

4. The headlight unit of claim 1, wherein the drive member is a plate-like slider.

5. The headlight unit of claim 1, wherein the projection lens portion rotates about an axis parallel to a horizontal direction.

6. The headlight unit of claim 1, wherein the projection lens portion moves while guided in a vertical direction.

7. The headlight unit of claim 1, comprising a plurality of headlight modules each including the light source, the light guide portion, and the projection lens portion,
    wherein the drive unit collectively changes positions of the projection lens portions of the plurality of headlight modules.

8. A headlight comprising the headlight unit of claim 1.

9. The headlight unit of claim 2, wherein the drive member moves in an axial direction of a feed screw due to a screw effect of the feed screw.

10. The headlight unit of claim 2, wherein the drive member is a plate-like slider.

11. The headlight unit of claim 2, wherein the projection lens portion rotates about an axis parallel to a horizontal direction.

12. The headlight unit of claim 3, wherein the projection lens portion rotates about an axis parallel to a horizontal direction.

13. The headlight unit of claim 4, wherein the projection lens portion rotates about an axis parallel to a horizontal direction.

14. The headlight unit of claim 2, wherein the projection lens portion moves while guided in a vertical direction.

15. The headlight unit of claim 3, wherein the projection lens portion moves while guided in a vertical direction.

16. The headlight unit of claim 4, wherein the projection lens portion moves while guided in a vertical direction.

17. the headlight unit of claim 1, wherein the axis is non-parallel to and non-intersecting with the optical axis of the light guide portion.

18. The headlight unit of claim 2, wherein the axis is non-parallel to and non-intersecting with the optical axis of the light guide portion.

19. The headlight unit of claim 2, comprising a plurality of headlight modules each including the light source, the light guide portion, and the projection lens portion,
   wherein the drive unit collectively changes positions of the projection lens portions of the plurality of headlight modules.

20. A headlight comprising the headlight unit of claim 2.

* * * * *